(12) United States Patent
Vorbach et al.

(10) Patent No.: US 7,657,861 B2
(45) Date of Patent: Feb. 2, 2010

(54) METHOD AND DEVICE FOR PROCESSING DATA

(75) Inventors: Martin Vorbach, Munich (DE); Frank May, Munich (DE); Armin Nuckel, Neupotz (DE)

(73) Assignee: Pact XPP Technologies AG, Munich (DE)

( * ) Notice: Subject to any disclaimer, the term of this patent is extended or adjusted under 35 U.S.C. 154(b) by 560 days.

(21) Appl. No.: 10/523,763
(22) PCT Filed: Jul. 23, 2003
(Under 37 CFR 1.47)

(86) PCT No.: PCT/EP03/08081
§ 371 (c)(1),
(2), (4) Date: Nov. 22, 2005

(87) PCT Pub. No.: WO2004/021176
PCT Pub. Date: Mar. 11, 2004

(65) Prior Publication Data
US 2006/0248317 A1   Nov. 2, 2006

(30) Foreign Application Priority Data

| Aug. 7, 2002 | (DE) | 102 36 269 |
| Aug. 7, 2002 | (DE) | 102 36 271 |
| Aug. 7, 2002 | (DE) | 102 36 272 |
| Aug. 16, 2002 | (WO) | PCT/EP02/10065 |
| Aug. 21, 2002 | (DE) | 102 38 172 |
| Aug. 21, 2002 | (DE) | 102 38 173 |
| Aug. 21, 2002 | (DE) | 102 38 174 |
| Aug. 27, 2002 | (DE) | 102 40 000 |
| Aug. 27, 2002 | (DE) | 102 40 022 |
| Sep. 3, 2002 | (WO) | PCT/DE02/03278 |
| Sep. 6, 2002 | (DE) | 102 41 812 |
| Sep. 9, 2002 | (WO) | PCT/EP02/10084 |
| Sep. 18, 2002 | (DE) | 102 43 322 |
| Sep. 18, 2002 | (WO) | PCT/EP02/10464 |
| Sep. 18, 2002 | (WO) | PCT/EP02/10479 |
| Sep. 19, 2002 | (WO) | PCT/EP02/10536 |
| Sep. 19, 2002 | (WO) | PCT/EP02/10572 |
| Oct. 10, 2002 | (EP) | 02022692 |
| Dec. 6, 2002 | (EP) | 02027277 |
| Jan. 7, 2003 | (DE) | 103 00 380 |
| Jan. 20, 2003 | (WO) | PCT/DE03/00152 |
| Jan. 20, 2003 | (WO) | PCT/EP03/00624 |
| Feb. 18, 2003 | (WO) | PCT/DE03/00489 |
| Mar. 6, 2003 | (DE) | 103 10 195 |
| Mar. 21, 2003 | (WO) | PCT/DE03/00942 |
| Apr. 4, 2003 | (DE) | 103 15 295 |
| Apr. 30, 2003 | (EP) | 03009906 |
| May 15, 2003 | (DE) | 103 21 834 |
| Jun. 17, 2003 | (EP) | 03013694 |
| Jul. 2, 2003 | (EP) | 03015015 |

(51) Int. Cl.
*G06F 17/50* (2006.01)
(52) U.S. Cl. .......................................... 716/16; 716/17
(58) Field of Classification Search ............. 716/16–17; 712/10, 22–23, 37, 43, 200; 326/38–41
See application file for complete search history.

(56) References Cited

U.S. PATENT DOCUMENTS 2,067,477 A    1/1937    Cooper
(Continued)

FOREIGN PATENT DOCUMENTS

DE           42 21 278           1/1994
(Continued)

OTHER PUBLICATIONS

Abnous, A., et al., "The Pleiades Architecture," Chapter I of *The Application of Programmable DSPs in Mobile Communications*, A. Gatherer and A. Auslander, Ed., Wiley, 2002, pp. 1-33.
(Continued)

*Primary Examiner*—Paul Dinh
(74) *Attorney, Agent, or Firm*—Kenyon & Kenyon LLP

(57) ABSTRACT

In a system including a multidimensional field of reconfigurable elements, and a method for operating said field of reconfigurable elements, one or more groups of said elements suitable for processing a predetermined task may be determined, a particular one of the one or more groups is selected, and the selected group is configured in a predetermined manner during runtime for processing the predetermined task, and in manufacturing of said system.

13 Claims, 13 Drawing Sheets

U.S. PATENT DOCUMENTS

| | | |
|---|---|---|
| 3,242,998 A | 3/1966 | Gubbins |
| 3,681,578 A | 8/1972 | Stevens |
| 3,757,608 A | 9/1973 | Willner |
| 3,855,577 A | 12/1974 | Vandierendonck |
| 4,233,667 A | 11/1980 | Devine et al. |
| 4,414,547 A | 11/1983 | Knapp et al. |
| 4,497,855 A | 2/1985 | Agrawal et al. |
| 4,498,134 A | 2/1985 | Hansen et al. |
| 4,498,172 A | 2/1985 | Bhavsar |
| 4,566,102 A | 1/1986 | Hefner |
| 4,590,583 A | 5/1986 | Miller |
| 4,591,979 A | 5/1986 | Iwashita |
| 4,663,706 A | 5/1987 | Allen et al. |
| 4,667,190 A | 5/1987 | Fant et al. |
| 4,682,284 A | 7/1987 | Schrofer |
| 4,706,216 A | 11/1987 | Carter |
| 4,720,778 A | 1/1988 | Hall et al. |
| 4,720,780 A | 1/1988 | Dolecek |
| 4,739,474 A | 4/1988 | Holsztynski |
| 4,761,755 A | 8/1988 | Ardini et al. |
| 4,811,214 A | 3/1989 | Nosenchuck et al. |
| 4,852,043 A | 7/1989 | Guest |
| 4,852,048 A | 7/1989 | Morton |
| 4,860,201 A | 8/1989 | Stolfo et al. |
| 4,870,302 A | 9/1989 | Freeman |
| 4,882,687 A | 11/1989 | Gordon |
| 4,884,231 A | 11/1989 | Mor et al. |
| 4,891,810 A | 1/1990 | de Corlieu et al. |
| 4,901,268 A | 2/1990 | Judd |
| 4,910,665 A | 3/1990 | Mattheyses et al. |
| 4,918,440 A | 4/1990 | Furtek |
| 4,967,340 A | 10/1990 | Dawes |
| 4,972,314 A | 11/1990 | Getzinger et al. |
| 5,010,401 A | 4/1991 | Murakami et al. |
| 5,014,193 A | 5/1991 | Garner et al. |
| 5,015,884 A | 5/1991 | Agrawal et al. |
| 5,021,947 A | 6/1991 | Campbell et al. |
| 5,023,775 A | 6/1991 | Poret |
| 5,034,914 A | 7/1991 | Osterlund |
| 5,041,924 A | 8/1991 | Blackborow et al. |
| 5,043,978 A | 8/1991 | Nagler et al. |
| 5,047,924 A | 9/1991 | Fujioka et al. |
| 5,065,308 A | 11/1991 | Evans |
| 5,072,178 A | 12/1991 | Matsumoto |
| 5,081,375 A | 1/1992 | Pickett et al. |
| 5,099,447 A | 3/1992 | Myszewski |
| 5,109,503 A | 4/1992 | Cruickshank et al. |
| 5,113,498 A | 5/1992 | Evan et al. |
| 5,115,510 A | 5/1992 | Okamoto et al. |
| 5,123,109 A | 6/1992 | Hillis |
| 5,125,801 A | 6/1992 | Nabity et al. |
| 5,128,559 A | 7/1992 | Steele |
| 5,142,469 A | 8/1992 | Weisenborn |
| 5,144,166 A | 9/1992 | Camarota et al. |
| 5,193,202 A | 3/1993 | Jackson et al. |
| 5,203,005 A | 4/1993 | Horst |
| 5,204,935 A | 4/1993 | Mihara et al. |
| 5,208,491 A | 5/1993 | Ebeling et al. |
| 5,212,716 A | 5/1993 | Ferraiolo et al. |
| 5,218,302 A | 6/1993 | Loewe et al. |
| 5,226,122 A | 7/1993 | Thayer et al. |
| RE34,363 E | 8/1993 | Freeman |
| 5,233,539 A | 8/1993 | Agrawal et al. |
| 5,237,686 A | 8/1993 | Asano et al. |
| 5,247,689 A | 9/1993 | Ewert |
| RE34,444 E | 11/1993 | Kaplinsky |
| 5,274,593 A | 12/1993 | Proebsting |
| 5,276,836 A | 1/1994 | Fukumaru et al. |
| 5,287,472 A | 2/1994 | Horst |
| 5,287,532 A | 2/1994 | Hunt |
| 5,294,119 A | 3/1994 | Vincent et al. |
| 5,301,284 A | 4/1994 | Estes et al. |
| 5,301,344 A | 4/1994 | Kolchinsky |
| 5,303,172 A | 4/1994 | Magar et al. |
| 5,311,079 A | 5/1994 | Ditlow et al. |
| 5,327,125 A | 7/1994 | Iwase et al. |
| 5,336,950 A | 8/1994 | Popli et al. |
| 5,343,406 A | 8/1994 | Freeman et al. |
| 5,347,639 A | 9/1994 | Rechtschaffen et al. |
| 5,349,193 A | 9/1994 | Mott et al. |
| 5,353,432 A | 10/1994 | Richek et al. |
| 5,361,373 A | 11/1994 | Gilson |
| 5,379,444 A | 1/1995 | Mumme |
| 5,392,437 A | 2/1995 | Matter et al. |
| 5,410,723 A | 4/1995 | Schmidt et al. |
| 5,412,795 A | 5/1995 | Larson |
| 5,418,952 A | 5/1995 | Morley et al. |
| 5,418,953 A | 5/1995 | Hunt et al. |
| 5,421,019 A | 5/1995 | Holsztynski et al. |
| 5,422,823 A | 6/1995 | Agrawal et al. |
| 5,425,036 A | 6/1995 | Liu et al. |
| 5,426,378 A | 6/1995 | Ong |
| 5,428,526 A | 6/1995 | Flood et al. |
| 5,430,687 A | 7/1995 | Hung et al. |
| 5,440,245 A | 8/1995 | Galbraith et al. |
| 5,440,538 A | 8/1995 | Olsen |
| 5,442,790 A | 8/1995 | Nosenchuck |
| 5,444,394 A | 8/1995 | Watson et al. |
| 5,448,186 A | 9/1995 | Kawata |
| 5,455,525 A | 10/1995 | Ho et al. |
| 5,457,644 A | 10/1995 | McCollum |
| 5,465,375 A | 11/1995 | Thepaut et al. |
| 5,469,003 A | 11/1995 | Kean |
| 5,473,266 A | 12/1995 | Ahanin et al. |
| 5,473,267 A | 12/1995 | Stansfield |
| 5,475,583 A | 12/1995 | Bock et al. |
| 5,475,803 A | 12/1995 | Stearns et al. |
| 5,475,856 A | 12/1995 | Kogge |
| 5,483,620 A | 1/1996 | Pechanek et al. |
| 5,485,103 A | 1/1996 | Pedersen et al. |
| 5,485,104 A | 1/1996 | Agrawal et al. |
| 5,489,857 A | 2/1996 | Agrawal et al. |
| 5,491,353 A | 2/1996 | Kean |
| 5,493,239 A | 2/1996 | Zlotnick |
| 5,497,498 A | 3/1996 | Taylor |
| 5,506,998 A | 4/1996 | Kato et al. |
| 5,510,730 A | 4/1996 | El Gamal et al. |
| 5,511,173 A | 4/1996 | Yamaura et al. |
| 5,513,366 A | 4/1996 | Agarwal et al. |
| 5,521,837 A | 5/1996 | Frankle et al. |
| 5,522,083 A | 5/1996 | Gove et al. |
| 5,525,971 A | 6/1996 | Flynn |
| 5,530,873 A | 6/1996 | Takano |
| 5,530,946 A | 6/1996 | Bouvier et al. |
| 5,532,693 A | 7/1996 | Winters et al. |
| 5,532,957 A | 7/1996 | Malhi |
| 5,535,406 A | 7/1996 | Kolchinsky |
| 5,537,057 A | 7/1996 | Leong et al. |
| 5,537,580 A | 7/1996 | Giomi et al. |
| 5,537,601 A | 7/1996 | Kimura et al. |
| 5,541,530 A | 7/1996 | Cliff et al. |
| 5,544,336 A | 8/1996 | Kato et al. |
| 5,548,773 A | 8/1996 | Kemeny et al. |
| 5,550,782 A | 8/1996 | Cliff et al. |
| 5,555,434 A | 9/1996 | Carlstedt |
| 5,559,450 A | 9/1996 | Ngai et al. |
| 5,561,738 A | 10/1996 | Kinerk et al. |
| 5,570,040 A | 10/1996 | Lytle et al. |
| 5,574,930 A | 11/1996 | Halverson, Jr. et al. |
| 5,581,731 A | 12/1996 | King et al. |
| 5,583,450 A | 12/1996 | Trimberger et al. |
| 5,586,044 A | 12/1996 | Agrawal et al. |
| 5,587,921 A | 12/1996 | Agrawal et al. |
| 5,588,152 A | 12/1996 | Dapp et al. |

| | | | | | |
|---|---|---|---|---|---|
| 5,590,345 A | 12/1996 | Barker et al. | 5,892,961 A | 4/1999 | Trimberger |
| 5,590,348 A | 12/1996 | Phillips et al. | 5,892,962 A | 4/1999 | Cloutier |
| 5,596,742 A | 1/1997 | Agarwal et al. | 5,901,279 A | 5/1999 | Davis, III |
| 5,600,265 A | 2/1997 | El Gamal et al. | 5,915,123 A | 6/1999 | Mirsky et al. |
| 5,600,845 A | 2/1997 | Gilson | 5,924,119 A | 7/1999 | Sindhu et al. |
| 5,611,049 A | 3/1997 | Pitts | 5,926,638 A | 7/1999 | Inoue |
| 5,617,547 A | 4/1997 | Feeney et al. | 5,927,423 A | 7/1999 | Wada et al. |
| 5,625,806 A | 4/1997 | Kromer | 5,933,023 A | 8/1999 | Young |
| 5,625,836 A | 4/1997 | Barker et al. | 5,933,642 A | 8/1999 | Greenbaum et al. |
| 5,634,131 A | 5/1997 | Matter et al. | 5,936,424 A | 8/1999 | Young et al. |
| 5,646,544 A | 7/1997 | Iadanza | 5,943,242 A | 8/1999 | Vorbach et al. |
| 5,646,545 A | 7/1997 | Trimberger et al. | 5,956,518 A | 9/1999 | DeHon et al. |
| 5,649,176 A | 7/1997 | Selvidge et al. | 5,960,193 A | 9/1999 | Guttag et al. |
| 5,649,179 A | 7/1997 | Steenstra et al. | 5,960,200 A | 9/1999 | Eager et al. |
| 5,652,529 A | 7/1997 | Gould et al. | 5,966,143 A | 10/1999 | Breternitz, Jr. |
| 5,652,894 A | 7/1997 | Hu et al. | 5,966,534 A | 10/1999 | Cooke et al. |
| 5,655,069 A | 8/1997 | Ogawara et al. | 5,970,254 A | 10/1999 | Cooke et al. |
| 5,655,124 A | 8/1997 | Lin | 5,978,260 A | 11/1999 | Trimberger et al. |
| 5,657,330 A | 8/1997 | Matsumoto | 5,978,583 A | 11/1999 | Ekanadham et al. |
| 5,659,797 A | 8/1997 | Zandveld et al. | 5,996,083 A | 11/1999 | Gupta et al. |
| 5,675,743 A | 10/1997 | Mavity | 5,999,990 A | 12/1999 | Sharrit et al. |
| 5,680,583 A | 10/1997 | Kuijsten | 6,003,143 A | 12/1999 | Kim et al. |
| 5,694,602 A | 12/1997 | Smith | 6,011,407 A | 1/2000 | New |
| 5,713,037 A | 1/1998 | Wilkinson et al. | 6,014,509 A | 1/2000 | Furtek et al. |
| 5,717,943 A | 2/1998 | Barker et al. | 6,020,758 A | 2/2000 | Patel et al. |
| 5,732,209 A | 3/1998 | Vigil et al. | 6,020,760 A | 2/2000 | Sample et al. |
| 5,734,921 A | 3/1998 | Dapp et al. | 6,021,490 A | 2/2000 | Vorbach et al. |
| 5,737,516 A | 4/1998 | Circello et al. | 6,023,564 A | 2/2000 | Trimberger |
| 5,737,565 A | 4/1998 | Mayfield | 6,023,742 A | 2/2000 | Ebeling et al. |
| 5,742,180 A | 4/1998 | Detton et al. | 6,026,481 A | 2/2000 | New et al. |
| 5,748,872 A | 5/1998 | Norman | 6,034,538 A | 3/2000 | Abramovici |
| 5,748,979 A | 5/1998 | Trimberger | 6,035,371 A | 3/2000 | Magloire |
| 5,752,035 A | 5/1998 | Trimberger | 6,038,650 A | 3/2000 | Vorbach et al. |
| 5,754,459 A | 5/1998 | Telikepalli | 6,038,656 A | 3/2000 | Martin et al. |
| 5,754,820 A | 5/1998 | Yamagami | 6,044,030 A | 3/2000 | Zheng et al. |
| 5,754,827 A | 5/1998 | Barbier et al. | 6,047,115 A | 4/2000 | Mohan et al. |
| 5,754,871 A | 5/1998 | Wilkinson et al. | 6,049,222 A | 4/2000 | Lawman |
| 5,760,602 A | 6/1998 | Tan | 6,052,773 A | 4/2000 | DeHon et al. |
| 5,761,484 A | 6/1998 | Agarwal et al. | 6,054,873 A | 4/2000 | Laramie |
| 5,773,994 A | 6/1998 | Jones | 6,058,469 A | 5/2000 | Baxter |
| 5,778,439 A | 7/1998 | Trimberger et al. | 6,077,315 A | 6/2000 | Greenbaum et al. |
| 5,781,756 A | 7/1998 | Hung | 6,081,903 A | 6/2000 | Vorbach et al. |
| 5,784,636 A * | 7/1998 | Rupp .................... 712/37 | 6,085,317 A | 7/2000 | Smith |
| 5,794,059 A | 8/1998 | Barker et al. | 6,086,628 A | 7/2000 | Dave et al. |
| 5,794,062 A | 8/1998 | Baxter | 6,088,795 A | 7/2000 | Vorbach et al. |
| 5,801,547 A | 9/1998 | Kean | 6,092,174 A | 7/2000 | Roussakov |
| 5,801,715 A | 9/1998 | Norman | 6,105,105 A | 8/2000 | Trimberger et al. |
| 5,801,958 A | 9/1998 | Dangelo et al. | 6,105,106 A | 8/2000 | Manning |
| 5,802,290 A | 9/1998 | Casselman | 6,108,760 A | 8/2000 | Mirsky et al. |
| 5,815,715 A | 9/1998 | Kayhan | 6,119,181 A | 9/2000 | Vorbach et al. |
| 5,821,774 A | 10/1998 | Veytsman et al. | 6,122,719 A | 9/2000 | Mirsky et al. |
| 5,828,229 A | 10/1998 | Cliff et al. | 6,125,408 A | 9/2000 | McGee et al. |
| 5,828,858 A | 10/1998 | Athanas et al. | 6,127,908 A | 10/2000 | Bozler et al. |
| 5,831,448 A | 11/1998 | Kean | 6,134,166 A | 10/2000 | Lytle et al. |
| 5,838,165 A | 11/1998 | Chatter | 6,137,307 A | 10/2000 | Iwanczuk et al. |
| 5,841,973 A | 11/1998 | Kessler et al. | 6,150,837 A | 11/2000 | Beal et al. |
| 5,844,422 A | 12/1998 | Trimberger et al. | 6,150,839 A | 11/2000 | New et al. |
| 5,844,888 A | 12/1998 | Markkula, Jr. et al. | 6,154,048 A | 11/2000 | Iwanczuk et al. |
| 5,848,238 A | 12/1998 | Shimomura et al. | 6,154,049 A | 11/2000 | New |
| 5,854,918 A | 12/1998 | Baxter | 6,157,214 A | 12/2000 | Marshall |
| 5,857,097 A | 1/1999 | Henzinger et al. | 6,170,051 B1 | 1/2001 | Dowling |
| 5,859,544 A | 1/1999 | Norman | 6,172,520 B1 | 1/2001 | Lawman et al. |
| 5,862,403 A | 1/1999 | Kanai et al. | 6,173,434 B1 | 1/2001 | Wirthlin et al. |
| 5,865,239 A | 2/1999 | Carr | 6,185,256 B1 | 2/2001 | Saito et al. |
| 5,867,691 A | 2/1999 | Shiraishi | 6,185,731 B1 | 2/2001 | Maeda et al. |
| 5,867,723 A | 2/1999 | Chin et al. | 6,188,240 B1 | 2/2001 | Nakaya |
| 5,870,620 A | 2/1999 | Kadosumi et al. | 6,198,304 B1 | 3/2001 | Sasaki |
| 5,884,075 A | 3/1999 | Hester et al. | 6,201,406 B1 | 3/2001 | Iwanczuk et al. |
| 5,887,162 A | 3/1999 | Williams et al. | 6,202,182 B1 | 3/2001 | Abramovici et al. |
| 5,887,165 A | 3/1999 | Martel et al. | 6,204,687 B1 | 3/2001 | Schultz et al. |
| 5,889,533 A | 3/1999 | Lee | 6,211,697 B1 | 4/2001 | Lien et al. |
| 5,889,982 A | 3/1999 | Rodgers et al. | 6,212,650 B1 | 4/2001 | Guccione |
| 5,892,370 A | 4/1999 | Eaton et al. | 6,215,326 B1 | 4/2001 | Jefferson et al. |

| Patent Number | Date | Inventor(s) |
|---|---|---|
| 6,216,223 B1 | 4/2001 | Revilla et al. |
| 6,219,833 B1 | 4/2001 | Solomon et al. |
| RE37,195 E | 5/2001 | Kean |
| 6,230,307 B1 | 5/2001 | Davis et al. |
| 6,240,502 B1 | 5/2001 | Panwar et al. |
| 6,243,808 B1 | 6/2001 | Wang |
| 6,252,792 B1 | 6/2001 | Marshall et al. |
| 6,256,724 B1 | 7/2001 | Hocevar et al. |
| 6,260,179 B1 | 7/2001 | Ohsawa et al. |
| 6,262,908 B1 | 7/2001 | Marshall et al. |
| 6,263,430 B1 | 7/2001 | Trimberger et al. |
| 6,266,760 B1 | 7/2001 | DeHon et al. |
| 6,279,077 B1 | 8/2001 | Nasserbakht et al. |
| 6,282,627 B1 | 8/2001 | Wong et al. |
| 6,282,701 B1 | 8/2001 | Wygodny et al. |
| 6,285,624 B1 | 9/2001 | Chen |
| 6,286,134 B1 | 9/2001 | Click, Jr. et al. |
| 6,288,566 B1 | 9/2001 | Hanrahan et al. |
| 6,289,440 B1 | 9/2001 | Casselman |
| 6,298,472 B1 | 10/2001 | Phillips et al. |
| 6,301,706 B1 | 10/2001 | Maslennikov et al. |
| 6,311,200 B1 | 10/2001 | Hanrahan et al. |
| 6,311,265 B1 | 10/2001 | Beckerle et al. |
| 6,321,366 B1 | 11/2001 | Tseng et al. |
| 6,321,373 B1 | 11/2001 | Ekanadham et al. |
| 6,338,106 B1 | 1/2002 | Vorbach et al. |
| 6,341,318 B1 | 1/2002 | Dakhil |
| 6,347,346 B1 | 2/2002 | Taylor |
| 6,349,346 B1 | 2/2002 | Hanrahan et al. |
| 6,353,841 B1 | 3/2002 | Marshall et al. |
| 6,362,650 B1 | 3/2002 | New et al. |
| 6,370,596 B1 | 4/2002 | Dakhil |
| 6,373,779 B1 | 4/2002 | Pang et al. |
| 6,374,286 B1 | 4/2002 | Gee |
| 6,378,068 B1 | 4/2002 | Foster et al. |
| 6,381,624 B1 | 4/2002 | Colon-Bonet et al. |
| 6,389,379 B1 | 5/2002 | Lin et al. |
| 6,389,579 B1 | 5/2002 | Phillips et al. |
| 6,392,912 B1 | 5/2002 | Hanrahan et al. |
| 6,398,383 B1 | 6/2002 | Huang |
| 6,400,601 B1 | 6/2002 | Sudo et al. |
| 6,404,224 B1 | 6/2002 | Azegami et al. |
| 6,405,299 B1 | 6/2002 | Vorbach et al. |
| 6,421,808 B1 | 7/2002 | McGeer |
| 6,421,809 B1 | 7/2002 | Wuytack et al. |
| 6,421,817 B1 | 7/2002 | Mohan et al. |
| 6,425,054 B1 | 7/2002 | Nguyen |
| 6,425,068 B1 | 7/2002 | Vorbach et al. |
| 6,427,156 B1 | 7/2002 | Chapman et al. |
| 6,430,309 B1 | 8/2002 | Pressman et al. |
| 6,434,642 B1 | 8/2002 | Camilleri et al. |
| 6,434,695 B1 | 8/2002 | Esfahani et al. |
| 6,434,699 B1 | 8/2002 | Jones et al. |
| 6,435,054 B1 | 8/2002 | Duckeck et al. |
| 6,437,441 B1 | 8/2002 | Yamamoto |
| 6,438,747 B1 | 8/2002 | Schreiber et al. |
| 6,457,116 B1 | 9/2002 | Mirsky et al. |
| 6,476,634 B1 | 11/2002 | Bilski |
| 6,477,643 B1 | 11/2002 | Vorbach et al. |
| 6,480,937 B1 | 11/2002 | Vorbach et al. |
| 6,480,954 B2 | 11/2002 | Trimberger et al. |
| 6,487,709 B1 | 11/2002 | Keller et al. |
| 6,490,695 B1 | 12/2002 | Zagorski et al. |
| 6,496,971 B1 | 12/2002 | Lesea et al. |
| 6,504,398 B1 | 1/2003 | Lien et al. |
| 6,507,947 B1 | 1/2003 | Schreiber et al. |
| 6,513,077 B2 | 1/2003 | Vorbach et al. |
| 6,516,382 B2 | 2/2003 | Manning |
| 6,518,787 B1 | 2/2003 | Allegrucci et al. |
| 6,519,674 B1 | 2/2003 | Lam et al. |
| 6,523,107 B1 | 2/2003 | Stansfield et al. |
| 6,525,678 B1 | 2/2003 | Veenstra et al. |
| 6,526,520 B1 | 2/2003 | Vorbach et al. |
| 6,538,468 B1 | 3/2003 | Moore |
| 6,539,415 B1 | 3/2003 | Mercs |
| 6,539,438 B1 | 3/2003 | Ledzius et al. |
| 6,539,477 B1 | 3/2003 | Seawright |
| 6,542,394 B2 | 4/2003 | Marshall et al. |
| 6,542,844 B1 | 4/2003 | Hanna |
| 6,542,998 B1 | 4/2003 | Vorbach |
| 6,553,395 B2 | 4/2003 | Marshall et al. |
| 6,567,834 B1 | 5/2003 | Marshall et al. |
| 6,571,381 B1 | 5/2003 | Vorbach et al. |
| 6,587,939 B1 | 7/2003 | Takano |
| 6,631,487 B1 | 10/2003 | Abramovici et al. |
| 6,633,181 B1 | 10/2003 | Rupp |
| 6,657,457 B1 | 12/2003 | Hanrahan et al. |
| 6,658,564 B1 | 12/2003 | Smith et al. |
| 6,687,788 B2 | 2/2004 | Vorbach et al. |
| 6,697,979 B1 | 2/2004 | Vorbach et al. |
| 6,704,816 B1 | 3/2004 | Burke |
| 6,708,325 B2 | 3/2004 | Cooke et al. |
| 6,717,436 B2 | 4/2004 | Kress et al. |
| 6,721,830 B2 | 4/2004 | Vorbach et al. |
| 6,728,871 B1 | 4/2004 | Vorbach et al. |
| 6,754,805 B1 | 6/2004 | Juan |
| 6,757,847 B1 | 6/2004 | Farkash et al. |
| 6,757,892 B1 | 6/2004 | Gokhale et al. |
| 6,782,445 B1 | 8/2004 | Olgiati et al. |
| 6,785,826 B1 | 8/2004 | Durham et al. |
| 6,802,026 B1 | 10/2004 | Patterson et al. |
| 6,803,787 B1 | 10/2004 | Wicker, Jr. |
| 6,820,188 B2 | 11/2004 | Stansfield et al. |
| 6,829,697 B1 | 12/2004 | Davis et al. |
| 6,847,370 B2 | 1/2005 | Baldwin et al. |
| 6,868,476 B2 | 3/2005 | Rosenbluth et al. |
| 6,871,341 B1 | 3/2005 | Shyr |
| 6,874,108 B1 | 3/2005 | Abramovici et al. |
| 6,886,092 B1 | 4/2005 | Douglass et al. |
| 6,901,502 B2 | 5/2005 | Yano et al. |
| 6,928,523 B2 | 8/2005 | Yamada |
| 6,961,924 B2 | 11/2005 | Bates et al. |
| 6,977,649 B1 | 12/2005 | Baldwin et al. |
| 7,000,161 B1 | 2/2006 | Allen et al. |
| 7,007,096 B1 | 2/2006 | Lisitsa et al. |
| 7,010,667 B2 | 3/2006 | Vorbach et al. |
| 7,038,952 B1 | 5/2006 | Zack et al. |
| 7,210,129 B2 | 4/2007 | May et al. |
| 7,216,204 B2 | 5/2007 | Rosenbluth et al. |
| 7,237,087 B2 | 6/2007 | Vorbach et al. |
| 7,249,351 B1 | 7/2007 | Songer et al. |
| 7,254,649 B2 | 8/2007 | Subramanian et al. |
| 7,340,596 B1 | 3/2008 | Crosland et al. |
| 7,350,178 B1 | 3/2008 | Crosland et al. |
| 2001/0001860 A1 | 5/2001 | Beiu |
| 2001/0010074 A1 | 7/2001 | Nishihara et al. |
| 2001/0018733 A1 | 8/2001 | Fujii et al. |
| 2001/0032305 A1 | 10/2001 | Barry |
| 2002/0013861 A1 | 1/2002 | Adiletta et al. |
| 2002/0038414 A1 | 3/2002 | Taylor |
| 2002/0045952 A1 | 4/2002 | Blemel |
| 2002/0083308 A1 | 6/2002 | Pereira et al. |
| 2002/0103839 A1 | 8/2002 | Ozawa |
| 2002/0124238 A1 | 9/2002 | Metzgen |
| 2002/0138716 A1 | 9/2002 | Master et al. |
| 2002/0143505 A1 | 10/2002 | Drusinsky |
| 2002/0144229 A1 | 10/2002 | Hanrahan |
| 2002/0165886 A1 | 11/2002 | Lam |
| 2003/0001615 A1 | 1/2003 | Sueyoshi et al. |
| 2003/0014743 A1 | 1/2003 | Cooke et al. |
| 2003/0046607 A1 | 3/2003 | May et al. |
| 2003/0052711 A1 | 3/2003 | Taylor |
| 2003/0055861 A1 | 3/2003 | Lai et al. |
| 2003/0056085 A1 | 3/2003 | Vorbach |
| 2003/0056091 A1 | 3/2003 | Greenberg |
| 2003/0056202 A1 | 3/2003 | May et al. |

| | | | | | | |
|---|---|---|---|---|---|---|
| 2003/0061542 | A1 | 3/2003 | Bates et al. | JP | 08069447 | 3/1996 |
| 2003/0062922 | A1 | 4/2003 | Douglass et al. | JP | 8-102492 | 4/1996 |
| 2003/0086300 | A1 | 5/2003 | Noyes et al. | JP | 8-221164 | 8/1996 |
| 2003/0093662 | A1 | 5/2003 | Vorbach et al. | JP | 8-250685 | 9/1996 |
| 2003/0097513 | A1 | 5/2003 | Vorbach et al. | JP | 9-27745 | 1/1997 |
| 2003/0123579 | A1 | 7/2003 | Safavi et al. | JP | 11-307725 | 11/1999 |
| 2003/0135686 | A1* | 7/2003 | Vorbach et al. ............. 710/317 | JP | 2000-076066 | 3/2000 |
| 2003/0192032 | A1 | 10/2003 | Andrade et al. | JP | 2000-181566 | 6/2000 |
| 2004/0015899 | A1 | 1/2004 | May et al. | JP | 2000-201066 | 7/2000 |
| 2004/0025005 | A1 | 2/2004 | Vorbach et al. | JP | 2000-311156 | 11/2000 |
| 2004/0168099 | A1 | 8/2004 | Vorbach et al. | JP | 2001-500682 | 1/2001 |
| 2004/0199688 | A1 | 10/2004 | Vorbach et al. | JP | 05-509184 | 12/2003 |
| 2005/0144210 | A1 | 6/2005 | Simkins et al. | WO | WO90/04835 | 5/1990 |
| 2005/0144212 | A1 | 6/2005 | Simkins et al. | WO | WO90/11648 | 10/1990 |
| 2005/0144215 | A1 | 6/2005 | Simkins et al. | WO | WO92/01987 | 2/1992 |
| 2006/0230094 | A1 | 10/2006 | Simkins et al. | WO | WO93/11503 | 6/1993 |
| 2006/0230096 | A1 | 10/2006 | Thendean et al. | WO | WO94/06077 | 3/1994 |

FOREIGN PATENT DOCUMENTS

| | | | | | |
|---|---|---|---|---|---|
| DE | 44 16 881 | 11/1994 | WO | WO94/08399 | 4/1994 |
| DE | 38 55 673 | 11/1996 | WO | WO95/00161 | 1/1995 |
| DE | 196 51 075 | 6/1998 | WO | WO95/26001 | 9/1995 |
| DE | 196 54 593 | 7/1998 | WO | WO98/10517 | 3/1998 |
| DE | 196 54 595 | 7/1998 | WO | WO98/26356 | 6/1998 |
| DE | 196 54 846 | 7/1998 | WO | WO98/28697 | 7/1998 |
| DE | 197 04 044 | 8/1998 | WO | WO98/29952 | 7/1998 |
| DE | 197 04 728 | 8/1998 | WO | WO98/31102 | 7/1998 |
| DE | 197 04 742 | 9/1998 | WO | WO98/35294 | 8/1998 |
| DE | 198 22 776 | 3/1999 | WO | WO98/35299 | 8/1998 |
| DE | 198 07 872 | 8/1999 | WO | WO99/00731 | 1/1999 |
| DE | 198 61 088 | 2/2000 | WO | WO99/00739 | 1/1999 |
| DE | 199 26 538 | 12/2000 | WO | WO99/12111 | 3/1999 |
| DE | 100 28 397 | 12/2001 | WO | WO99/32975 | 7/1999 |
| DE | 100 36 627 | 2/2002 | WO | WO99/40522 | 8/1999 |
| DE | 101 29 237 | 4/2002 | WO | WO99/44120 | 9/1999 |
| DE | 102 04 044 | 8/2003 | WO | WO99/44147 | 9/1999 |
| EP | 0 208 457 | 1/1987 | WO | WO00/17771 | 3/2000 |
| EP | 0 221 360 | 5/1987 | WO | WO00/38087 | 6/2000 |
| EP | 0 398 552 | 11/1990 | WO | 2000/045282 | 8/2000 |
| EP | 0 428 327 | 5/1991 | WO | WO00/49496 | 8/2000 |
| EP | 0 463 721 | 1/1992 | WO | WO00/77652 | 12/2000 |
| EP | 0 477 809 | 4/1992 | WO | WO01/55917 | 8/2001 |
| EP | 0 485 690 | 5/1992 | WO | WO02/13000 | 2/2002 |
| EP | 0 497 029 | 8/1992 | WO | WO02/21010 | 3/2002 |
| EP | 0 539 595 | 5/1993 | WO | WO02/29600 | 4/2002 |
| EP | 0 628 917 | 12/1994 | WO | WO02/50665 | 6/2002 |
| EP | 0 678 985 | 10/1995 | WO | WO02/071196 | 9/2002 |
| EP | 0 686 915 | 12/1995 | WO | WO02/071248 | 9/2002 |
| EP | 0 707 269 | 4/1996 | WO | WO02/071249 | 9/2002 |
| EP | 0 726 532 | 8/1996 | WO | WO02/103532 | 12/2002 |
| EP | 0 735 685 | 10/1996 | WO | WO03/017095 | 2/2003 |
| EP | 0 835 685 | 10/1996 | WO | WO03/023616 | 3/2003 |
| EP | 0 746 106 | 12/1996 | WO | WO03/025781 | 3/2003 |
| EP | 0 748 051 | 12/1996 | WO | WO03/032975 | 4/2003 |
| EP | 0 926 594 | 6/1999 | WO | WO03/036507 | 5/2003 |
| EP | 1 102 674 | 7/1999 | WO | WO 2004/053718 | 6/2004 |
| EP | 1 061 439 | 12/2000 | WO | WO2004/114128 | 12/2004 |
| EP | 1 102 674 | 5/2001 | WO | WO2005/045692 | 5/2005 |
| EP | 1 115 204 | 7/2001 | | | |
| EP | 1 146 432 | 10/2001 | | | |
| EP | 0 696 001 | 12/2001 | | | |
| EP | 1 669 885 | 6/2006 | | | |
| FR | 2 752 466 | 2/1998 | | | |
| GB | 2 304 438 | 3/1997 | | | |
| JP | 58-58672 | 4/1983 | | | |
| JP | 2-130023 | 5/1990 | | | |
| JP | 2-226423 | 9/1990 | | | |
| JP | 5-276007 | 10/1993 | | | |
| JP | 6-266605 | 9/1994 | | | |
| JP | 7-154242 | 6/1995 | | | |
| JP | 8-148989 | 6/1995 | | | |
| JP | 8-44581 | 2/1996 | | | |

OTHER PUBLICATIONS

Ade, et al., "Minimum Memory Buffers in DSP Applications," Electronics Letters, vol. 30. No. 6, Mar. 17, 1994, pp. 469-471.

Alippi, et al., "Determining the Optimum Extended Instruction Set Architecture for Application Specific Reconfigurable VLIW CPUs," IEEE, 2001, pp. 50-56.

Arabi, et al., "PLD Integrates Dedicated High-speed Data Buffering, Complex State machine, and Fast Decode Array," conference record on WESCON '93, Sep. 28, 1993, pp. 432-436.

Athanas, "A Functional Reconfigurable Architecture and Compiler for Adoptive Computing," IEEE 1993, pp. 49-55.

Athanas, et al., "An Adaptive Hardware Machine Architecture and Compiler for Dynamic Processor Reconfigufation," IEEE, Laboratory for Engineering man/Machine Systems Division of Engineering, Box D, Brown University, Providence, Rhode Island, 1991, pp. 397-400.

Beck et al., "From control flow to data flow," TR 89-1050, Oct. 1989, Dept. of Computer Science, Cornell University, Ithaca, NY, pp. 1- 25.

Becker, J. et al., "Parallelization in Co-compilation for Configurable Accelerators—a Host/accelerator Partitioning Compilation Method," Poceedings of Asia and South Pacific Design Automation Conference, Yokohama, Japan, Feb. 10-13, 1998, 11 pages.

Bittner, "Wormhole Run-time Reconfiguration: Conceptualization and VLSI Design of a High Performance Computing System," Dissertation, Jan. 23, 1997, pp. I-XX, 1-415.

Cadambi, et al., "Managing Pipeline-reconfigurable FPGAs," ACM, 1998, pp. 55-64.

Callahan, et al., "The Garp Architecture and C Compiler," Computer, Apr. 2000, pp. 62-69.

Cardoso, Joao M.P. and Markus Weinhardt, "XPP-VC: A C Compiler with Temporal Partitioning for the PACT-XPP Architecture," Field-Programmable Logic and Applications. Reconfigurable Computing is Going Mainstream, 12$^{th}$ International Conference FPL 2002, Proceedings (Lecture Notes in Computer Science, vol. 2438) Springer-Verlag Berlin, Germany, 2002, pp. 864-874.

Cardoso, J.M.P. "Compilation of Java™ Algorithms onto Reconfigurable Computing Systems with Exploitation of Operation-Level Parallelism," Ph.D. Thesis, Universidade Tecnica de Lisboa (UTL), Lisbon, Portugal Oct. 2000 (Table of Contents and *English Abstract only*).

Chen et al., "A reconfigurable multiprocessor IC for rapid prototyping of algorithmic-specific high-speed DSP data paths," IEEE Journal of Solid-State Circuits, vol. 27, No. 12, Dec. 1992, pp. 1895-1904.

DeHon, A., "DPGA Utilization and Application," MIT Artificial Intelligence Laboratory, Proceedings of the Fourth International ACM Symposium on Field-Programmable Gate Arrays (FPGA '96), IEEE Computer Society, pp. 1-7.

Diniz, P., et al., "Automatic Synthesis of Data Storage and Control Structures for FPGA-based Computing Engines," 2000, IEEE, pp. 91-100.

Donandt, "Improving Response Time of Programmable Logic Controllers by use of a Boolean Coprocessor," AEG Research Institute Berlin, IEEE, 1989, pp. 4-167-4-169.

Dutt, et al., "If Software is King for Systems-in-Silicon, What's New in Compiler?," IEEE, 1997, pp. 322-325.

Ferrante, J. et al., "The Program Dependence Graph and its Use in Optimization ACM Transactions on Programming Languages and Systems," Jul. 1987, USA, [online] Bd. 9, Nr., 3, pp. 319-349, XP002156651 ISSN: 0164-0935 ACM Digital Library.

Fineberg, S, et al., "Experimental Analysis of a Mixed-Mode Parallel Architecture Using Bitonic Sequence Sorting," Journal of Parallel and Distributed Computing, vol. 11, No. 3, Mar. 1991, pp. 239-251.

Forstner, "Wer Zuerst Kommt, Mahlt Zuerst!: Teil 3: Einsatzgebiete und Anwendungbeispiele von FIFO-Speichern," Elektronik, Aug. 2000, pp. 104-109.

Franklin, Manoj et al., "A Fill-Unit Approach to Multiple Instruction Issue," Proceedings of the Annual International Symposium on Microarchitecture, Nov. 1994, pp. 162-171.

Gokhale, M.B.et al., "Automatic Allocation of Arrays to Memories in FPGA processors with Multiple Memory Banks," Field-Programmable Custom Computing Machines, 1999, IEEE, pp. 63-67.

Hammes, Jeff et al., "Cameron: High Level Language Compilation for Reconfigurable Systems," Department of Computer Science, Colorado State University, Conference on Parallel Architectures and Compilation Techniques, Oct. 12-16, 1999, 9 pages.

Hartenstein, R., "Coarse grain reconfigurable architectures," Design Automation Conference, 2001, Proceedings of the ASP-DAC 2001 Asia and South Pacific, Jan. 30-Feb. 2, 2001, IEEE Jan. 30, 2001, pp. 564-569.

Hastie et al., "The implementation of hardware subroutines on field programmable gate arrays," Custom Integrated Circuits Conference, 1990, Proceedings of the IEEE 1990, May 16, 1990, pp. 31.3.1-31. 4.3 (3 pages).

Hauck, "The Roles of FPGAs in Reprogrammable Systems," IEEE, Apr. 1998, pp. 615-638.

Hauser, J.R., et al., "Garp: A MIPS Processor with a Reconfigurable Coprocessor," University of California, Berkeley, IEEE, 1997, pp. 24-33.

Hedge, S.J., "3D WASP Devices for On-line Signal and Data Processing," 1994, International Conference on Wafer Scale Integration, pp. 11-21.

Hwang, L. et al., "Min-cut Replication in Partitioned Networks," IEEE Transactions on Computer-Aided Design of Integrated Circuits and Systems, [online] Bd. 14, Nr. 1, Jan. 1995, pp. 96-106, XP00053228 USA ISSN: 0278-0070 IEEE Xplore.

Iseli, C.,et al. "A C++ Compiler for FPGA Custom Execution Units Synthesis," IEEE, 1995, pp. 173-179.

Isshiki, Tsuyoshi, et al., "Bit-Serial Pipeline Synthesis for Multi-FPGA Systems with C++ Design Capture," 1996 IEEE, pp. 38-47.

Jacob, J., et al., "Memory Interfacing and Instruction Specification for Reconfigurable Processors," ACM 1999, pp. 145-154.

Jantsch, Axel et al., "A Case Study on Hardware/Software Partitioning," Royal Institute of Technology, Kista, Sweden, Apr. 10, 1994, IEEE, pp. 111-118.

John, L., et al., "A Dynamically Reconfigurable Interconnect for Array Processors," vol. 6, No. 1, Mar. 1998, IEEE, pp. 150-157.

Kastrup, B., "Automatic Hardware Synthesis for a Hybrid Reconfigurable CPU Featuring Philips CPLDs," Proceedings of the PACT Workshop on Reconfigurable Computing, 1998, pp. 5-10.

Koch, A., et al., "Practical Experiences with the SPARXIL Co-Processor," 1998, IEEE, pp. 394-398.

Koren et al., "A data-driven VLSI array for arbitrary algorithms," IEEE Computer Society, Long Beach, CA vol. 21, No. 10, Oct. 1, 1988, pp. 30-34.

Kung, "Deadlock Avoidance for Systolic Communication," 1988 Conference Proceedings of the 15$^{th}$ Annual International Symposium on Computer Architecture, May 30, 1998, pp. 252-260.

Lee, Jong-eun et al., "Reconfigurable ALU Array Architecture with Conditional Execution," International Soc. Design Conference (ISOOC) [online] Oct. 25, 2004, Seoul, Korea, 5 pages.

Ling, X., "WASMII: An MPLD with Data-Driven Control on a Virtual Hardware," Journal of Supercomputing, Kluwer Acdemic Publishers, Dordrecht, Netherlands, 1995, pp. 253-276.

Ling et al., "WASMII: A Multifunction Programmable Logic Device (MPLD) with Data Driven Control," The Transactions of the Institute of Electronics, Information and Communication Engineers, Apr. 25, 1994, vol. J77-D-1, Nr. 4, pp. 309-317. [This references is in Chinese, but should be comparable in content to the Ling et al. reference above].

Mano, M.M., "Digital Design," by Prentice Hall, Inc., Englewood Cliffs, New Jersey 07632, 1984, pp. 119-125, 154-161.

Maxfield,C., "Logic that Mutates While-U-Wait," EDN (Bur. Ed) (USA), EDN (European Edition), Nov. 7, 1996, Cahners Publishing, USA, pp. 137-140, 142.

Miller, M.J., et al., "High-Speed FIFOs Contend with Widely Differing Data Rates: Dual-port RAM Buffer and Dual-pointer System Provide Rapid, High-density Data Storage and Reduce Overhead," Computer Design, Sep. 1, 1985, pp. 83-86.

Mirsky, E. DeHon, "MATRIX: A Reconfigurable Computing Architecture with Configurable Instruction Distribution and Deployable Resources," Proceedings of the IEEE Symposium on FPGAs for Custom Computing Machines, 1996, pp. 157-166.

Myers, G. "Advances in Computer Architecture," Wiley-Interscience Publication, 2nd ed., John Wiley & Sons, Inc., 1978, pp. 463-494.

Nilsson, et al., "The Scalable Tree Protocol—A Cache Coherence Approaches for Large-Scale Multiprocessors," IEEE, pp. 498-506, Dec. 1992.

Norman, R.S., "Hyperchip Business Summary, The Opportunity," Jan. 31, 2000, pp. 1-3.

Ozawa, Motokazu et al., "A Cascade ALU Architecture for Asynchronous Super-Scalar Processors," IEICE Transactions on Electronics, Electronics Society, Tokyo, Japan, vol. E84-C, No. 2, Feb. 2001, pp. 229-237.

Piotrowski, A., "IEC-BUS, Die Funktionsweise des IEC-Bus unde seine Anwendung in Geräten und Systemen," 1987, Franzis-Verlag GmbH, München, pp. 20-25.

Razdan et al., A High-Performance Microarchitecture with Hardware-Programmable Functional Units, Micro-27, Proceedings of the 27th Annual International Symposium on Microarchitecture, IEEE Computer Society and Association for Computing Machinery, Nov. 30-Dec. 2, 1994, pp. 172-180.

Saleeba, M. "A Self-Contained Dynamically Reconfigurable Processor Architecture," Sixteenth Australian Computer Science Conference, ASCS-16, QLD, Australia, Feb. 1993, pp. 59-70.

Shirazi, et al., "Quantitative analysis of floating point arithmetic on FPGA based custom computing machines," IEEE Symposium on FPGAs for Custom Computing Machines, *IEEE Computer Society Press*, Apr. 19-21, 1995, pp. 155-162.

Siemers, C.,"Rechenfabrik Ansaetze Fuer Extrem Parallele Prozessoren," Verlag Heinze Heise GmbH., Hannover, DE No. 15, Jul. 16, 2001, pp. 170-179.

Siemers et al., "The .>S<puter: A Novel Micoarchitecture Mode for Execution inside Superscalar and VLIW Processors Using Reconfigurable Hardware," Australian Computer Science Communications, vol. 20, No. 4, Computer Architecture, Proceedings of the 3rd Australian Computer Architecture Conference, Perth, John Morris, Ed., Feb. 2-3, 1998, pp. 169-178.

Skokan, Z.E., "Programmable logic machine (A programmable cell array)," IEEE Journal of Solid-State Circuits, vol. 18, Issue 5, Oct. 1983, pp. 572-578.

Sueyoshi, T, "Present Status and Problems of the Reconfigurable Computing Systems Toward the Computer Evolution," Department of Artificial Intelligence, Kyushi Institute of Technology, Fukuoka, Japan; Institute of Electronics, Information and Communication Engineers, vol. 96, No. 426, IEICE Technical Report (1996), pp. 111-119, [English Abstract Only].

Tau, E., et al., "A First Generation DPGA Implementation," *FPD'95*, pp. 138-143.

Tenca, A.F., et al., "A Variable Long-Precision Arithmetic Unit Design for Reconfigurable Coprocessor Architectures," University of California, Los Angeles, 1998, pp. 216-225.

The XPP White Paper, Release 2.1, PACT—A Technical Perspective, Mar. 27, 2002, pp. 1-27.

TMS320C54X DSP: CPU and Peripherals, Texas Instruments, 1996, 25 pages.

TMS320C54x DSP: Mnemonic Instruction Set, Texas Instruments, 1996, 342 pages.

Villasenor, et al., "Configurable Computing Solutions for Automatic Target Recognition," *IEEE*, 1996 pp. 70-79.

Villasenor, et al., "Configurable Computing," *Scientific American*, vol. 276, No. 6, Jun. 1997, pp. 66-71.

Villasenor, et al., "Express Letters Video Communications Using Rapidly Reconfigurable Hardware," IEEE Transactions on Circuits and Systems for Video Technology, IEEE, Inc., NY, Dec. 1995, pp. 565-567.

Wada, et al., "A Performance Evaluation of Tree-based Coherent Distributed Shared Memory," Proceedings of the Pacific RIM Conference on Communications, Comput and Signal Processing, Victoria, May 19-21, 1993, pp. 390-393.

Weinhardt, M., "Compilation Methods for Structure-programmable Computers," dissertation, ISBN 3-89722-011-3, 1997. [Table of Contents and English Abstract Provided].

Weinhardt, Markus et al., "Pipeline Vectorization for Reconfigurable Systems," 1999, IEEE, pp. 52-62.

Weinhardt, Markus et al., "Pipeline Vectorization," IEEE Transactions on Computer-Aided Design of Integrated Circuits and Systems, vol. 20, No. 2, Feb. 2001, pp. 234-248.

Wittig, et al., "OneChip: An FPGA Processor with Reconfigurable Logic," IEEE, 1996, pp. 126-135.

Wu, et al., "A New Cache Directory Scheme," IEEE, pp. 466-472, Jun. 1996.

Xu, H.Y. et al., "Parallel QR Factorization on a Block Data Flow Architecture," Conference Proceeding Article, Mar. 1, 1992, pp. 332-336 XPO10255276, p. 333, Abstract 2.2, 2.3, 2.4—p. 334.

Xilinx, "Logic Cell Array Families: XC4000, XC4000A and XC4000H," product description, pp. 2-7, 2-9, 2-14, 2-15, 8-16, and 9-14.

Ye, Z.A. et al., "A C-Compiler for a Processor With a Reconfigurable Functional Unit," FPGA 2000 ACM/SIGNA International Symposium on Field Programmable Gate Arrays, Monterey, CA Feb. 9-11, 2000, pp. 95-100.

Yeung, A. et al., "A data-driven architecture for rapid prototyping of high throughput DSP algorithms," Dept. of Electrical Engineering and Computer Sciences, Univ. of California, Berkeley, USA, *Proceedings VLSI Signal Processing Workshop, IEEE Press*, pp. 225-234, Napa, Oct. 1992.

Yeung, A. et al., "A reconfigurable data-driven multiprocessor architecture for rapid prototyping of high throughput DSP algorithms," Dept. of Electrical Engineering and Computer Sciences, Univ. of California, Berkeley, USA, pp. 169-178, *IEEE* 1993.

Baumgarte, V., et al., PACT XPP, "A Self-reconfigurable Data Processing Architecture," PACT Info. GMBH, Munchen Germany 2001.

Zhang, N. Et al., Architectural Evaluation of Flexible Digital Signal Processing for Wireless Receivers, Signals, Systems and Computers, 2000; Conference Record of the Thirty-Fourth Asilomar Conference, Bd.1, Oct. 29, 2000, pp. 78-83.

Fornaciari, W. Et al., System-level power evaluation metrics, 1997 Proceedings of the 2nd Annual IEEE International Conference on Innovative Systems in Silicon, New York, NY, Oct. 1997, pp. 323-330.

Schmit, H. Et al., Hidden Markov Modeling and Fuzzy Controllers in FPGAs, FPGAs for Custom Computing Machined, 1995; Proceedings, IEEE Symposium on Napa Valley, CA, Apr. 1995, pp. 214-221.

Simunic, T. Et al., Source Code Optimization and Profiling of Energy Consumation in Embedded Systems, Proceedings of the 13th International Symposium on System Synthesis, Sep. 2000, pp. 193-198.

Abnous et al., "Ultra-Low-Power Domain-Specific Multimedia Processors," U.C. Berkeley, 1996 IEEE, pp. 461-470.

Albahama, O.T. et al., "On the Viability of FPGA-Based Integrated Coprocessors," Dept. of Electrical and Electronic Engineering, Imperial College of Science, London, 1999 IEEE, pp. 206-215.

Altera, "Flex 8000 Programmable Logic Device Family," Altera Corporation product description, Jan. 2003, pp. 1-62.

Altera, "Flex 10K Embedded Programmable Logic Device Family," Altera Corporation product description, Jan. 2003, pp. 1-128.

Athanas et al., "Processor Reconfiguration Through Instruction-Set Metamorphosis," 1993, IEEE Computers, pp. 11-18.

Atmel, 5-K-50K Gates Coprocessor FPGA with Free Ram, Data Sheet, Jul. 2006, 55 pages.

Atmel, FPGA-based FIR Filter Application Note, Sep. 1999, 10 pages.

Atmel, "An Introduction to DSP Applications using the AT4OK FPGA," FPGA Application Engineering, San Jose, CA, Apr. 2004, 15 pages.

Atmel, Configurable Logic Design & Application Book, Atmel Corporation, 1995, pp. 2-19 through 2-25.

Atmel, Field Programmable Gate Array Configuration Guide, AT6000 Series Configuration Data Sheet, Sep. 1999, pp. 1-20.

Bacon, D. et al., "Compiler Transformations for High-Performance Computing," ACM Computing Surveys, 26(4):325-420 (1994).

Bakkes, P.J., et al., "Mixing Fixed and Reconfigurable Logic for Array Processing," Dept. of Electrical and Electronic Engineering, University of Stellenbosch, South Africa, 1996 IEEE, pp. 118-125.

Becker, J. et al., "Architecture, Memory and Interface Technology Integration of an Industrial/Academic Configurable System-on-Chip (CSoC)," IEEE Computer Society Annual Workshop on VLSI (WVLSI 2003), (Feb. 2003).

Becker, J., "Configurable Systems-on-Chip (CSoC)," (Invited Tutorial), Proc. of 9th Proc. of XV Brazilian Symposium on Integrated Circuit, Design (SBCCI 2002), (Sep. 2002).

Becker et al., "Automatic Parallelism Exploitation for FPL-Based Accelerators." 1998, Proc. 31st Annual Hawaii International Conference on System Sciences, pp. 169-178.

Bratt, A, "Motorola field programmable analogue arrays, present hardware and future trends," Motorola Programmable Technology Centre, Gadbrook Business Centre, Northwich, Cheshire, 1998, The Institute of Electrical Engineers, IEE. Savoy Place, London, pp. 1-5.

Cardoso, J.M.P. et al., "A novel algorithm combining temporal partitioning and sharing of functional units," University of Algarve, Faro, Portugal, 2001 IEEE, pp. 1-10.

Cardoso, J.M.P. et al., "Compilation and Temporal Partitioning for a Coarse-Grain Reconfigurable Architecture," Lysacht, P. & Rosentiel, W. eds., "New Algorithms, Architectures and Applications for Reconfigurable Computing," (2005) pp. 105-115.

Cardoso, J.M.P. et al., "Macro-Based Hardware Compilation of Java™ Bytecodes into a Dynamic Reconfigurable Computing System," Field-Programmable Custom Computing Machines (1999) FCCM '99. Proceedings. Seventh Annual IEEE Symposium on NAPA Valley, CA, USA. Apr. 21-23, 1999, IEEE Comput. Soc, US, (Apr. 21, 1999) pp. 2-11.

Clearspeed, CSX Processor Architecture, Whitepaper, PN-1110-0702, 2007, pp. 1-15, www.clearspeed.com.

Clearspeed, CSX Processor Architecture, Whitepaper, PN-1110-0306, 2006, pp. 1-14, www.clearspeed.com.

Compton, K. et al., "Configurable Computing: A Survey of Systems and Software," Northwestern University, Dept. of ECE, Technical Report, 1999, (XP-002315148), 39 pages.

Cook, Jeffrey J., "The Amalgam Compiler Infrastructure," Thesis at the University of Illinois at Urbana-Champaign (2004) Chapter 7 & Appendix G.

Cronquist, D. et al., 'Architecture Design of Reconfigurable Pipelined Datapaths, Department of Computer Science and Engineering, University of Washington, Seattle, WA, Proceedings of the $20^{th}$ Anniversary Conference on Advanced Research in VSLI, 1999, pp. 1-15.

DeHon, Andre, "Reconfigurable Architectures for General-Purpose Computing," Massachusetts Institute of Technology, Technical Report AITR-1586, Oct. 1996, XP002445054, Cambridge, MA, pp. 1-353.

Diniz, P., et al., "A behavioral synthesis estimation interface for configurable computing," University of Southern California, Marina Del Rey, CA, 2001 IEEE, pp. 1-2.

Ebeling, C. et al., "Mapping Applications to the RaPiD Configurable Architecture," Department of Computer Science and Engineering, University of Washington, Seattle, WA, *FPGAs for Custom Computing Machines, 1997. Proceedings., The 5th Annual IEEE Symposium*, Publication Date: Apr. 16-18, 1997, 10 pages.

Equator, Pixels to Packets, Enabling Multi-Format High Definition Video, Equator Technologies BSP-15 Product Brief, www.equator.com, 2001, 4 pages.

Fawcett, B.K., "Map, Place and Route: The Key to High-Density PLD Implementation," Wescon Conference, IEEE Center (Nov. 7, 1995) pp. 292-297.

Freescale Slide Presentation, An Introduction to Motorola's RCF (Reconfigurable Compute Fabric) Technology, Presented by Frank David, Launched by Freescale Semiconductor, Inc., 2004, 39 pages.

Genius, D. et al., "A Case for Array Merging in Memory Hierarchies," Proceedings of the 9th International Workshop on Compilers for Parallel Computers, CPC'01 (Jun. 2001), 10 pages.

Hartenstein, R. et al., "A new FPGA architecture for word-oriented datapaths," Proc. FPL'94, Springer LNCS, Sep. 1994, pp. 144-155.

Hendrich, N., et al., "Silicon Compilation and Rapid Prototyping of Microprogrammed VLSI-Circuits with MIMOLA and SOLO 1400," Microprocessing & Microprogramming (Sep. 1992) vol. 35(1-5), pp. 287-294.

Hwang, K., "Advanced Computer Architecture—Parallelism, Scalability, Programmability," 1993, McGraw-Hill, Inc., pp. 348-355.

Hwang, K., "Computer Architecture and Parallel Processing," Data Flow Computers and VLSI Computations, XP-002418655, 1985 McGraw-Hill, Chapter I 0, pp. 732-807.

IBM Technical Disclosure Bulletin, IBM Corp., New York, XP000424878, Bd. 36, Nr. 11, Nov. 1, 1993, pp. 335-336.

Inside DSP, "Ambric Discloses Massively Parallel Architecture," Aug. 23, 2006, HTTP://insidedsp.com/tabid/64/articleType/ArticleView/articleId/155/Defa..., 2 pages.

Intel, Intel MXP5800/MXP5400 Digital Media Processors, Architecture Overview, Jun. 2004, Revision 2.4, pp. 1-14.

Kaul, M., et al., "An automated temporal partitioning and loop fission approach of FPGA based reconfigurable synthesis of DSP applications," University of Cincinnati, Cincinnati, OH, ACM 1999, pp. 616-622.

Kean, T.A., "Configurable Logic: A Dynamically Programmable Cellular Architecture and its VLSI Implementation," University of Edinburgh (Dissertation) 1988, pp. 1-286.

Kean, T., et al., "A Fast Constant Coefficient Multiplier for the XC6200," Xilinx, Inc., Lecture Notes in Computer Science, vol. 1142, Proceedings of the $6^{th}$ International Workshop of Field-Programmable Logic, 1996, 7 pages.

Kim et al., "A Reconfigurable Multifunction Computing Cache Architecture," IEEE Transactions on Very Large Scale Integration (VLSI) Systems vol. 9, Issue 4, Aug. 2001 pp. 509-523.

Knittel, Gunter, "A PCI-compatible FPGA-Coprocessor for 2D/3D Image Processing," University of Turgingen, Germany, 1996 IEEE, pp. 136-145.

Koch, Andreas et al., "High-Level-Language Compilation for Reconfigurable Computers," Proceedings of European Workshop on Reconfigurable Communication-Centric SOCS (Jun. 2005) 8 pages.

Larsen, S. et al., "Increasing and Detecting Memory Address Congruence," Proceedings of the 2002 IEEE International Conference on Parallel Architectures and Compilation Techniques (PACT'02), pp. 1-12 (Sep. 2002).

Lee et al., "A new distribution network based on controlled switching elements and its applications," IEEE/ACT Trans. of Networking, vol. 3, No. 1, pp. 70-81, Feb. 1995.

Margolus, N., "An FPGA architecture for DRAM-based systolic computations," Boston University Center for Computational Science and MIT Artificial Intelligence Laboratory, IEEE 1997, pp. 2-11.

Mei, Bingfeng, "A Coarse-Grained Reconfigurable Architecture Template and Its Compilation Techniques," Katholeike Universiteit Leuven, PhD Thesis, Jan. 2005, IMEC vzw, Universitair Micro-Electronica Centrum, Belgium, pp. 1-195 (and Table of Contents).

Mei, Bingfeng, et al., "Design and Optimization of Dynamically Reconfigurable Embedded Systems," IMEC vzw, 2003, Belgium, 7 pages, http://www.imec.be/reconfigurable/pdf/ICERSA_01_design.pdf.

Miyamori, T. et al., "REMARC: Reconfigurable Multimedia Array Coprocessor," Computer Systems Laboratory, Stanford University, IEICE Transactions on Information and Systems E Series D, 1999; (abstract): Proceedings of the 1998 ACM/SIGDA sixth international symposium on Field programmable gate arrays, p. 261, Feb. 22-25, 1998, Monterey, California, United States, pp. 1-12.

Moraes, F., et al., "A Physical Synthesis Design Flow Based on Virtual Components," XV Conference on Design of Circuits and Integrated Systems (Nov. 2000) 6 pages.

Muchnick, S., "Advanced Compiler Design and Implementation" (Morgan Kaufmann 1997), Table of Contents, 11 pages.

Murphy, C., "Virtual Hardware Using Dynamic Reconfigurable Field Programmable Gate Arrays," Engineering Development Centre, Liverpool John Moores University, UK, GERI Annual Research Symposium 2005, 8 pages.

Nageldinger, U., "Design-Space Exploration for Coarse Grained Reconfigurable Architectures," (Dissertation) Universitaet Kaiserslautern, 2000, Chapter 2, pp. 19-45.

Neumann, T., et al., "A Generic Library for Adaptive Computing Environments," Field Programmable Logic and Applications, $11^{th}$ International Conference, FPL 2001, Proceedings (Lecture Notes in Computer Science, vol. 2147) (2001) pp. 503-512.

Olukotun, K., "The Case for a Single-Chip Microprocessor," ACM Sigplan Notices, ACM, Association for Computing Machinery, New York, vol. 31, No. 9, Sep. 1996 pp. 2-11.

Pact Corporation, "The XPP Communication System," Technical Report 15 (2000), pp. 1-16.

Parhami, B., "Parallel Counters for Signed Binary Signals," Signals, Systems and Computers, 1989, Twenty-Third Asilomar Conference, vol. I, pp. 513-516.

Quenot, G.M., et al., "A Reconfigurable Compute Engine for Real-Time Vision Automata Prototyping," Laboratoire Systeme de Perception, DGA/Etablissement Technique Central de l'Armement, France, 1994 IEEE, pp. 91-100.

Saleeba, Z.M.G., "A Self-Reconfiguring Computer System," Department of Computer Science, Monash University (Dissertation) 1998, pp. 1-306.

Schmidt, H. et al., "Behavioral synthesis for FGPA-based computing," Carnegie Mellon University, Pittsburgh, PA, 1994 IEEE, pp. 125-132.

Schönfeld, M., et al., "The LISA Design Environment for the Synthesis of Array Processors Including Memories for the Data Transfer and Fault Tolerance by Reconfiguration and Coding Techniques," J. VLSI Signal Processing Systems for Signal, Image, and Video Technology, (Oct. 1, 1995) vol. 11(1/2), pp. 51-74.

Shin, D., et al., "C-based Interactive RTL Design Methodology," Technical Report CECS-03-42 (Dec. 2003) pp. 1-16.

Singh, H. et al., "MorphoSys: An Integrated Reconfigurable System for Data-Parallel Computation-Intensive Applications," University of California, Irvine, CA. and Federal University of Rio de Janeiro, Brazil, 2000, IEEE Transactions on Computers, pp. 1-35.

Sondervan, J., "Retiming and logic synthesis," Electronic Engineering (Jan. 1993) vol. 65(793), pp. 33, 35-36.

Soni, M., "VLSI Implementation of a Wormhole Run-time Reconfigurable Processor," Jun. 2001, (Masters Thesis)Virginia Polytechnic Institute and State University, 88 pages.

Sutton et al., "A Multiprocessor DSP System Using PADDI-2," U.C. Berkeley, 1998 ACM, pp. 62-65.

Tsutsui, A., et al., "YARDS: FPGA/MPU Hybrid Architecture for Telecommunication Data Processing," NTT Optical Network Systems Laboratories, Japan, 1997 ACM, pp. 93-99.

Vasell et al., "The Function Processor: A Data-Driven Processor Array for Irregular Computations," Chalmers University of Technology, Sweden, pp. 1-21.

Waingold, E., et al., "Baring it all to software: Raw machines," IEEE Computer, Sep. 1997, at 86-93.

Weinhardt, Markus et al., "Memory Access Optimization for Reconfigurable Systems," IEEE Proceedings Computers and Digital Techniques, 48(3) (May 2001) pp. 1-16.

Wolfe, M. et al., "High Performance Compilers for Parallel Computing" (Addison-Wesley 1996) Table of Contents, 11 pages.

Xilinx, "Spartan and SpartanXL Families Field Programmable Gate Arrays," Jan. 1999, Xilinx, pp. 4-3 through 4-70.

Xilinx, "XC6200 Field Programmable Gate Arrays," Apr. 24, 1997, Xilinx product description, pp. 1-73.

Xilinx, "XC3000 Series Field Programmable Gate Arrays," Nov. 6, 1998, Xilinx product description, pp. 1-76.

Xilinx, "XC4000E and XC4000X Series Field Programmable Gate Arrays," May 14, 1999, Xilinx product description, pp. 1-68.

Xilinx, "Virtex-E 1.8 V Extended Memory Field Programmable Gate Arrays," Jul. 17, 2002, Xilinx Production Product Specification, pp. 1-118.

Xilinx, "Virtex-II and Virtex-II Pro X FPGA User Guide," Mar. 28, 2007, Xilinx user guide, pp. 1-559.

Zhang, et al., "A 1-V Heterogeneous Reconfigurable DSP IC for Wireless Baseband Digital Signal Processing," IEEE Journal of Solid-State Circuits, vol. 35, No. 11, Nov. 2000, pp. 1697-1704.

Zhang et al., "Abstract: Low-Power Heterogeneous Reconfigurable Digital Signal Processors with Energy-Efficient Interconnect Network," U.C. Berkeley (2004), pp. 1-120.

Zima, H. et al., "Supercompilers for parallel and vector computers" (Addison-Wesley 1991) Table of Contents, 5 pages.

Asari, et al., "FeRAM circuit technology for system on a chip," *Proceedings First NASA/DoD Workshop on Evolvable Hardware*, pp. 193-197 (1999).

Lee, et al., "Multimedia extensions for general-purpose processors," *IEEE Workshop on Signal Processing Systems, SIPS 97—Design and Implementation*, pp. 9-23 (1997).

Pirsch, et al., "VLSI implementations of image and video multimedia processing systems," *IEEE Transactions on Circuits and Systems for Video Technology* 8(7): 878-891 (Nov. 1998).

Salefski, et al., "Re-configurable computing in wireless," *Annual ACM IEEE Design Automation Conference: Proceedings of the 38$^{th}$ conference on Design automation*, pp. 178-183 (2001).

Schmidt, et al., "Datawave: A Single-Chip Multiprocessor for Video Applications," *IEEE Micro* 11(3): 22-25 and 88-94 (Jun. 1991).

Advanced RISC Machines, "Introduction to AMBA," Section 1, pp. 1-1 to 1-7 (Oct. 1996).

ARM, "The Architecture for the Digital World," http://www.arm.com/products, 3 pages. (Mar. 18, 2009).

ARM, "The Architecture for the Digital World; Milestones," http://www.arm.com/aboutarm/milestones.html, 5 pages (Mar. 18, 2009).

Del Corso, et al., "Microcomputer Buses and Links," Academic Press Inc. Ltd., pp. 138-143, 277-285 (1986).

"IEEE Standard Test Access Port and Boundary-Scan Architecture," IEEE Std. 1149.1-1990, pp. 1-127 (1993).

PCI Local Bus Specification, Production Version, Revision 2.1, Portland, OR, pp. 1-281 (Jun. 1, 1995).

"The Programmable Logic Data Book," Xilinx, Inc., Section 2, pp. 1-240, Section 8, pp. 1, 23-25, 29, 45-52, 169-172 (1994).

U.S. Appl. No. 60/109,417, filed Nov. 18, 1998, Jefferson et al.

\* cited by examiner

| x | x | x | x | x | x | x | x |
|---|---|---|---|---|---|---|---|
| x | x | x | x | x | x | x | x |
| b | b | b | x | x | x | x | x |
| a | a | a | x | x | x | x | x |
| a | a | a | x | x | x | x | x |
| a | a | x | x | x | x | x | x |
| x | x | x | x | x | x | x | x |
| x | x | x | x | x | x | x | x |

| | | | | | | | |
|---|---|---|---|---|---|---|---|
| | | | | | | | |
| | | | | | X | E | |
| | | | | | X | X | |
| | | | | | | | |
| | | | X | | | | |
| | 2 H0 V2 | | X | | | | |
| 2 H1 V1 | 1 H0 V1 | 2 H1 V1 | X | | | | |
| 1 H1 V0 | S | 1 H1 V0 | X | | | | |
| 2 H1 V1 | 1 H0 V1 | 2 H1 V1 | | | | | |

FIG. 6C

| | H1 V7 8 | H0 V7 7 | H1 V7 8 | H2 V7 9 | H3 V7 10 | H4 V7 11 | H5 V7 12 | |
|---|---|---|---|---|---|---|---|---|
| | H1 V6 7 | H0 V6 6 | H1 V6 7 | H2 V6 8 | H V6 9 | X | E | H6 V6 12 |
| | H1 V5 6 | H0 V5 5 | H1 V5 6 | H2 V5 7 | H V5 8 | X | X | H6 V5 11 |
| | H1 V4 5 | H0 V4 4 | H1 V4 5 | H2 V4 6 | H3 V4 7 | H4 V4 8 | H5 V4 9 | H6 V4 10 |
| | H1 V3 4 | H0 V3 3 | H1 V3 4 | X | H3 V5 8 | H4 V5 9 | H5 V5 10 | H6 V5 11 |
| | H1 V2 3 | H0 V2 2 | H1 V2 3 | X | H3 V4 7 | H4 V4 8 | H5 V4 9 | H6 V4 10 |
| | H1 V1 2 | H0 V1 1 | H1 V1 2 | X | H3 V3 6 | H3 V3 7 | H3 V3 8 | H3 V3 9 |
| | H1 V0 1 | S | H1 V0 1 | X | H3 V2 5 | H4 V2 6 | H5 V2 7 | H6 V2 8 |
| | H1 V1 2 | H0 V1 1 | H1 V1 2 | H2 V1 3 | H3 V1 4 | H4 V1 5 | H5 V1 6 | H V 7 |

METHOD AND DEVICE FOR PROCESSING DATA

FIELD OF THE INVENTION

The present invention relates to improvements in multidimensional fields of data processing cells for data processing.

BACKGROUND INFORMATION

Multidimensional fields of data processing cells are conventional. The generic class of these modules includes in particular systolic arrays, neural networks, multiprocessor systems, processors having a plurality of arithmetic units and/or logic cells and/or communicative/peripheral cells (IO), interconnection and network modules such as crossbar switches as well as known modules of the generic types FPGA, DPGA, Chameleon, XPUTER, etc. In particular, there are conventional modules in which first cells are reconfigurable during runtime without interfering with the operation of other cells (see, for example, the following patent applications, assigned to PACT XPP Technologies AG or its predecessor companies and/or of which Martin Vorbach is an inventor (hereinafter "PACT Technologies"): DE 44 16 881.0-53, DE 197 81 412.3, DE 197 81 483.2, DE 196 54 846.2-53, DE 196 54 593.5-53, DE 197 04 044.6-53, DE 198 80 129.7, DE 198 61 088.2-53, DE 199 80 312.9, PCT/DE00/01869, DE 100 36 627.9-33, DE 100 28 397.7, DE 101 10 530.4, DE 101 11 014.6, PCT/EP 00/10516, EP 01 102 674.7). These are herewith incorporated fully into the present text for disclosure purposes.

Modules designed in this way are high performance modules but their use is often prohibitive because of high costs. In cases where cost is particularly relevant in mass production, it is therefore customary at the present time to provide dedicated logic circuits in the form of ASICs and the like. However, these have the problem of entailing particularly high development costs because designing the circuit and manufacturing the plurality of masks are both expensive.

SUMMARY

An object of the present invention is to provide a module, the use of which is less prohibitive, due to decreased cost.

In an example embodiment of the present invention, in a data processing system having a multidimensional field of cell elements configurable in function and/or interconnection, and a configuration maintenance memory assigned to them for local configuration maintenance, the configuration maintenance memory are designed to maintain at least a portion of the maintained configurations in nonvolatile form.

Performance of the multidimensional processor fields may be optimized by first providing a plurality of cells that are capable of a great variety of different functions per se, but then, of this multitude of different functions, providing only one or a few functions per each cell. In comparison with dedicated circuit design of ASICs and the like, in which exactly the circuits required for the needed functions are provided, this may yield major cost advantages because it is possible to rely on easily programmable units or thoroughly tested modules, so no high development and/or testing costs are incurred, nor the high costs for the plurality of masks that would otherwise be required in dedicated ASIC design. The design may be accomplished via conventional design programs for logic circuits in which modules for the cells, interconnection architecture elements, etc., are provided or in which an analog reconfigurable system is configured in such a way until it yields the desired results and then the corresponding functionality is fixedly preselected in a system.

In one example embodiment, the function may be configurable in a coarse granular form, e.g., if the configuration maintenance memory must maintain only a few bits to determine the particular function of the cell. This may facilitate maintaining a plurality of configurations that are to be processed successively but are fixedly preselected at least in part. At least one of ALUs, EALUS, RAM cells, I/O cells and logic blocks may be provided as cell elements. Interconnection may also be configurable in a coarse granular form, e.g., where only a few bits are set to provide the interconnection. Alternatively, the interconnection may be preselected at least largely in a fixed form and only the particular function varied. For example, the interconnection preselection may be implemented when the finished module is to execute a certain function of a number of preselected functions, e.g., in its function as in wave reconfiguration, but the interconnection itself is fixed. To do so, only a nearest neighbor connection may be provided in certain partial areas (reference is made to the patent application filed simultaneously by Pact Technologies regarding the increase in nearest neighbor dimensionality and/or connectivity for disclosure purposes), of which a few of the nearest neighbor connections are activated and a few are deactivated. In other areas, however, a variable circuit arrangement and/or bus structure may be provided; if necessary, it may also be run-time reconfigurable, for example. It should be pointed out that, depending on user requirements, a plurality of different functions may be provided using a module which is unchanged except for the specified configuration, so that mask costs are distributed among a plurality of modules and therefore are no longer so significant.

In an example embodiment, a separate configuration maintenance memory may be provided for each cell element. These configuration maintenance memories may replace the configuration registers which are provided in XPP architectures and may be accessed from a central configuration memory. It is possible to maintain a plurality of configurations in the configuration maintenance memory; this allows, for example, run-time reconfiguration without having to integrate a configuration unit, which is also expensive and requires silicon area. The choice of configurations to be activated in each case may be made within the field via status triggers, data operations, sequencer systems, etc. In an example embodiment, multiple, fixedly preselected, nonvolatile configurations may be preselected in the configuration maintenance memory. Alternatively, volatile and nonvolatile configurations may be used. It should be pointed out that there may be a partial or complete specification of the configuration before the actual startup or each actual startup. To do so, data input in a suitable manner may be treated as configurations to be stored. Since such advance storing of reconfiguration data need not be performed without interfering with production, this opens up other possibilities of simplifying the architecture. Reference should be made here to wormhole routing, as it is called, which does not function with run-time reconfigurable units. Alternatively and/or additionally, with some cells, a configuration maintenance memory may be provided with variable configurations in runtime, e.g., some cells are reconfigured via a configuration manager or by some other means.

The variable variety of maintained and/or predefined configurations to be used in each case may be determined and/or revised in particular as wave reconfiguration or local sequencing.

The configuration maintenance memory may be designed, e.g., as ROM, EPROM, EEPROM, flash memories, fuse- or antifuse-programmable memory and/or memory fixedly provided, for example, in the upper layers of a silicon structure. Systems of a large number of units that easily and simply provide the configuration may be provided. This may be achieved through suitable masking on the upper metal layers (e.g., layer M4 and/or M5) at the time of manufacture and/or through fuse/antifuse techniques. With the latter, changes may be more easily implementable when there are changes in function in an ongoing series.

In an example embodiment, a module of defined function is obtainable with the system in that a multidimensional field having cell elements configurable in function and/or interconnection and a configuration maintenance memory assigned to them are preselected for the local configuration maintenance; this determines which configurations are to be maintained in them, and then nonvolatile configuration maintenance memories are provided so that they maintain at least a portion of the maintained configurations in a nonvolatile form. It is possible to start here from a multidimensional field that is reconfigurable in runtime, that has a higher functionality and then the design may be reduced by certain functions until a core component or component block having a preselected architecture is obtained in which only a few free configurations are to be determined.

BRIEF DESCRIPTION OF THE DRAWINGS

FIG. 5c illustrates an example processor partially reconfigured in runtime, according to an example embodiment of the present invention.

FIG. 6b illustrates the field of FIG. 6a after a first bus setup step, according to an example embodiment of the present invention.

FIG. 6c illustrates the field of FIG. 6a after a second bus setup step, according to an example embodiment of the present invention.

FIG. 6d illustrates the field of FIG. 6a after reaching a receiver field having different possible connections, according to an example embodiment of the present invention.

FIG. 6e illustrates the field of FIG. 6a having a selected bus, according to an example embodiment of the present invention.

DETAILED DESCRIPTION

Figure 1:
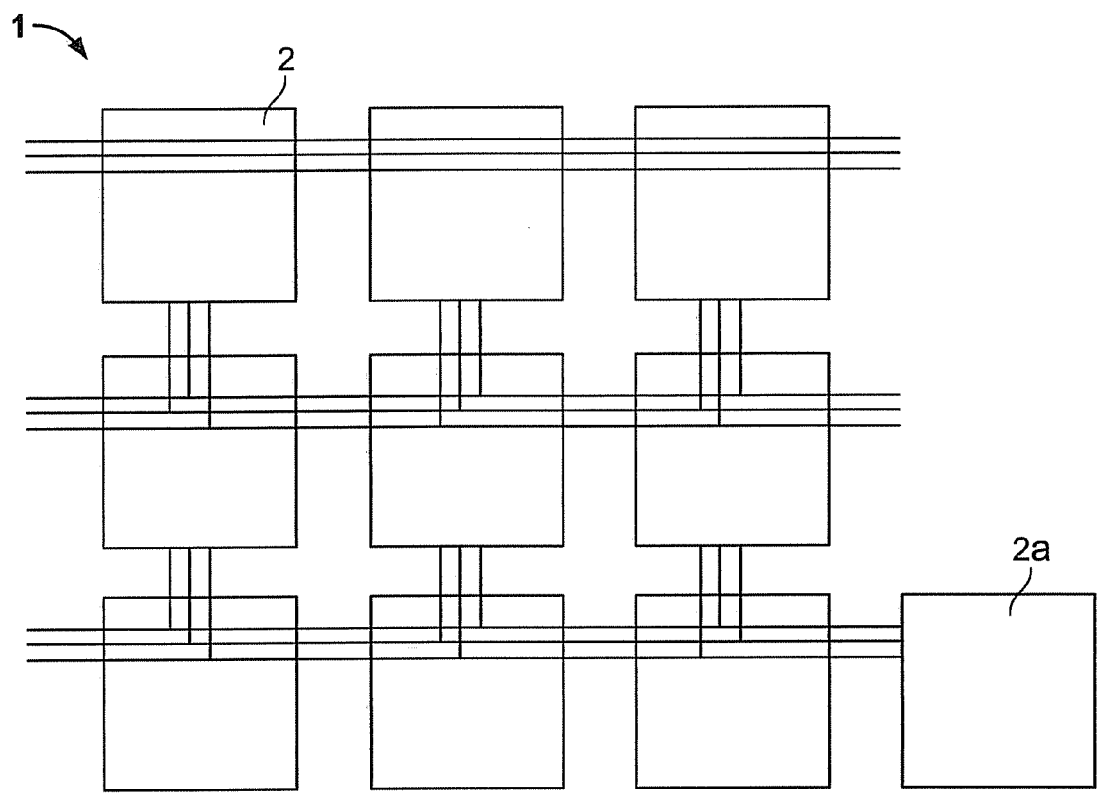
FIG. 1 is a diagram that illustrates an example data processing system according to an example embodiment of the present invention.

FIG. 1 shows an example data processing system 1. The data processing system 1 may be a multidimensional field and may include cell elements 2 that are configurable in function and/or interconnection and a configuration maintenance memory 2a assigned to them for local configuration maintenance. The configuration maintenance memory 2a may be designed to maintain at least some of the maintenance configurations in a nonvolatile form.

Figure 2:
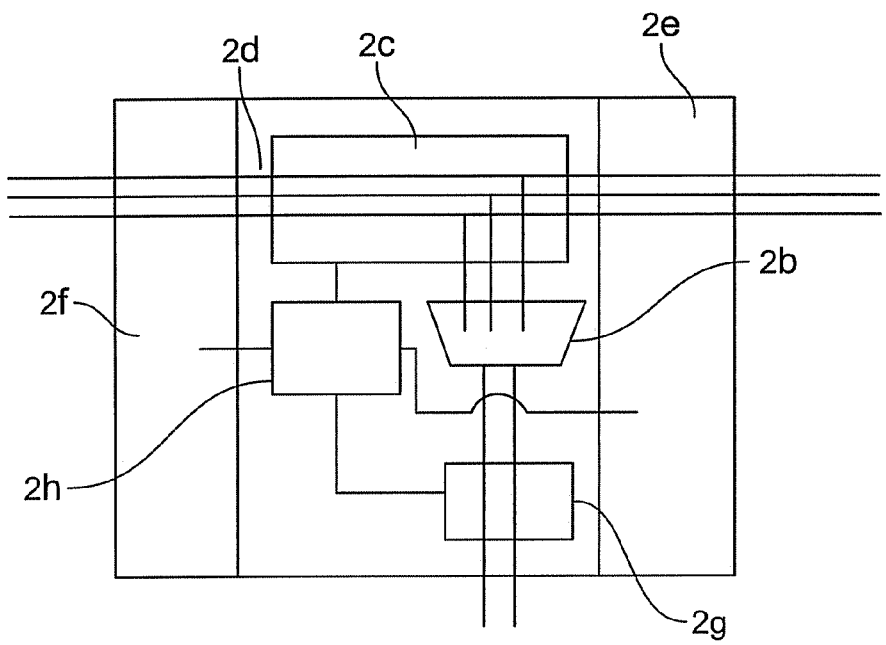
FIG. 2 is a diagram that illustrates details of an example cell element of the example data processing system, according to an example embodiment of the present invention.

Multidimensional field 1 in the present examples includes three rows and three columns of PAEs such as those discussed in the publications by Pact Technologies cited in the background. Referring to FIG. 2, these units may have ALUs $2b$ which may be configurable in a coarse granular form, which may be flanked on both sides with conventional forward/reverse registers $2e$, $2f$, and to which data may be sent via a multiplexer $2c$ from a bus system $2d$. In addition, they may feed output data to a bus system in the next lower row via another multiplexer $2g$. The functioning of multiplexers $2g$, $2c$ as well as that of ALU $2b$ and registers $2e$, $2f$ is conventional and is not explained in greater detail here. The configuration which these units have, e.g., the connection activated by the multiplexer in each case, and/or the particular function of the ALU $2b$ are stored in configuration memory $2h$. A plurality of different configurations may be stored here for sequencing or wave reconfiguration and may be activatable by signals from the cells or external signals. It is not necessary to provide a fixed invariable memory for all configurations but instead a memory (comparatively smaller, if necessary) may also be provided in certain cases. This thus allows a cell mix and/or memory mix.

In previous architectures, the configurations memory was variable and was addressed by a central configuration unit, for example, but in the present case configuration memory $2h$ is in a nonvolatile form and its content is determined in the manufacture of the IC containing the elements.

This may take place as follows:

It is first determined which number of cells and, if necessary, which cells are necessary for the expected task to be processed using data processing system 1. The function is then simulated using these cells. This may be accomplished via emulators or a field of run-time reconfigurable elements having a central configuration unit may be used for function development and/or function testing. As soon as function development is concluded and the necessary configurations have been determined, a chip is designed, whose structure is approximately equal to that of a plurality of other similar chips and differing from them only with regard to the nonvolatile configuration memory content. It is then determined whether the nonvolatile configuration memory contents are defined using dedicated metal layers and/or by burning/melting certain fuses/antifuses provided for the configuration or by some other method. The memory contents are then provided during the manufacturing process and the chip is usable for its dedicated function without requiring multiple expensive masks. For example, regional adjustments are possible, e.g., to implement different modems, etc.

An example embodiment of the present invention may relate to integrated electronic processing of information which is provided in the form of analog signals. It should be emphasized in particular that analog processing, for example, is able to access fixedly pre-stored configurations, as will be discussed; it is possible to select from different configurations for this purpose, and certain cell forms are likewise advantageous. There are currently several concepts for integrated electronic processing of information provided in the form of analog signals:

Discrete analog non-programmable modules such as transistors and operational amplifiers;

Analog programmable integrated circuits known as FPAAs (field programmable analog arrays), FPMAs (field programmable mixed-signal arrays) or FPADs (field programmable analog devices). FPAAs, FPMAs and FPADs, like digital FPGAs (field programmable gate arrays) are composed of individual programmable cells. In the case of FPAAs, FPMAs and FPADs, the central component of such a cell is an analog operational amplifier to which a certain function from a set of possible functions may be assigned. Possible functions include, for example, adders, inverters, rectifiers and filters of the first order which may be used to process an analog signal. The cells are interconnected by a bus system and are controlled by logic elements;

Application-specific non-programmable integrated circuits, known as ASICs (application-specific integrated circuits);

Programmable fully digital processors called DSPs (digital signal processors) or CPUs (central processing units) which are used for digital processing for analog signals after prior analog-digital conversion. If an analog signal is to be available again after processing, the processing must be followed by a digital-analog conversion of the signal.

Problems

Discrete Analog Modules:

A circuit having discrete modules may be optimally designed for a certain task due to its primary flexibility.

The tasks of the circuit, however, must be known precisely at the time of the circuit design because subsequent adaptation of the circuit to altered requirements is impossible or may be accomplished only at considerable expense. This is true in particular of programmability and run-time reconfiguration. In addition, such a circuit rapidly becomes quite extensive in the case of more complex functions.

FPAAs, FPMAs, FPADs:

The possibilities for processing analog signals provided by FPAAs, FPMAs and FPADs are based on the model of conventional analog signal processing systems.

They are largely transparent for the signal to be processed, i.e., the signal to be processed is processed in real time up to a certain module-dependent frequency.

There is no simple possibility for storing analog values; in particular, there is no possibility of storing the analog input and/or output value of each individual cell. Many important operations such as loop calculations and all processes in which multiple signals must be processed in succession with coordination in time only become possible through storage, however. A single FPAA, FPMA or FPAD cell may be configured as a sample-and-hold stage type memory, but it may then no longer be able to execute an additional function.

FPAAs, FPMAs and FPADs are subject to functional restrictions because of their strictly analog signal processing. The capabilities of the digital logic implemented in FPAAs, FPMAs and FPADs are limited to the functions needed for reconfiguration of cells. The function of the cells which they performed during operation is not supported by the logic in the related art, let alone expanded, e.g., by digital counting functions or basic logic functions, such as NAND and NOR. In particular there are no logic structures belonging to a single cell that are capable of performing such digital counting functions or basic logic functions. It should be pointed out in advance that the present invention remedies this situation. Therefore, logic functions such as input signal-dependent decisions are possible only to a slight extent, if at all, or are extremely complex with FPAAs, FPMAs and FPADs.

The same is also true of the data-dependent reconfiguration of FPAAs, FPMAs and FPADs, for example, (but not only) as an IF-THEN-ELSE instruction. This is made possible according to the present invention. If an FPAA, FPMA or FPAD cell is to be reconfigured on the basis of criteria pertaining to analog signals that are to be processed or have already been processed, then the analog signal in question must be sent out over a temporary or even permanent connection to an external structure not contained in the FPAA, FPMA or FPAD, which must decide about any reconfiguration and must trigger and perform said reconfiguration. There is no possibility for the cell to automatically decide about a reconfiguration of itself as a function of an analog or digital signal, e.g., with its own structures, to cause this reconfiguration to be performed, and to obtain the required data from an internal structure suitable for this purpose and contained on the module.

If the result of the operation of a cell is to be supplied to its input, e.g., in loop operations, this may be accomplished in the case of FPAAs, FPMAs and FPADs only via the bus; no separate line for feedback of the operation's result to the input of the cell to relieve the bus is provided in FPAAs, FPMAs or FPADs.

These disadvantages rule out the possibility of constructing an analog arithmetic unit using FPAAs, FPMAs and/or FPADs that will achieve the flexibility and scope of functions of today's digital arithmetic units.

ASICS:

ASICs have a high primary flexibility because they were developed for a specific application. However, they are suitable only for the application for which they were developed. ASICs are reconfigurable only within the context defined by the application. If the application is altered by one detail which was not taken into account in the development of the ASIC, in the extreme case a new ASIC must be developed.

DSPs and CPUs:

Of all possibilities for signal processing, DSPs and CPUs permit the most flexible configuration and reconfiguration although it may not be performed either partially or during runtime.

To convert analog signals into a format suitable for DSPs or CPUs the analog signals must be digitally encoded. This requires an analog-digital conversion which may be quite complex and expensive when high demands are made of precision and may also limit the bandwidth. The situation is similar for retransformation of digital processed data into analog signals. To achieve adequate speed, the internal bus systems in DSPs and CPUs must transmit the individual bits of a digitally encoded analog signal in parallel. The required width of the data bus system increases with the required precision of the digital encoding of the signal. In contrast with that, for an analog transmission, one line for each analog signal transmitted is sufficient.

DSPs and CPUs also do not have a cellular structure but instead are constructed in the classical von Neumann architecture. Therefore, they have only a low modularity.

The analog arithmetic units in existence today are far from achieving the scope of functions and configurability of digital arithmetic units in existence today.

Conversely, analog circuits are increasingly being replaced by digital arithmetic units, e.g., in the case of DSPs, where the disadvantages mentioned in conjunction with DSPs must be taken into account.

The methods in existence today for processing analog signals have the goal of modifying this analog data. If the modules used for this purpose are configurable, then the manner in which the analog signals are to be modified is determined exclusively by digital logic, i.e., control is achieved exclusively through digital signals. There are no possibilities for controlling data processing directly through analog signals, nor are there any possibilities for processing analog signals using the scope of functions of a digital arithmetic unit.

The present invention thus also includes programmable, at least partially analog arithmetic units (reconfigurable analog processor, RAP) having functions expanded by logic elements in such a manner that the scope of functions of a digital arithmetic unit is associated with the possibility of rapid analog computation of complex functions (such as the logarithm function) and the reconfigurability of a DFP, e.g., according to Unexamined German Application No. 44 16 881 A1.

An RAP is composed of cells that are freely configurable in their function and interconnection and are run-time reconfigurable. When a single cell is reconfigured during runtime, the functioning of other cells is not impaired. A cell is divided into an analog section and a logic section. The analog section is for processing analog data on the basis of operational amplifier circuits such as those known from FPAAs, FPMAs and FPADs. The logic section controls the functions of the analog section during runtime, in the initial configuration and in reconfiguration during runtime.

The analog section, however, may also be controlled and configured on an analog basis. As with FPAAs, FPMAs and FPADs, data processing is primarily analog but the scope of functions is expanded by special structures, each with a logic section and various memories in each cell to the extent that input-data-dependent logic operations, comparisons, loop operations and counting may be performed rapidly and easily in each cell, resulting in a scope of functions similar to that of a fully digital arithmetic unit.

For each RAP cell, in order to simplify its reconfiguration, there is the possibility of deciding independently, e.g., using its own internal structures, on reconfiguration of itself as a function of an analog or digital signal, causing this reconfiguration to be performed and receiving the required data from a suitable structure.

Two independent, reconfigurable bus systems, one for analog signals and the other for digital signals, may be provided to connect the cells to each other and to the outside world. Each analog signal does not require for its transmission more than one analog bus line. In the case of a digital bus, the number of lines required increases greatly with the required precision of the digital coding of the analog signal in the case of parallel transmission. The required bus width of an analog bus is therefore reduced significantly in comparison with that of a digital bus with a comparable signal resolution and transmission rate. It should be pointed out that there may be mixtures of analog and digital circuits on an integrated circuit. Extensive separation and/or transition circuits, e.g., in the form of DACs and/or ACDs, may be provided between analog and digital elements. The digital elements may in turn be formed by PAEs, RAM-PAEs, etc., in particular having a suitable aspect ratio.

In this partial aspect, the present invention otherwise describes, among other things, an analog reconfigurable arithmetic unit (reconfigurable analog processor, RAP) composed of individual functional cells connected to one another and to the outside world by a suitable bus system. The function of the cells is configurable and may be reconfigurable during operation in such a way as to not impair the function of other cells that are not to be reconfigured. A functional cell contains an analog section and a logic section. The analog section is used for processing analog data on the basis of operational amplifier circuits. The logic section controls the functions of the analog section during runtime, in the initial configuration and in reconfiguration during runtime. In addition, the logic section expands the purely analog function of the analog section by providing logic functions and/or digital counting functions and/or arithmetic and/or memory elements, for example. Each cell may be assigned one or more analog memories capable of storing analog variables such as input or output signals and making them available for further processing. In addition, each cell includes one or more digital registers for storing digital data needed for configuration and operation of the cell.

For each cell there is the possibility of independently deciding, e.g., using its own internal structures, about reconfiguration of itself, of cells combined into groups, if necessary, or other cells as a function of an analog or digital signal, causing this reconfiguration to be performed, and receiving the data required to do so from a suitable structure which may be located on the module. There is also the possibility of feeding back the analog result of the operation of a cell to the analog data input of the cell without access to a bus system.

Terms whose meaning may differ from the conventional meaning in some points are used in this section. For a better understanding, the definition of terms as used in this section follows.

A signal is defined here as a variable, e.g., a voltage $U\_0(t)$, which prevails at a certain point in a circuit at a certain point in time. Such a point in the circuit may be, for example, an output, an input or a bus line. Voltage $U\_0(t)$ may be ground (GND) or a second voltage $U\_1(t)$. The signal may be constant or variable over time.

Information (or bits of information) is defined here as a number of possible differentiable states that a signal may assume.

A digital signal is understood here to refer to a signal when it may assume only two states, e.g., 0 or 1, i.e., it contains only two bits of information in the sense of the definition of information used here.

An analog signal is defined here as a signal which may assume at least three and at most an infinite number of states, i.e., it includes more than two bits of information in the sense of the definition of information used here. This means in particular that more bits of information are transmittable simultaneously by analog signals over a line than digital signals.

The structure of a functional cell according to the present invention and the structure of the particular bus system connecting the cells are described below.

The Cell

A cell is the smallest complete, independent functional unit of an RAP. Two different types of cells are possible—a simple cell and an extended cell. Both types of cells are used on an RAP. They differ in the scope of functions. Both types of cells have in common the fact that their structure is divided into an analog section and a logic section.

Some or all cells may include a clock multiplier for generating a higher local clock pulse limited to the cell, supporting, for example, the counting functions of the logic section of the cell. It is also conceivable for one or all cells to be able to include structures for generating a cell-internal or locally limited cell clock pulse whose frequency may be configured independently of the frequency of any bus clock pulse. The cell clock pulse may be activatable and deactivatable.

The Simple Cell (SCELL):

The elements of a simple cell (SCELL) are divided into two groups known as the analog section and the logic section. The analog section is used for analog data processing of the analog input signals of the cell, but may also generate analog signals such as (but not only) a square-wave signal or a triangular signal. The logic section makes available additional non-analog functions, in particular, for example, input-data-dependent logic operations, comparisons and counting operations, memories and/or arithmetic operations and also controls the activity of the entire SCELL. One element of the logic section is the control logic (CL), which controls the functions of the analog section and manages signals for reconfiguration of the cell, these signals being sent or received via the bus systems.

The analog input stage of the SCELL is a multiplexer (MUXQ) according to the related art for analog signals. The analog signal to be processed is sent by an analog data bus system (ABUS) to the inputs of MUX0. Controlled by the CL, MUX0 selects the analog signal to be processed by the SCELL and forwards it to the analog processing unit (APU). The APU is a configurable unit according to the related art. It includes one or more operational amplifier circuits whose function may be selected from a set of possible functions. The function is selected by the CL via a digital signal.

Functions of the APU may include (but are not limited to), for example:

Addition of a programmable variable to the analog input signal of the APU;
Subtraction of a programmable variable from the analog input signal of the APU;
Multiplication of the analog input signal of the APU by a programmable variable;
Division of the analog input signal of the APU by a programmable variable, and division of a programmable variable by the analog input signal of the APU;
Computing the logarithm of the analog input signal of the APU;
Computing the antilogarithm of the analog input signal of the APU;
Inverting the analog input signal of the APU;
No change in the analog input signal of the APU;
Filter functions, e.g., high-pass filters, low-pass filters, band-pass filters and notch filters;
Signal generation, e.g., square-wave signals, triangular signals and sinusoidal signals having programmable time constants;
Raising to a power; and
Storage.

The analog signal to be processed is altered according to the function programmed by the CL in the APU or it is not altered (in the function of a buffer) or the APU is used to generate a new analog signal. It is also conceivable in particular to generate a signal which represents a reconfiguration request and in which the required reconfiguration parameters are encoded in analog form. The analog output of the APU is connected to a memory stage (BIPS). The BIPS may be in one or several states programmable by the CL, e.g., in one of the following states:

BUFNONINV: The output signal of the BIPS has the value which was applied to its input when the BIPS received a BUFFER signal from the CL. The output value is kept constant as long as the BUFFER signal is being applied.

BUFINV: The output signal of the BIPS has the inverted value applied at its input when the BIPS was receiving a buffer signal from the CL. The output value is kept constant as long as the BUFFER signal is being applied.

INVERT: The input signal of the BIPS is inverted.

PASS: The BIPS loops the input signal through unchanged.

3STATE: The output of the BIPS assumes a high resistance state.

The output of the BIPS is connected to the input of an analog demultiplexer (DeMUX) whose outputs are connected to the bus lines of the ABUS. The CL controls to which input of the DeMUX the processed analog signal is sent.

The LOGUNIT exists as an additional element of the logic section of an SCELL for expansion of the scope of functions of the SCELL. The LOGUNIT is capable of performing the following functions, for example:

digital counters which may be set, triggered, queried, reset and stopped by the CL and/or the APU. They may be designed as coarsely granular logic elements. Other coarsely granular logic elements and/or function elements such as arithmetic elements, in particular ALU-type elements and/or memory elements are also implementable.

basic logic functions such as NAND, NOR, AND, OR, XOR, INVERT, BUFFER which are capable of logically linking information from the CL and/or APU. These are thus finely granular logic elements. Such information may be independent of the status of the CL and/or APU and/or signals to be processed. In particular such information may be criteria that also result in formation of a RECONREQ signal (reconfiguration request).

The Extended Cell (ECELL):

In an example embodiment, the extended cell (ECELL) contains a complete, fully functional SCELL which has been expanded to include additional elements and functions to be able to perform in particular (but not only) loop operations without access to the bus system.

The analog input stage (MUX0) has been expanded by a second equivalent analog multiplexer (MUX1) accessing the ABUS. With MUX0 and MUX1 it is possible to enable two input signals for subsequent processing in the cell instead of only one input signal (as is the case with an SCELL). In addition to the bus terminals, MUX0 and MUX1 each additionally have one input which is connected to ground and one input to which the result signal is fed back from the output of the BIPS of the ECELL. The output of MUX0 carries the analog signal, which has been selected by MUX0 for processing and may also explicitly be the constant ground level or the result signal from the output of the BIPS of the ECELL. The output of MUX1 carries the analog signal which has been selected by MUX1 for processing and may also be the constant ground level or the result signal from the output of the BIPS of the ECELL.

The output signals of MUX0 and MUX1 are sent to the following programmable memory stages (BUFF0, BUFF1). BUFF0 receives the output signal from MUX0 and BUFF1 receives the output signal from MUX1. BUFF0 and BUFF1 are units configurable by the CL; their function may be selected from a set of possible functions. Possible functions of BUFF0 and BUFF1 include, for example:

BUFNONINV: The value of the output signal of BUFF0 and/or BUFF1 is the same as the analog input signal applied when BUFF0 and/or BUFF1 was receiving a buffer signal from the CL. The output value is kept constant as long as the BUFFER signal is being applied.

BUFINV: The value of the output signal of BUFF0 and/or BUFF1 is the same as the analog input signal applied when BUFF0 and/or BUFF1 was receiving a buffer signal from the CL. The output value is kept constant as long as the BUFFER signal is being applied.

INVERT: The instantaneous analog input signal of BUFF0 and/or BUFF1 is inverted.

PASS: BUFF0 and/or BUFF1 loops the instantaneous input signal through unchanged.

The output signal of BUFF0 and the output signal of BUFF1 are each sent to one analog input of the extended analog processing unit XAPU of ECELL. All functions of the APU of an SCELL are contained in the XAPU of an ECELL.

In contrast with the APU of the SCELL, the XAPU has two analog inputs, so that operations having two analog signals that are either constant or variable over time are possible in the XAPU, in particular addition, subtraction, multiplication and division of two such signals. It is thus conceivable to program the XAPU via an analog control signal that is either constant or variable over time by assigning certain functions to certain values of the control signal. It is also conceivable to transmit to the APU, using an analog control signal, a parameter necessary for exercising a function. For example, if f(t) is an analog (voltage) signal, which is variable over time and is to be multiplied by a (voltage) signal g(t) that is variable over time, the XAPU may then be programmed as a multiplier like a voltage-controlled amplifier (VCA) according to the related art, where f(t) is applied to one analog input of the XAPU, while g(t) is applied to the other analog input of the XAPU and constitutes said control signal.

The output signal of XAPU is sent to the input of BIPS. BIPS of the ECELL and BIPS of the SCELL may be identical. The output signal of BIPS is sent to the input of DeMUX. DeMUX of the ECELL and DeMUX of the SCELL may be identical. Furthermore, the output signal of BIPS is sent over a separate line to one input of MUX0 and one input of MUX1.

The logic section may contain an element for clock pulse multiplication, which multiplies the clock pulse of the DBUS and may be programmable. Thus the ECELL may operate internally with a multiple of the DBUS clock pulse.

Reconfiguration of a Cell (cellreconfig)

The RECONREQ Signal:

The analog section and the logic section of the cell are preferably structured and connected so that on occurrence of certain criteria the cell is able to generate a signal, the RECONREQ signal, using which may cause its own reconfiguration or the reconfiguration of one or more other cells to be performed. The RECONREQ signal may be digital and may be relayed via a separate digital bus system. However, it may also be an analog signal relayed via a separate analog bus system. Using an analog RECONREQ signal, it is also possible to simultaneously transmit additional information, e.g., the address of the cell(s) to be reconfigured, in addition to the RECONREQ information on only one bus line.

Criteria triggering a RECONREQ signal may include (but are not restricted to), for example:

A certain signal level reached, exceeded or not reached by analog signals occurring in the cell (also including the analog input and output signals).

A certain signal difference between analog signals (also including the analog input and output signals) occurring in the cell, this difference being reached, exceeded or not reached.

A certain signal difference which is reached, exceeded or not reached by analog signals occurring in the cell (also including the analog input and output signals).

The elapse of a certain period of time.

The occurrence of a certain digital signal or a certain combination of digital signals in the cell or at the digital inputs and/or outputs of the cell.

The signals mentioned in the above list may also originate explicitly from other cells or other elements of the RAP. In addition, other criteria may also be formed by logically linking (AND, OR, NAND, NOR, XOR, etc.) these criteria. The logic section of the ECELL contains structures suitable for logically linking criteria, e.g., for comparison of results, flags of an ALU such as carry, etc., with an arithmetic unit.

The criteria for forming a RECONREQ signal are analyzed in the CL of the cell. The CL of the cell generates from these criteria a digital word (RECONREQ word) having the required RECONREQ information.

This RECONREQ word may be relayed in digital or analog form by the cell. Separate bus systems (RECONREQ bus), a digital bus and an analog bus are available for this purpose.

If the RECONREQ word is to be relayed in analog form, then the digital RECONREQ word is converted to an analog form in a digital-analog converter (DAC). Each cell may have such a DAC for this purpose.

The data necessary for reconfiguration of the cell makes a suitable structure available. This structure may be, for example, a load logic and a switching table as described in German Patent Application No. DE 196 54 846.2.

The Load Logic

The load logic (LL) is a structure that performs the reconfiguration of particular cell(s) after a RECONREQ signal. Multiple cells are each connected to a single LL via the RECONREQ bus. These cells together with the particular LL form a cluster. Each cell of a cluster may deliver a RECONREQ signal to its LL and thus instruct each cell of the same cluster to perform a reconfiguration. There are also other possibilities for triggering a reconfiguration of other cells. Reference is made to the aforementioned documents. One module may include multiple clusters. LLs of these clusters are interconnected by a bus system and may thus exchange information. Such information may include in particular the addresses of cells to be reconfigured. It is therefore possible for any cell of the RAP to request any cell of the RAP to perform a reconfiguration.

The LL may be designed according to PACT_SWT (see patent applications cited) and may thus directly process digital RECONREQ words. However, the LL needs analog preceding stages, namely an analog selector stage (ASELSTAGE) and an analog-digital converter stage (ADC) for processing an analog RECONREQ word. The task of the ASELSTAGE is to determine whether a RECONREQ signal is applied, and if so, to which analog RECONREQ bus. If a RECONREQ signal is present on an analog RECONREQ bus, this bus is selected by the ASELSTAGE and switched for further processing to the ADC, which converts the analog RECONREQ word back into a digital RECONREQ word processable by the LL.

The ASELSTAGE may be implemented in various ways. One possibility is to use a multiplexer and another is to use an arbiter.

ASELSTAGE as multiplexer: The analog RECONREQ buses of the cells monitored by the LL are applied to the inputs of each switched-mode analog multiplexer according to the related art. With each clock pulse, the multiplexer is switched forth by one input so that a different bus is at the output of the multiplexer with each clock pulse. A comparator monitors the output of the multiplexer. If there is no analog RECONREQ signal at the output of the multiplexer, then the output of the multiplexer will have a certain level, e.g., 0 volt. If a RECONREQ signal is applied, a different level will be found at the output of the multiplexer, prompting the comparator to switch the RECONREQ signal to the following ADC. Alternatively and/or additionally, multiple comparators may be provided, which compare the signal with different signal levels and thus directly trigger an analysis. This is recommended in particular when only a few signal stages are to be differentiated.

ASELSTAGE as arbiter: The analog RECONREQ buses of the cells of a cluster go first to the input of an analog multiplexer (AMUX). If a RECONREQ signal is applied to one of the analog RECONREQ buses, this bus is selected by the AMUX and the applied RECONREQ word is switched to the output of the AMUX.

Bus Systems

A RAP preferably includes at least two independent flexible bus systems for interconnection of the individual cells and for connecting the RAP to the outside world. The preferred bus systems may be configured and reconfigured during runtime without having to interrupt the activity of the RAP. The bus systems may be equipped with properties such as those described in DE 197 04 742.4. A difference is made here between the analog bus system and the digital bus system.

The Analog Bus System (ABUS)

The analog bus system (ABUS) is used for transmitting the data and analog signals that are to be processed, have already been processed or are newly generated from the outside to the cells and/or between the cells. In particular, it is possible using the ABUS to cascade cells to process an analog signal in this way in multiple successive operations, one operation being performed by one cell.

The ABUS is able to transmit multiple bits of information, in particular more than two bits of information simultaneously with each of its lines, e.g., 256 bits of information. The ABUS may be cycled at a fixed or variable frequency or it may be asynchronous, i.e., not cycled. The ABUS may be implemented in a manner as described in DE 197 04 742.4.

The Digital Bus System (DBUS)

In addition to the ABUS, there is a second bus system called DBUS on the RAP.

The DBUS is clocked and is used for distribution of digital data, e.g., configuration data and status data among the cells. The logic section of each cell is connected to the DBUS. The DBUS may be implemented in the manner described in DE 197 04 742.4.

This aspect of the present invention is explained below with reference to FIGS. 3a-3d as an example.

Figure 3A:
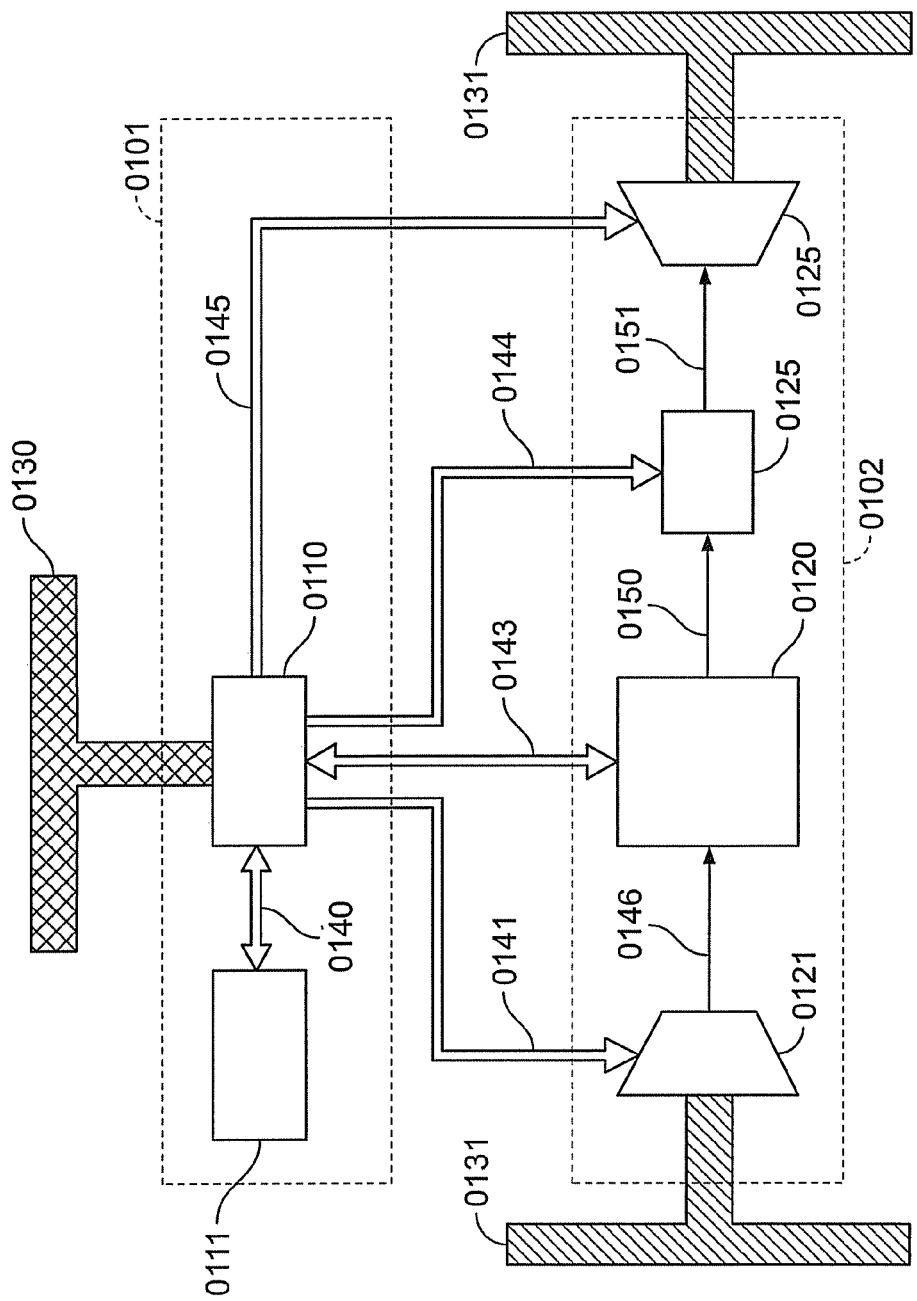
FIG. 3a is a diagram that illustrates example components of a simple cell, according to an example embodiment of the present invention.

FIG. 3a shows an example design of a simple cell (SCELL). It includes the digital section (0101) and the analog section (0102). The central element of the logic section is control logic CL (0110), which is able to communicate with other cells, additional structures, e.g., a load logic and/or a switching table, such as those described in DE 196 54 846.2, and/or with the outside world via the DBUS (0130).

Multiplexer MUX0 (0121) is connected to the ABUS (0131). If an analog signal is to be processed by the SCELL, MUX0 (0121) selects (via the lines (0141) controlled by control logic CL (0110) or by another suitable structure) the line of the ABUS (0131) to which the analog signal to be processed is being applied. The output of MUX0 (0121) is connected by line 0146 to analog processing unit APU (0120) in which the signal selected by MUX0 is processed, if a signal has been selected, or the APU generates a signal, which may be a RECONREQ signal, or the APU remains in the predefined resting state. The action of the APU is controlled by the CL (0110) over lines (0143). These lines (0143) may be designed to be bidirectional, so the APU is capable of sending signals to the CL (0110) as a function of certain events and criteria. The criteria may be, for example, criteria that also result in a RECONREQ signal being generated. A signal generated may be in particular a RECONREQ signal, as described in the cellreconfig section. The signal processed or generated by the APU goes over line (0150) to a memory stage BIPS (0124) whose function is controlled by the CL (0110). The BUFNONINV, BUFINV, INVERT, PASS, 3STATE functions described in the SCELL section are available here. At the output of the BIPS, the analog signal is received by a demultiplexer DeMUX (0125), which switches it to ABUS (0131), controlled by the CL over line (0145) or another suitable structure.

The logic section (0101) of the SCELL is composed of the CL (0110) and the LOGUNIT (0111), which are connected over line (0140).

Figure 3B:
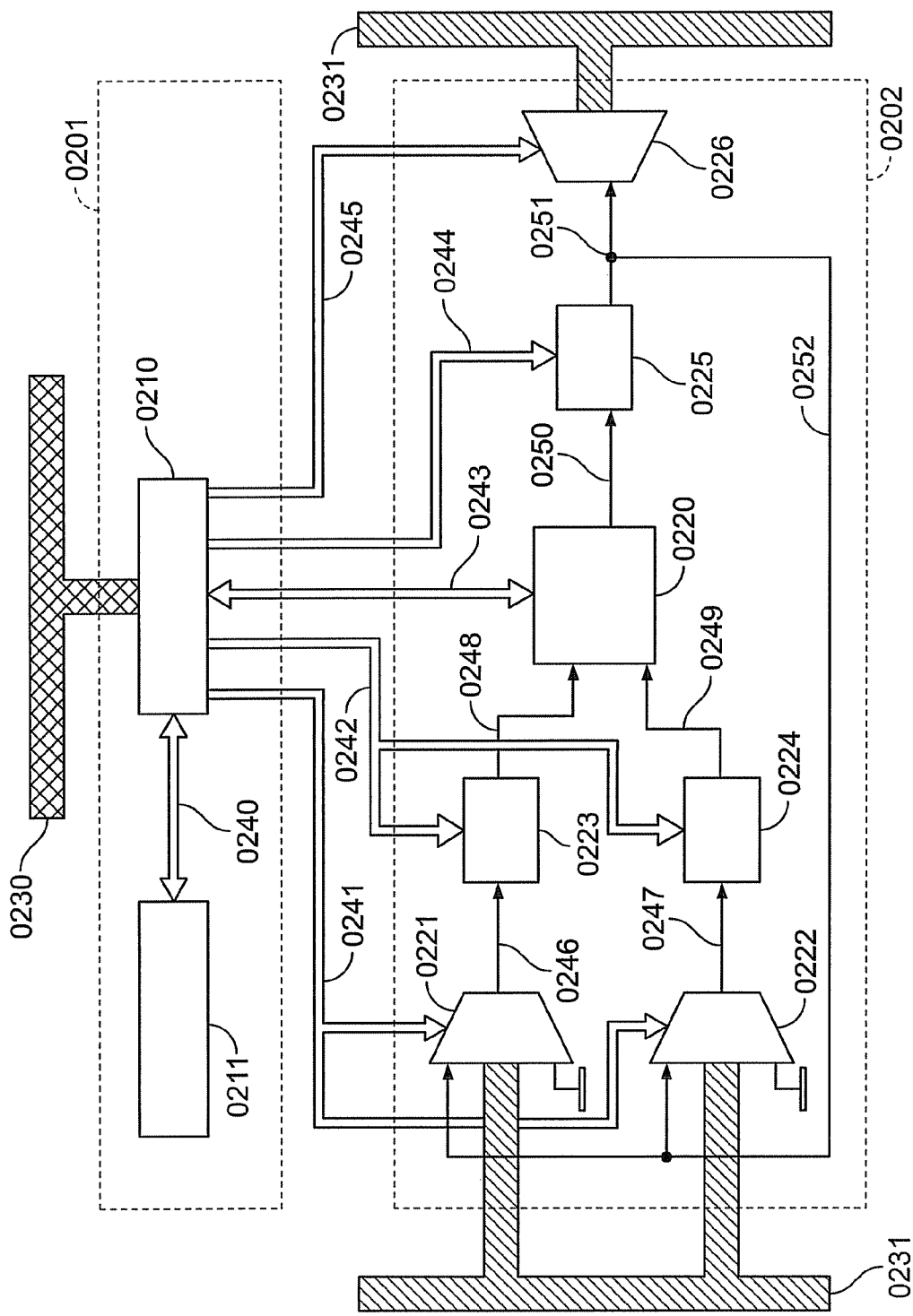
FIG. 3b is a diagram that illustrates example components of an extended cell, according to an example embodiment of the present invention.

FIG. 3b shows an example design of an extended cell (ECELL) which is functionally divided into an analog section (0202) and a logic section (0201). Analog multiplexers MUX0 (0221) and MUX1 (0222) select the two analog signals which are to be processed by the ECELL, this selection being controlled by the CL (0210) of the ECELL. MUX0 selects the first analog signal, while MUX1 selects the second analog signal. There are three possibilities for the origin of the two analog signals to be processed.

Either the first and/or the second analog signal come(s) from the ABUS or the first and/or second analog signal is/are identical to fixed ground reference voltage GND, or the first and/or second analog signal is/are identical to the output signal of the BIPS (0225) which is fed back to one input each of MUX0 and MUX1 via line (0252). The first analog signal goes from MUX0 to BUFF0 (0223) over line (0246). The second analog signal goes from MUX0 to BUFF1 (0224) over line (0247). The two analog signals may be modified in BUFF0 and/or BUFF1 according to the modes of BUFF0 and BUFF1, as described in the section about the ECELL. BUFF0 and BUFF1 may be controlled by the CL (0210) over line (0242) independently of one another. The analog output signal of BUFF0 (0223) goes over line (0248) to the first analog input of XAPU (0220). The analog output signal of BUFF1 (0224) goes over line (0249) to the second analog input of XAPU (0220). XAPU (0220) processes the two analog input signals to form an analog output signal according to the function programmed by the CL (0210) over line (0243), as described in the ECELL section. The analog output signal of the XAPU (0220) is transmitted to another memory stage (BIPS, 0225) via line (0250). The BIPS of the ECELL and the BIPS of the SCELL may be identical. The function of the BIPS (0225) is controlled by the CL (0210) via line (0244). The analog output signal of the BIPS is transmitted via line (0251) to the demultiplexer (DeMUX, (0226)), which switches the signal to the ABUS (0231). DeMUX is controlled by the CL (0210).

The logic section (0201) of the ECELL includes a complete logic section, such as that found in an SCELL, i.e., the CL (0210), and the LOGUNIT (0211), which are interconnected over the line (0240). The logic section of the ECELL is also capable of controlling and managing the XAPU (0220) which has an expanded scope of function in comparison with the APU of an SCELL.

For example, logic operations such as NAND, NOR, AND, OR, XOR may be performed. Input variables of such operations may be such criteria which also result in formation of a RECONREQ signal but may also be digital signals generated specifically for this purpose.

Figure 3C:
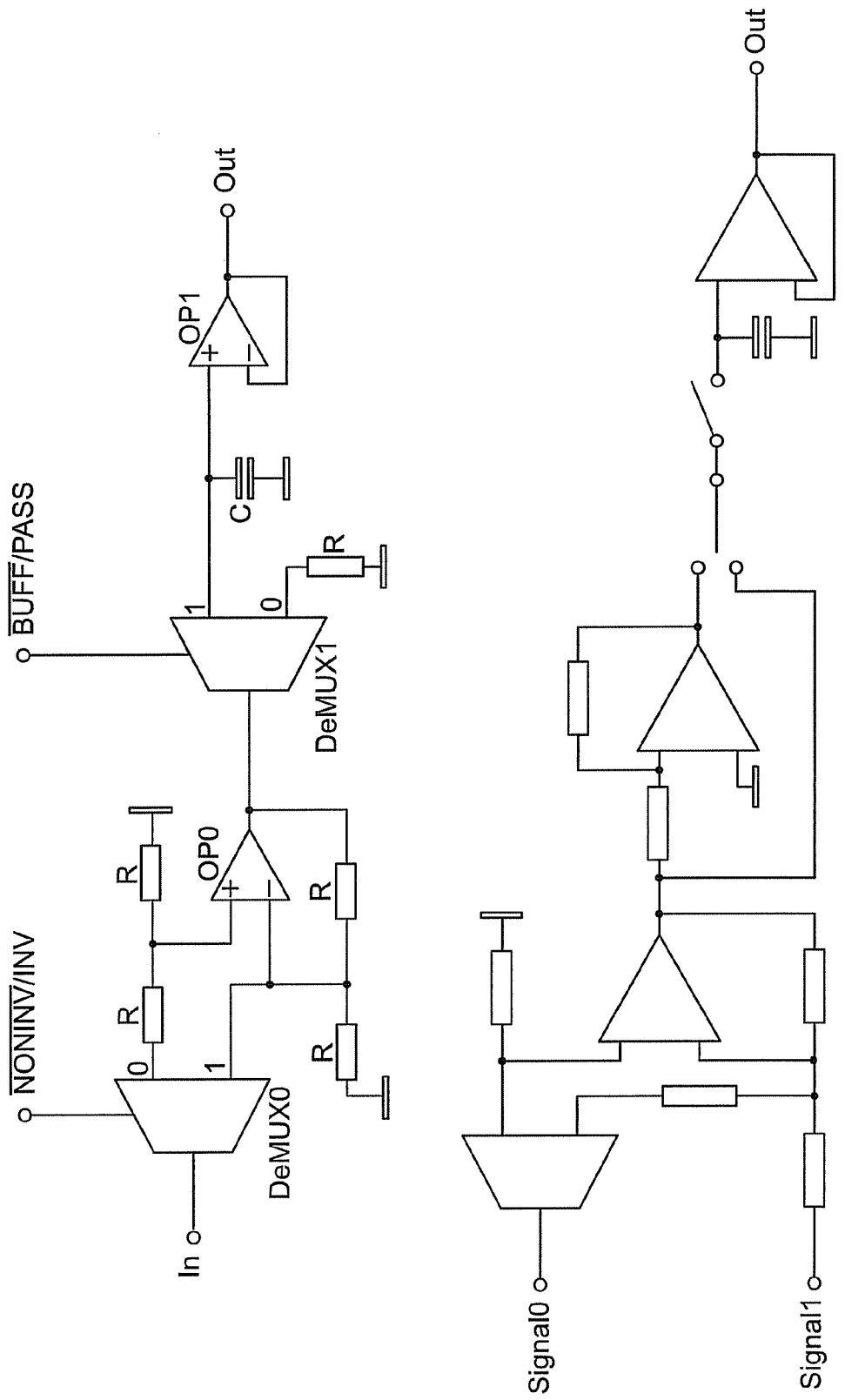
FIG. 3c is a diagram that illustrates one example implementation of BUFF0 and/or BUFF1, according to an example embodiment of the present invention.

FIG. 3c shows one possible type of implementation of BUFF0 and/or BUFF1. OP0 is an operational amplifier, which is wired so that it optionally inverts the analog signal applied to the IN input or loops it through. The operating mode is selected by DeMUX0. When a logic 0 is applied at control input NONINV/INV, the input signal is looped through; when a logic 1 is applied at control input NONINV/INV, the input signal is inverted. A decision is made via DeMUX1 about whether the signal is to be stored temporarily in capacitor C (BUFFER) or whether it is to be available at output OUT of OP1 without buffer storage (PASS). The signal is stored in the buffer when control input BUFF PASS receives a logic 0.

There is no buffer storage when control input BUFF PASS receives a logic 1.

Figure 3D:
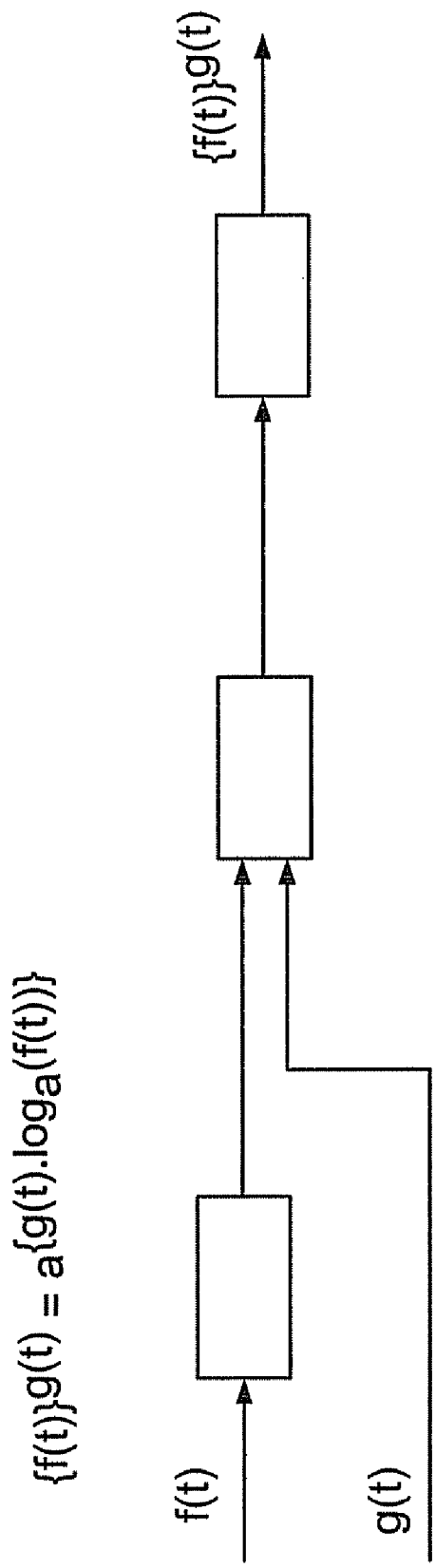
FIG. 3d illustrates the calculation of an expression $f(t)\hat{}g(t)$, according to an example embodiment of the present invention.

FIG. 3d shows how expression $f(t)\hat{}g(t)$ for example may be calculated.

To do so, in the first cell, f(t) is logarithmized, i.e., the logarithm of f(t) on any fixed base a is formed. An SCELL configured as a logarithmizer may be used for this purpose. The result of this operation is multiplied by g(t) in the second cell. An ECELL which multiplies the two signals in the manner of a voltage-controlled amplifier may be used for this purpose.

In the third cell, base a is raised to the power equal to the result of the multiplication operation. An SCELL configured as a delogarithmizer may be used for this purpose. The result of the delogarithmizing operation corresponds to expression ($[f(t)]\hat{}[g(t)]$)

How a unit having configurable analog units may be designed has been described above. It has been proposed that analog signals for working with cells are to be designed so that they are reconfigurable during operation of other cells and it has been proposed that they be assigned a suitable interconnection for this purpose. It is now to be assumed that there is the possibility of forming a module in which signal processing may be performed by both analog and digital methods. It will then be possible to provide digital signal processing using reconfigurable components, e.g., via a multidimensional field of reconfigurable digital units, as described in the various patent applications of or assigned to PACT Technologies. To provide the required conversion, individual or multiple converter steps may be provided, i.e., one or more analog-digital converters and, if necessary, multiple digital-analog converters. Moreover, it is possible to use various converter methods and to configure the accuracy of the conversion differently when multiple converter units are provided. It is likewise possible for more complex logic and function circuits to be provided in addition to simple logic circuits assigned to an analog element.

It is to be assumed that the plurality of analog elements, buses, etc., as well as any converter units that may be necessary are readily adaptable to a particular purpose, e.g., to comply with high-frequency applications or in the case of low-frequency applications to provide an extremely low-noise environment and/or a very good signal-to-noise ratio.

It should also be pointed out that the digital and analog elements are preferably mixed, in particular on one and the same IC. To do so, an adapter means may be provided in a mixed field with the aid of one or more ADCs and/or DACs and/or comparators because purely digital processing of weak incoming high-frequency antenna signals, e.g., in the field of software-defined radio, is still problematical, and nevertheless a great freedom of choice is desired with respect to analog signal processing.

The present invention also relates to devices and methods for improving the transfer of data within multidimensional systems of transmitters and receivers and/or transmitter and receiver cells. It should be pointed out that these are particularly relevant in critical applications such as software-defined radio.

The cells of multidimensional processor fields, for example, may now execute different functions, e.g., Boolean operations of input operands.

Connections which are likewise adjustable run between the cells; these are typically buses capable of establishing an interconnection in various ways and thus construct a multidimensional field whose interconnections are adjustable. Via the buses or other lines, the cells exchange information as necessary, such as status signals, triggers or data to be processed. Typically, the cells in a two-dimensional processor field are arranged in rows and columns, for example, with the outputs of cells of a first row being carried on buses to which the inputs of the cells of the next row are also to be connected. In the case of a known system (Pact XPP), forward and backward registers are also provided for sending data to bus systems of other rows, bypassing some cells, to achieve balancing of branches to be executed simultaneously, etc. There have also already been proposals for providing such forward and/or backward registers with a functionality that goes beyond that of pure data transfer.

To perform a certain type of data processing, a certain function must be assigned to each cell and a suitable interconnection must be provided. To do so, before the multidimensional processor field processes data as desired, it is necessary to determine which cell is to execute which function; a function must be defined for each cell participating in a data processing task and the interconnection must be determined. It is desirable to select the function and interconnection in such a way that the data processing may proceed as promptly as possible. Frequently, however, it is impossible to find a configuration which ensures that the desired data transfer is optimized. Suboptimal configurations must then be used.

It is desirable here to create a possibility for facilitating configurability.

It is also provided that in the case of a multidimensional processor field having a plurality of adjacent data processing cells, the cells have inputs which receive data from interconnection paths, an operand gating unit which gates them according to the particular function of their operand gating unit, and outputs for outputting the gated data on interconnection pathways. The data processing cells may have an aspect ratio of at least 1.5:1, e.g., 2:1. This permits the preferred pipelining in the PAEs and/or the buses. It is preferable but not obligatory to provide separate pipelining in each PAE in particular, which thus permits an increase in clock pulse.

A significant improvement in connectivity is achieved without having to provide expensive silicon area for additional bus connections or having to select a particularly complex topology. The improvements in connectivity are derived instead merely from the fact that data transfer across the cells is shortened, and thus data goes from one cell to the next within a shorter period of time, compared to the time required for flow-through and/or processing in the cell itself. This increases the number of cells to be still referred to as nearest neighbors, i.e., cells that are reachable within one clock pulse. In two-dimensional fields, for example, this yields a system in which one cell has functionally more nearest neighbors than would be the result topologically in a purely geometric analysis in the two-dimensional case. In other words, only through the change in aspect ratio is a greater than two-dimensional connectivity obtained functionally.

The cells are in particular PAE cells having EALUs, such as those discussed in the patent applications cited previously. Such cells are preferably cells that are configurable in a coarse granular fashion.

It is possible and preferable if the data processing cells are arranged in rows and columns. This allows a particularly advantageous design of the cells, which are typically approximately trapezoidal or rectangular. Data inputs may then be provided for at least some of the data processing cells to obtain data from an upper row and data outputs are provided to output data to a lower row. In such a case, this yields improved connectivity in both rows.

A processor field may include data processing units that are EALUs, ALUs and/or register-flanked cells, e.g., where registers are provided for the connection of different rows, in addition to the data processing cells which also route data without any time lag, e.g., approximately at maximum rate. These registers delay data in routing, whether to prevent and/or interrupt uncontrolled feedback loops (principle of the so-called annihilated feedback loop termination cells or AFTER cells) or to force synchronization (balancing) in a data splitting run of branches and subsequent recombination.

Using such a processor field, it is now possible to select a configuration such that when cells are selected for the configuration and their function and interconnection are determined, an interconnection being determined such that data is transmittable from one cell to the next at least largely without delay, such cells which are not directly adjacent to one another but instead are separated transversally by a distance that is smaller than the length of the cell are also taken into account as neighboring cells between which data is transmissible within one clock pulse or a low number of clock pulses. The fact that a downclocking of cells is possible in comparison with the buses per se is disclosed as being preferable. Evidently, however, in exceptional cases, there may also be a clock difference in the other direction or no difference at all.

It should be pointed out that the stated minimum aspect ratio which amounts to at least 1.5:1 may assume even larger values and, with a careful design of units, may easily be in the range between 5:1 and 10:1.

The present invention is described in greater detail below with reference to FIG. 4.

Figure 4:
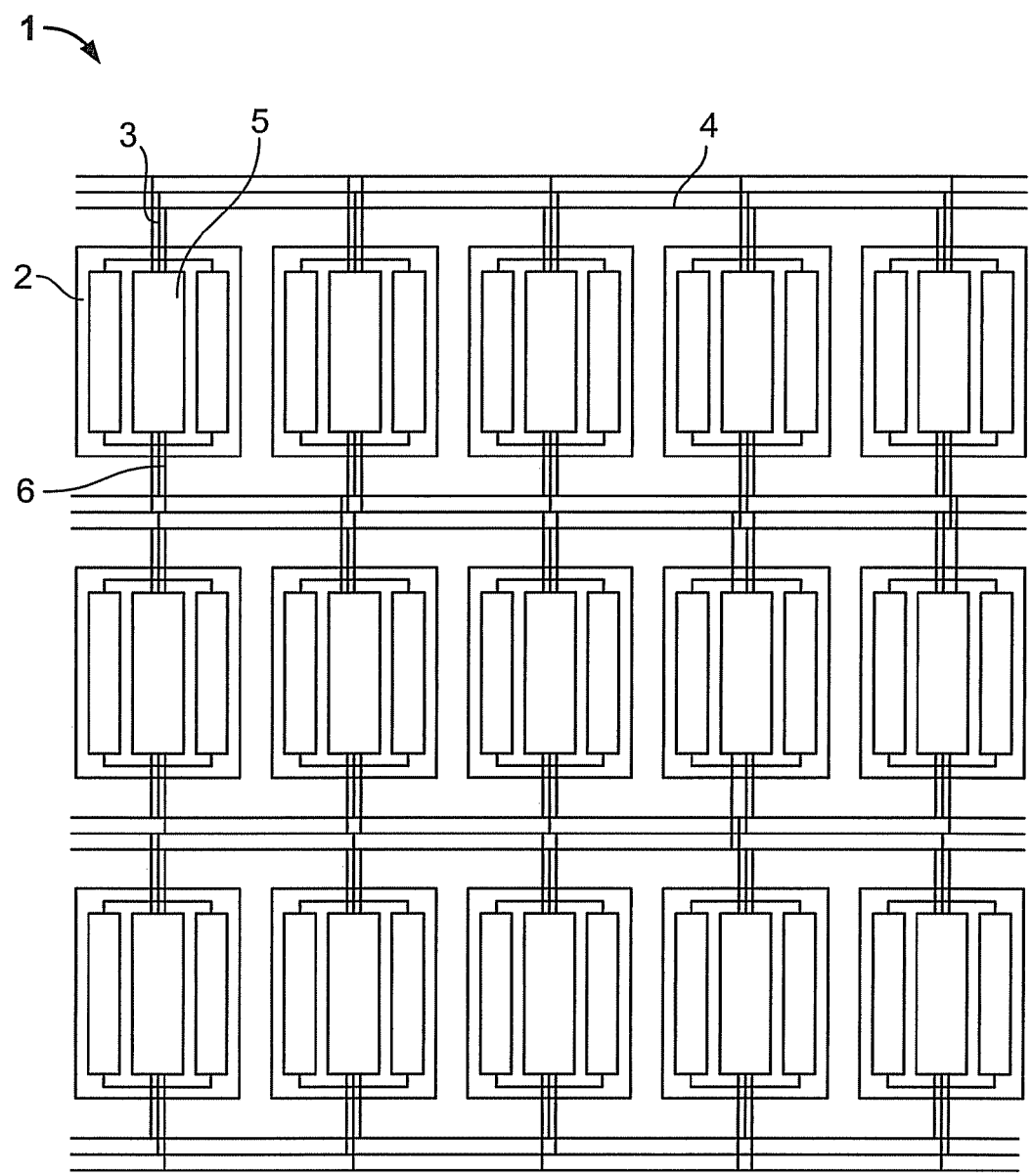
FIG. 4 is a diagram that illustrates an example processing system according to an example embodiment of the present invention.

In an example embodiment, as illustrated in FIG. 4, a processor field 1 (labeled in general as 1) includes a number of adjacent data processing cell elements 2 having inputs 3 which receive data from interconnection paths 4, an operand gating unit 5 which gates them according to the particular function of their operand gating unit 5 and outputs 6 for outputting the gated data on interconnection paths 4, the data processing cells and/or their operand gating unit 5 through which data flows having an aspect ratio of length to width greater than 2:1.

Processor field 1 is preferably a configuration referred to as an Extreme Processing Platform (XPP). Alternatively, it may be arranged as an array of elements partially reconfigurable in runtime, e.g., processor, coprocessor, DSP, etc. The processor field in the example depicted here is composed of three rows and four columns but is selected to be comparatively small only for clarity. Typically it may be much larger.

Data processing cells 2 are configurable in a coarse granular configuration and have fine granular state machines. They are reconfigurable in without interfering with the operation. Reference is made here to the possibility of central configuration preselection, e.g., by a configuration manager, referred to as wave reconfiguration, etc., this possibility being implemented here but not to be explained in greater detail. The cells contain an ALU unit as operand gating unit 5 in which arithmetic operations such as addition, multiplication, subtraction and division may be performed on up to three incoming operands as well as logic operations such as isgreater?, issmaller?, iszero? and XOR, OR, AND, NAND, etc. The ALU unit is centrally located and flanked by a forward register and a backward register, which may also be connected to interconnection paths 4 in a known manner via the terminals of data processing cell 2.

Data inputs and outputs 3 and 6 are connected to interconnection paths 4 via multiplexers. In the present case, a bus system having a plurality of lines is provided to configurably interconnect the cells in the rows and columns.

The aspect ratio of the ALU unit in the example depicted here is 6:1, i.e., the cell is much longer than it is wide.

The system is used, e.g., as follows:

First a program for execution on field 1 is selected. A configuration allowing optimum data throughput is then determined in a conventional manner. In doing so, this takes into account the fact that data may also be received within a processing clock pulse at cells that are not directly in the row beneath or laterally beside a given cell but instead are, for example, offset by three columns laterally, and this may be accomplished without resulting in any major delay. The configuration obtained by taking into account this expanded nearest neighbor definition is configured onto the field and executed there.

However, the present invention relates not only to the advantageous design of a multidimensional field of reconfigurable elements such as in the case of reconfigurable processors but instead it also relates to methods of operating same, e.g., so as to permit translation of a conventional high-level language (PROGRAM) such as Pascal, C, C++, Java, etc., to a reconfigurable architecture.

Frequently, the entire multidimensional field of reconfigurable elements together with all bus systems, connecting lines, etc., provided between the data handling elements is not enabled here for reconfiguration but instead there is a need for assigning a new task to a small partial area of the multidimensional field. Moreover, it is often impossible to predict how this partial area will be designed. This is in particular the case when multiple tasks must be processed simultaneously on the multidimensional field of reconfigurable elements, e.g., by way of multitasking and/or it is impossible to predict when, e.g., in real-time applications, and which resources may be enabled for the purpose of reconfiguration.

In principle there is the possibility of real-time translation of a code which is to be processed in a multidimensional field of reconfigurable elements, i.e., not until processing of other tasks has already begun in order to ascertain how the code which is the next to be executed is to be assigned to certain reconfigurable elements, how the connection between these is to run, which buffer operations are necessary, etc. It is apparent that such a translation procedure requires a comparatively high amount of instantaneous data processing resources. Particularly in critical computer applications that demand maximum computation power, it is desirable not to consume any additional computational power for such a translation during runtime. It is therefore already customary to compile program code even before starting the program and then to determine subconfigurations, each being configured into the field as soon as the particular resources there are free.

However, one problem is that particularly in real-time applications, it is not certain in advance how the particular available resources are arranged. This relates to the functionality of the elements available for data handling into which the configuration may be entered, unless all data handling elements have the same function. It would thus be conceivable to equip various cells in a multidimensional field of reconfigurable elements with arithmetic units designed for floating-point calculations, to provide elements that handle only Boolean data, elements having associated memories, elements having sequencers or in which sequencers may be provided, etc. An embodiment having precompilation here must be instructed, e.g., to wait with the reconfiguration until precisely the cells having the functions and arrangements defined in the precompiling are available. In addition, the smallest function scope shared by all cells must be used in precompiling. Both waste resources. Furthermore, it is not usually clear how the elements enabled for the reconfiguration are arranged and which connections are available. This may also massively impede configuration of a new task into those elements.

The problem becomes even more serious when large areas of the multidimensional field are enabled and in principle there is the possibility and/or compulsion to simultaneously configure multiple configurations for different tasks into the field.

Thus according to one example embodiment of the present invention, a method for operating a multidimensional field of reconfigurable elements is proposed in which groups of elements handling data together are configured in a predetermined manner during runtime for processing predetermined tasks in the field, and where a plurality of such element group arrangements suitable for processing the predetermined task is determined in the multidimensional field for at least one task that is to be processed; for processing of the predetermined task, an element group arrangement which is then particularly suitable is selected from the plurality and the selected arrangement is configured into the field.

The present invention thus proposes that in preparation for the actual data processing, a plurality of arrangements, e.g., configurations, are to be determined in advance, and then one of the predetermined element group arrangements that is particularly suitable for processing the preselected task given the field resources then available is to be selected. This yields a significant improvement in operation of a multidimensional field of reconfigurable elements essentially through a simple expansion of the compiler using which the previously programmed code is translated, namely by the fact that it not only determines a single configuration for a given task but also utilizes multiple such configurations and thus utilizes the fact that there is no unique solution to the problem of translating a section of a given high language code to a multidimensional field of reconfigurable elements. It should be pointed out that the term "compiler" is used here to refer to that which determines the configuration, regardless of whether it is a router part, a translator part or some other part of a means for configuration determination on the basis of program codes. This means may be implemented by hard wiring, i.e., as hardware, or as a software program.

It is possible to make a selection from this plurality of potentially possible configurations that are possible for processing a given code segment and to do so on the basis of the geometry of this element group arrangement in comparison with that of the elements that are available or presumably will soon be available for reconfiguration in the multidimensional field. Thus, by a simple comparison of samples, it is possible to attempt to select a configuration, i.e., an arrangement of element groups, which covers, if possible, all of the elements that have been or will be released and/or leaves unused the fewest possible elements of the multidimensional field. If only the geometry is taken into account, e.g., because all the data handling elements of the multidimensional field have the function scope required for entering a configuration into them, then the selection may be made with algorithms that are known per se as in pattern optimization. Reference may either be made to the elements already available or, in particular with respect to the fact that the reconfiguration often includes the transfer of configuration data to the elements, and such a transfer of reconfiguration data takes time, it is possible to provide for the fact that elements which will presumably soon be available are also taken into account in the selection of the particular optimum geometry. It is possible to utilize here the fact that it is often possible to predict that certain elements will soon be available for reconfiguration, e.g., when they have received data for further processing from cells that have already indicated their reconfigurability and the number of processing cycles still necessary of data-downstream cells is finite and estimable or known. Such information may be managed according to the present invention as a reconfigurability prediction. It should also be pointed out that bus connections, lines, etc., are also included with the available and/or required elements.

The choice of optimum configuration may be made in a preprocessor or in a partial area of the multidimensional field of the reconfigurable elements and in particular may be taken over by a data processing program and/or means that coordinates the performance of the various tasks in time, perform prioritizations, etc. This may be in particular a part of an operating system if the multidimensional field of reconfigurable elements is designed as a processor or coprocessor. The usability of the CT, a scheduler for hyperthreading, multitasking, multithreading, etc., should also be pointed out here. Reference is made to other corresponding parts of the present patent application in this regard. It should also be pointed out that such units are implementable in hardware and/or software.

In particular when configuration data is input from a memory having access times that are not negligible and/or when it is to be generated using generation times that are not negligible, should a real-time determination of a configuration be desired, then it is desirable to first provide a characteristic data record which is reduced in size in comparison with the actual configuration data record and then to make a selection only on the basis of this characteristic data record. For example, in loading a new configuration from a slow memory such as a hard drive, at first only a characteristic data record and/or a characteristic data record group pertaining to the outlines of the configuration may be downloaded. Such an outline characteristic data record is typically greatly reduced in size in comparison with the complete configuration data record, so it is also possible to load a plurality of characteristic data records for a plurality of different configurations in advance into a main memory which allows very rapid access, to make a rapid selection on the basis of the different configuration data records and then to download from the slow memory the complete configuration data for the selected configuration. It should be pointed out that in such cases it is also possible to input a portion of the configurations in advance, e.g., when it is foreseeable that certain configurations are typically preferred, whether because statistical analyses of the typical data processing operation for a plurality of multidimensional fields of reconfigurable elements or for a single multidimensional field have shown this, e.g., because it has been found by analysis of typical tasks that certain reconfigurations occur with a particular frequency for a group of applications such as in UMTS base station applications, or because it has been found that for a single user the same applications must always be configured into the field simultaneously in a certain way. Advance loading of certain configurations may also be appropriate when these configurations are characterized by a particularly simple geometry, e.g., because very small volumes of the multidimensional field of reconfigurable elements are covered by it ("volumes" here refers to the volume of the multidimensional field, so in the case of two-dimensional fields of reconfigurable elements it denotes the area and/or area geometry of the reconfigurable elements, etc. available for reconfiguration).

It is also possible and even preferable, in particular in processing complex tasks, whether by processing particularly computation-intense problems, in multitasking, multithreading or in other forms of parallel processing of data, to review whether multiple element group arrangements, in particular those having the same priority for different tasks, are simultaneously configurable into the field through a suitable choice. Depending on the prioritization of a certain task, it is possible to provide for the area or processing time made available for the processing of a preselected task to turn out larger or smaller, e.g., by designing sequencers having data handling elements, so that the size of a configuration, which slows down data processing, is reduced.

It may also be desirable for a first element group arrangement to be first configured into the field and to begin to process the task using this element group arrangement until a preselected event occurs and then to continue with task processing in another element group arrangement with at least partial reconfiguration. It is possible to provide here, for example, that to achieve a preferred geometry of configurations in the multidimensional field, e.g., cells arranged in strips one behind the other for each task, the processing of all or a portion of all configurations to be interrupted at clock times to be defined, e.g., one every thousand, ten thousand or one hundred thousand clock cycles, and the results to be stored in the buffer as necessary, even with regard to data necessary only internally in a configuration such as loop states, counter states, etc., and then to perform a new configuration having corresponding preferred geometries to thus prevent a gradual disintegration of configurations, which is undesirable even because of the increased demand for bus lines.

Alternatively and/or additionally, it is also possible to provide self-folding configurations, first beginning with processing of a configuration over the entire array of cells in the field and then, as soon as additional resources are requested by another task, shrinking this first configuration more or less automatically, e.g., by forming a sequencer having an element to enable elements for the new task. This shrinking may be achieved by specifying new space-saving configurations for one and the same task, in particular also when these space-saving configurations are stored in configuration memories provided for data handling elements. Reference is made here to the patent application for wave reconfiguration only as an example. This then results in a situation in which the configurations gradually become tighter and tighter.

The choice of a preselected element group arrangement which is to be configured into a field may also be made to depend on other parameters, apart from the available geometry. This includes, among other things, the processing rate achievable, the priority of a task and/or the energy consumption required for processing a preselected task in a preselected time. It should be pointed out that multiple parameters may be considered at the same time, either by discarding, using a second parameter, configurations regarded as equivalent by considering a first parameter such as the required field volume, or by optimizing multiple parameters as much as possible at the same time, e.g., by fuzzy logic methods.

The present invention will now be explained in greater detail below with reference to FIGS. 5a-5c.

Figure 5A:
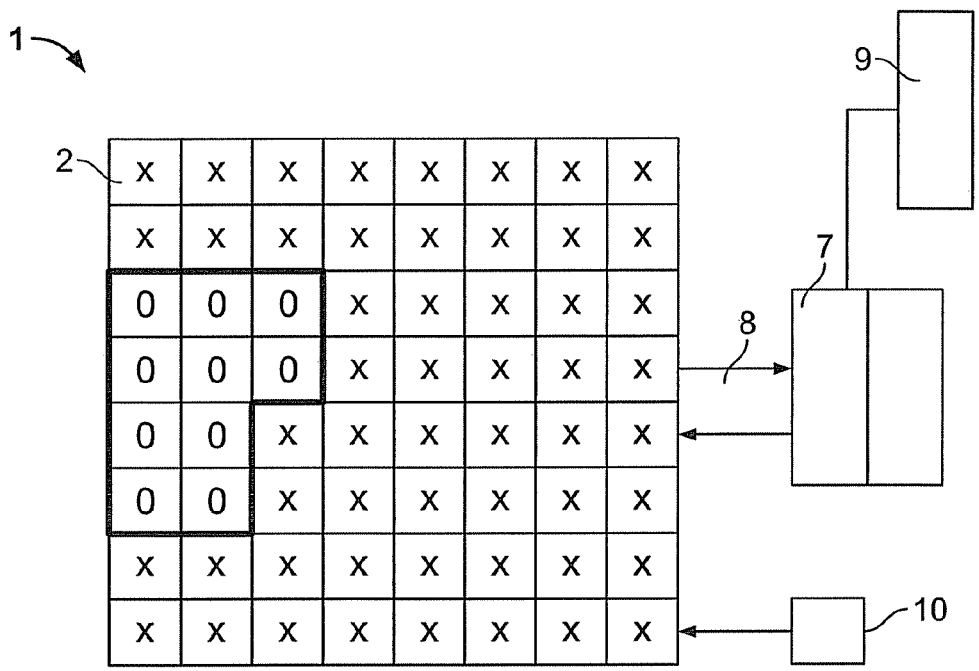
FIG. 5a illustrates a multidimensional field of data handling elements in a state that is to be partially reconfigured, according to an example embodiment of the present invention.

FIG. 5a illustrates the multidimensional field 1 of reconfigurable elements 2 and a preprocessor 7. The preprocessor 7 may feed configurations into the multidimensional field 1 via suitable data buses 8, may receive information via reconfigurable elements from the multidimensional field of multiple elements, and may have a memory 9 having slow access in which configurations for tasks to be processed in the multidimensional field 1 are stored in advance.

Multidimensional field 1 in the present example is an XPU architecture having PAEs as configurable elements and constructed according to PACT02, 04, 08, 10, 13. It receives data from input/output interfaces 10 in real time for processing, but it is impossible to predict how this data will arrive and/or how it is to be processed. A keyboard, imaging cameras, A/D converters, etc. may be provided for this purpose.

To simplify the illustration, although this is by no means mandatory from a technological standpoint, multidimensional field 1 is made up of mainly only one row of exclusively identical data handling elements between which suitable interconnections via buses and the like are configurable. For reasons of simplicity, unlimited bus resources are assumed in the present case, although from a purely practical standpoint the typical application will also take into account such resources and a shortage thereof when determining multiple configuration possibilities in advance. The data handling elements are suitable in the present case for processing the commands sequentially, e.g., with a construction of sequencers over individual cells or groups thereof. The fact that time division multiplexing is possible here should also be mentioned. This allows a corresponding folding of multiple operations which may then also be unfolded in a large array or when there is more space.

Multidimensional field 1 is run-time reconfigurable, i.e., it is possible to assign new tasks to individual elements or groups thereof during runtime without interrupting operation of the entire system or other elements and/or groups thereof as a whole. Configuration memories may be assigned locally to the data handling elements like registers, namely forward and backward registers, bus lines, finely granular state machines for exchanging trigger signals with one another and with preprocessor unit 7, etc. Reference should be made to the possibility of embodying the reconfigurable elements according to PCT/DE97/02949, PCT/DE97/02998, PCT/DE98/00334, PCT/DE99/00504, PCT/DE99/00505, PCT/DE00/01869, etc., which are incorporated herein by reference.

Preprocessor 7 is designed to load configurations into the multidimensional field via lines 8, as it receives from the multidimensional field the message that individual elements or groups thereof are reconfigurable. The preprocessor 7 contains a local memory (cache) and is connected to another memory 9 (hard disk, RAM) to which slower access is possible on the configuration data which is stored. For example, a CT is suitable here.

It should be pointed out that it is not necessary to provide preprocessor 7 as an external component. The diagram depicted here was used only for didactic reasons. The preprocessor may be integrated with multidimensional field 1 on a single chip and/or its function may be executed by individual data handling elements 2 of the processor field.

Configuration data and configuration requests are transmitted over lines 8. Reference is made here to the implementation of Rdy/Ack protocols, advance configuration of elements in element-near memories, etc., which is possible but not obligatory.

A plurality of configurations for different tasks and characteristic data is now stored for this purpose in memory 9. This is illustrated for a simple example with reference to FIG. 5b.

Figure 5B:
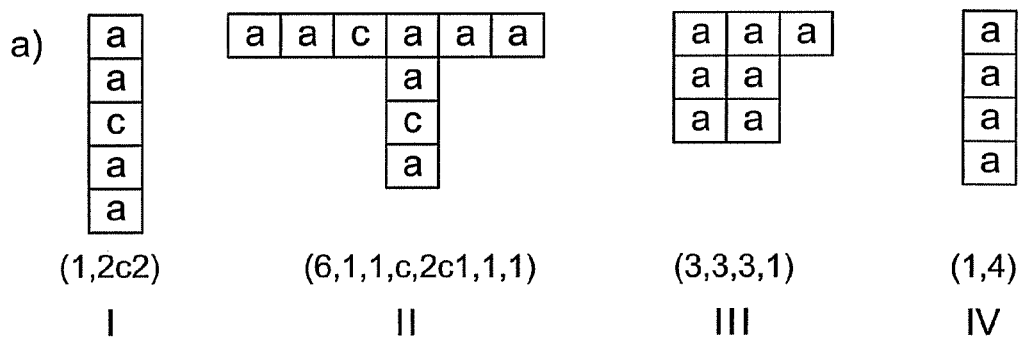
FIG. 5b illustrates examples of different configuration geometries.
Figure 5B:
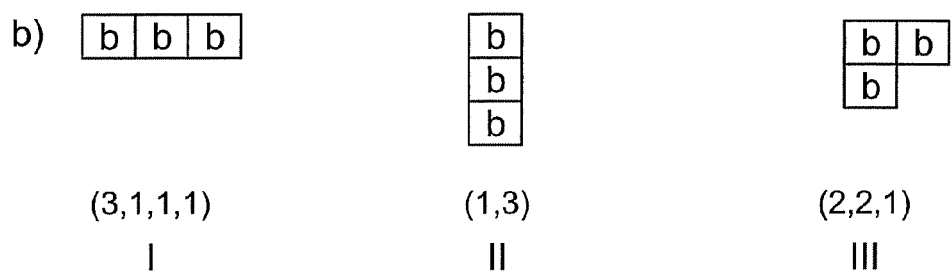

An example of storing configurations for two tasks a) and b) is illustrated in FIG. 5b. As may be seen, a total of four configurations have been saved for task a), all configurations executing the same function but having different interconnections of cells and differing in particular with regard to their external geometric shape in which the cells are arranged.

As may be seen, three configurations, for example, have been saved in advance in which seven data handling elements such as PAEs are needed, and one configuration in which only four elements are needed, utilizing the sequencer property of the data handling elements. The geometric shape of the particular configuration is also saved, as indicated by the numbers in parentheses. This characteristic data record includes a first number which indicates how many columns of distance there are between the outermost cells on the right and left; it is followed after a comma by the number of elements needed in a column. If rows are free, i.e., not occupied in a column, there is also a b in the identifier. If a column has been left free here, i.e., is not occupied by the particular configuration except for buses, then a b will stand here in the configuration. This may be seen in configurations I and II. The data for a column is separated from the data in the next column by a comma. Similar configuration data is also stored for a second configuration b).

The System is Used as Follows:

When resources are freed for reconfiguration in the multidimensional field of reconfigurable elements, as represented by the "0" in FIG. 5a, preprocessor 7 first loads the characteristic data records, which are initially not very extensive and thus may be loaded rapidly out of memory 9, for the configurations. It then determines which task is to be processed rapidly and which configurations may be loaded particularly well into the field jointly. This is done by comparing the maximum column widths of a possible configuration with the actually available column width. With regard to task a), configurations III and IV which require too many columns may thus be discarded. Of the remaining configurations, configurations I and II are also to be discarded because of the geometric shape. There is then a check to determine which configuration should be loaded from b). All three configurations here are loadable per se.

To be investigated now is whether there is a possibility of simultaneously loading two configurations of the remaining configurations into the field for the tasks. To do so, the configurations are compared in different ways and the required maximum number of columns and rows is compared with the available maximum number. It is determined in this way that optimum utilization of the elements that have been freed is obtained when configuration Ib and configuration Ia are arranged directly above one another. These configurations are then loaded into the processor field.

Data processing is then continued with a configuration system as shown in FIG. 5c. It should be pointed out that in cases in which different data handling elements are provided, the corresponding information may likewise be stored in the characteristic data record.

As shown above, the manner in which a given processor field must be configured for a preselected method is not unique. This is true in particular when complex fields are involved, registers being provided in at least some of the lines, and additions and/or comparisons of data are to be performed using these fields in particular as may also be the case in logic cells of the field, which have arithmetic logic units (ALUs). It is frequently also possible and/or necessary, e.g., in startup, to select multiple possible configurations from many configurations.

There have already been proposals for selecting one configuration from several that are usable per se and doing so on the basis of the instantaneous configurability under geometric aspects, resource availability and/or to be selected on the basis of speed aspects. This may facilitate the choice but it often constitutes only inadequate criteria. It is desirable to be able to further improve the configuration choice. It is also frequently possible to perform a certain data processing task in different ways. For example, a number of algorithms are known which make it possible to sort a set of data in different ways. Here again, it is necessary to choose between different algorithms, which are suitable in principle for handling a certain data processing task, on the basis of objectifiable criteria. It should be pointed out that this choice may be made in runtime and/or prior to that. On the whole, it is thus desirable to improve selection possibilities in data processing using configurable multidimensional processor fields, e.g., to ensure in the case of fixedly stored configurations that a choice that has already been optimized for the intended purpose has been made.

The present invention thus proposes in a first basic idea a method for selecting one of a plurality of means of achieving a data processing result in data processing with at least possible use of multidimensional fields of configurable data handling elements, in which characterizing quantities based on consumption are assigned to the data handling elements as a function of the configuration and a path shall be selected on the basis of the assignment.

Another basic idea may thus be regarded as being based on the recognition that typical performance and/or energy consumption values may be assigned to certain data processing paths to then perform a selection of paths by taking into account these values. A certain method for calculation of interim results and/or data handling, etc., is considered as achieving a data processing result. Thus, a significant objectification of the selection of paths is made possible by the assignment of qualities characterizing consumption.

The selection of a path may include, for example, the choice of a given algorithm from a plurality of different algorithms, whether for tasks such as sorting data, certain mathematical transformations or the like. If there are multiple sorting algorithms, algorithms for determining a Fourier transform or the like available in a program module library, then a variable characterizing consumption may be determined for each, for example, and then a selection may be made taking this variable into account. For example, it is possible to select algorithms having a particularly low energy consumption, for example. This may be appropriate for mobile applications such as laptops, cellular telephones and the like, but it also offers advantages in areas in which highly computation-intensive tasks are to be handled, e.g., servers, base stations, etc., where the power generated in a processing unit must be cooled and/or dissipated. Thus, overall system costs may be minimized through the present invention. Furthermore, in an example embodiment of the present invention, a place and route algorithm, for example, may utilize the optimization, e.g., to achieve low-energy systems.

It is also possible to provide a plurality of different configurations for one and the same algorithm, e.g., taking into account different partial tasks to be configured simultaneously and/or sequentially on the multidimensional field and then to perform a selection from them by analyzing the particular variable assigned.

It is also possible by using the method according to the present invention to discover whether a given task of data processing and/or a partial task is to be assigned to the multidimensional field of configurable data handling elements in question and/or another element for data processing outside of the multidimensional field. It is thus possible to decide, for example, whether a certain partial task is to be processed better on a purely sequentially operating CPU or in the reconfigurable multidimensional field, typically operating as a data flow processor or the like. It is also possible to investigate the requirement or the suitability of dedicated circuits such as ASICs for certain tasks.

The field of configurable data handling elements is typically a two-dimensional field. It should be pointed out that the present invention is applicable for fields such as FPGAs, XPP processors, etc. It is applicable for elements configurable in runtime, e.g., elements of partially reconfigurable processor fields, said elements not being reconfigurable during runtime without interference.

In applications such as XPP fields, some or all the elements, e.g., buses, registers, ALUs, RAMs, I/O ports and configuring units (CTs) are included as data handling elements to be taken into account. It should be pointed out that of certain of these parts only one estimated or partial consumption consideration is necessary. For example in the case of buses, only certain driver stages and the like need be taken into account. In addition, it may also be necessary to detect clock circuits—either because a full or partial shutdown of a clock branch is possible in certain data processing paths or because certain circuit areas may or must be supplied with a different clock pulse.

In one example embodiment, the characterizing value may be estimated only roughly, e.g., to the extent that there is a determination as to whether a certain element is being used at the moment and/or configured or whether instead it is not being used and, if necessary, is at least mostly disconnected from a voltage supply up to and including a wake-up circuit and/or from a clock pulse supply. It is thus not necessary to perform an absolutely accurate consumption characterization, e.g., with a determination of the consumption of the specific algebraic operation which is assigned to a particular arithmetic logic unit momentaneously and/or permanently. Instead it may be sufficient to determine the consumption characterizing variable only to determine whether and to what extent the particular element is actually being used at the moment. Exceptions to this are possible. An exception may be made in particular for operations such as multiplication in which very large circuit areas must be supplied with power. Additional detailing may be provided in such a case.

It is possible to assign different characteristic values such as current and/or power consumption-based variables as variables characterizing consumption to each different data handling element. If necessary, this may be done as a function of the clock cycle (power consumption per clock frequency). In addition, it is possible to make a selection by taking into account a cumulative value, e.g., to decide on the basis of considering the total consumption or the estimated total consumption of a path being considered.

The choice is typically made not merely taking into account the variables characterizing consumption but may also include other parameters, e.g., a required execution time, required resources in a multidimensional field, existing or anticipated processor utilization by other tasks and/or a currently desired and/or anticipated or allowed power consumption. The characteristic values are obtainable via measured values and/or hardware analyses and/or synthesis analyses and may be stored in look-up tables in particular.

The choice of the particular path may be made before the actual data processing, e.g., at the time of determining configurations to be loaded later among several, theoretically implementable configurations. In such a case, it is preferable in particular if the characterizing variable is also determined during simulation of the data processing functions. Alternatively, the choice of different possible paths may be made during runtime. In such a case, several possible algorithms, e.g., for sorting data, will be made available, and then there will be a query of how many individual bits of data are to be sorted and, if necessary, what the degree of ordering of this data is, and only then will a choice be made among various predetermined algorithms on the basis of the parameterized consumption characterizing variables such as the total power consumption, etc., assigned to them. Likewise, a configuration may also be implemented in runtime as a function of a desired or momentarily possible power consumption, for example.

This aspect of the present invention is described below only as an example without reference being made to a figure.

First, a desired type of data processing, which is to be performed in the processor field, is defined. For example, a Viterbi algorithm is programmed and a configuration suitable for the processor field in question is determined. It is then determined which units are used on the processor field and over how many cycles this is to take place. In a consideration of the elements used, ALUs, forward and backward registers (FREG and BREG) and switches in buses (LSW and RSW) are taken into account in one example. The total energy consumption per type of element is then determined, and then the total energy consumption of all the different units is determined. Energy consumption values for a single element per cycle are estimated from simulations of the hardware circuits in the architecture in question and are stored in the form of tables for the method according to the present invention.

In the practical example being considered here, 10 ALUs, 17 forward registers, 23 backward registers and 30 bus switches (LSW) are required in one direction and 35 switches are required in the opposite direction (RSW) for implementation of a given Viterbi algorithm. At an energy consumption of 4.85 pW/Hz per ALU, 7.01 pW/Hz per FREG, 7.02 pW/Hz per BREG and 2.03 pW/Hz per bus switch, this yields the following table:

Number of Cycles: 1582

| | Energy consumption | |
| --- | --- | --- |
| | Individual characteristic value | Overall characteristic value |
| ALU: | 10.00 × 4.85 = | 48.50 |
| FREG: | 17.00 × 7.01 = | 119.17 |
| BREG: | 23.00 × 7.02 = | 161.46 |
| LSW: | 30.00 × 2.03 = | 60.90 |
| RSW: | 35.00 × 2.03 = | 71.05 |
| | Total: | 461.08 pW/Hz |

A total power consumption of 461.08 pW/Hz may now be assigned to the implementation of the Viterbi transformation, and the value obtained in this way may be compared with values obtained for other algorithms and/or configurations and/or through dedicated circuits such as ASICs.

It should now be pointed out that the choice of one of a plurality of configurations may also be appropriate when the data processing logic cell field and/or (equivalent to that here) a mixed field of analog and/or digital cells (as described) is connected to a CPU, in particular a sequential CPU.

However, a problem with conventional approaches for reconfigurable technologies is often encountered when the data processing is to be performed primarily on a sequential CPU using a configurable data processing logic cell field or the like and/or a data processing in which many and/or extensive processing steps are to be performed sequentially is desired.

There are conventional approaches which are concerned with how data processing may take place in a configurable data processing logic cell field as well as in a CPU.

Thus a method is discussed in WO 00/49496 for executing a computer program using a processor which includes a configurable functional unit capable of executing reconfigurable instructions whose effect may be redefined in runtime by loading a configuration program; this method includes the steps of selecting combinations of reconfigurable instructions, generating a particular configuration program for each combination and executing the computer program. Each time an instruction from one of the combinations is used during the execution and the configurable functional unit is not configured using the configuration program for this combination, the configuration program should be loaded into the configurable functional unit for all the instructions of the combination. In addition, a data processing device having a configurable functional unit is also discussed in WO 02/50665 A1; in this case, the configurable functional unit executes an instruction according to a configurable function. The configurable functional unit has a plurality of independent, configurable logic blocks for execution of programmable logic operations to implement the configurable function. Configurable connection circuits are provided between the configurable logic blocks and both the inputs and outputs of the configurable functional unit. This allows optimization of the distribution of logic functions over the configurable logic blocks.

One problem with conventional architectures is also encountered when there is to be a coupling and/or when technologies such as data streaming, hyperthreading, multithreading and so forth are to be utilized in an appropriate performance-enhancing manner. The conventional technology of WO 00/49496 and WO 02/50665 A1 cited previously and mentioned here as an example shows approximately an arrangement for which configurations may be loaded into a configurable data processing logic cell field but in which data exchange between the ALU of the CPU and the configurable data processing logic cell field, whether an FPGA, a DSP or the like, takes place via the registers. In other words, data from a data stream must first be written sequentially into registers and then stored in them again sequentially. A problem also occurs when data is to be accessed externally because there are still problems even then in the chronological sequence of data processing in comparison with the ALU and in the assignment of configurations and so forth. The conventional arrangements will be used for, among other things, processing functions in the configurable data processing logic cell field, DSP, FPGA or the like, this data not being efficiently processable by the ALU included in the CPU. The configurable data processing logic cell field is thus used practically to permit user-defined opcodes, which allow more efficient processing of algorithms than would be possible in the ALU arithmetic unit of the CPU without configurable data processing logic cell field support.

In the related art, it has been found, the coupling is thus usually word-based but not block-based, as would be necessary for processing by data streaming. It would first be desirable to permit a more efficient data processing than is the case with close coupling via registers.

Another possibility for using logic cell fields of logic cell elements and logic cells having a coarse- and/or fine-granular structure includes a very loose coupling of such a field to a conventional CPU and/or a CPU core in embedded systems. A conventional sequential program may run here on a CPU or the like, e.g., a program written in C, $C^{++}$ or the like, requests for a data stream processing on the fine- and/or coarse-granular data processing logic cell field being instantiated thereby. It is then problematical that when programming for this logic cell field, a program not written in C or another sequential high-level language must be provided for data stream processing. It would be desirable here for C programs or the like to be processable both on the conventional CPU architecture and on a data processing logic cell field operated jointly with it, e.g., such that a data stream capability nevertheless remains in particular with the data processing logic cell field in quasi-sequential program processing, while simultaneously a CPU operation remains possible in a coupling which is not too loose. Within a data processing logic cell field system such as that discussed in PACT02 (DE 196 51 075.9-53, WO 98/26356), PACT04 (DE 196 54 846.2-53, WO 98/29952), PACT08 (DE 197 04 728.9, WO 98/35299), PACT13 (DE 199 26 538.0, WO 00/77652), and PACT31 (DE 102 12 621.6-53, PCT/EP02/10572), sequential data processing may be provided within the data processing logic cell field. However, to save on resources within a single configuration, e.g., to achieve time optimization etc., a partial processing is achieved without resulting in a programmer automatically being able to easily convert a piece of high-level code to a data processing logic cell field, as is the case with conventional machine models for sequential processors. It is also difficult to implement high-level program code on data processing logic cell fields according to the principles of models for sequentially operating machines.

It is also known from the related art that several configurations, each of which prompts a different mode of operation of array parts, may be processed simultaneously on the processor field (PA) and there may be a change of one or more of the configurations without interfering with others in runtime. Methods and means implemented in hardware for implementation thereof are known, for ensuring that processing of subconfigurations to be loaded into the field may be performed without a deadlock. Reference is made here in particular to the patent applications pertaining to the FILMO technique, PACT05 (DE 196 54 593.5-53, WO 98/31102), PACT10 (DE 198 07 872.2, WO 99/44147, WO 99/44120), PACT13 (DE 199 26 538.0, WO 00/77652), and PACT17 (DE 100 28 397.7, WO 02/13000). This technology already permits parallelization to a certain extent and, with appropriate design and allocation of the configuration, also permits a type of multitasking/multithreading such that planning is provided, e.g., scheduling and/or time use planning control. Time use planning control means and methods are already known per se from the related art; these means and methods allow multitasking and/or multithreading at least when configurations are suitably assigned to individual tasks and/or threads to configurations and/or configuration sequences. In an example embodiment of the present invention, such time use planning control means, which have been used in the related art for configuring and/or configuration management, may be used for the purposes of scheduling of tasks, threads, multithreads and hyperthreads.

In an example embodiment of the present invention, the capability may be provided for supporting modern technologies of data processing and program processing, such as multitasking, multithreading, hyperthreading, at least in preferred variants of a semiconductor architecture.

In an example embodiment of the present invention, data is supplied to the data processing logic cell field in response to the execution of a load configuration by the data processing logic cell field and/or data is written (STORE) from this data processing logic cell field by processing a STORE configuration accordingly. These load and/or memory configurations may be designed so that addresses of memory locations which are to be accessed directly or indirectly by loading and/or storing are generated directly or indirectly within the data processing logic cell field and/or another unit such as an RISC architecture. By configuring address generators within a configuration in this way, it is possible to load a plurality of data bits into the data processing logic cell field, where it is storable in internal memories (iRAM), if necessary, and/or where they may be stored in internal cells such as EALUs with registers and/or similar separate memory means. The load configuration and/or memory configuration thus permits blockwise loading of data almost like data streaming, in particular being comparatively rapid in comparison with individual access, and such a load configuration may be executed before one or more configurations that actually analyze and/or alter data in processing, using which data loaded previously is processed. In the case of large logic cell fields, data loading may typically be performed in small subareas of the same, while other subareas are involved with other tasks. In ping-pong-like data processing in which memory cells are provided on both sides of a data processing field, the data streaming in a first processing step from the memory on one side through the data processing field to the memory on the other side, the interim results obtained in the first field data stream-through being stored there in the second memory, the field being reconfigured, if necessary, the interim results then streaming back for further processing, etc., one memory side may be preloaded with new data by a LOAD configuration in an array part while data from the opposite memory side is written with a STORE configuration in another part of the array. This simultaneous LOAD/STORE procedure is also possible even without spatial separation of memory areas.

Data may be loaded in particular out of a cache and into it. This has the advantage that external communication with large memory banks is handled via the cache controller without having to provide separate circuit arrangements for this within the data processing logic cell field; read or write access with cache memory means is typically very rapid and has a short latency time, and typically a CPU unit is connected to this cache, typically via a separate LOAD/STORE unit so that access to and exchange of data between the CPU core and the data processing logic cell field may take place blockwise rapidly, in such a way that a separate instruction need not be retrieved from the opcode fetcher of the CPU and processed for each transfer of data.

This cache coupling has also proven to be much more advantageous than coupling of a data processing logic cell field to the ALU via registers when these registers communicate with a cache only via a LOAD/STORE unit, as is known from the non-PACT Technologies publications cited previously.

Another data connection may be provided to the load/memory unit of the or a sequential CPU unit allocated to the data processing logic cell field and/or the registers thereof.

It should be pointed out that such units may respond via separate input/output terminals (IO ports) of the data processing logic cell system, which may be designed, e.g., as a VPU or an XPP and/or via one or more multiplexers downstream from an individual port.

It should also be pointed out that in addition to blockwise reading and/or writing access and/or streaming access and/or random access in particular, in particular in RMW mode (read-modify-write mode), to cache areas and/or the LOAD/STORE unit and/or the connection (known per se in the related art) to the register of the sequential CPU, there may also be a connection to an external bulk memory such as a RAM, a hard drive and/or some other data exchange port such as an antenna and so forth. A separate port may be provided for this access to memory means different from a register unit and/or cache means and/or a LOAD/STORE unit. It should be pointed out that suitable drivers, signal processors for level adjustment and so forth may be provided here. Moreover, it should be pointed out that the logic cells of the field may include ALUs and/or EALUs in particular but not exclusively for processing a data stream flowing into the data processing logic cell field or flowing within it and are typical. Short, fine-granular configurable FPGA-type circuits may be provided at the input and/or output ends of these cells, in particular at both the input and the output ends, to cut out 4-bit blocks from a continuous data stream, as is necessary for MPEG-4 decoding. This is advantageous first when a data stream is to enter the cell and is to be subjected to a type of preprocessing there without blocking larger PAE units. This is also advantageous in particular when the ALU is designed as an SIMD arithmetic unit, a very long data input word having a data length of 32 bits, for example, being then split over the upstream FPGA-type strip, for example, into multiple parallel data words having a length of 4 bits, for example, which may then be processed in parallel in the SIMD arithmetic unit, which is capable of significantly increasing the overall performance of the system if required by a corresponding application. It should be pointed out that FPGA-type upstream or downstream structures were discussed above. However, it should also be pointed out explicitly that FPGA-type does not necessarily refer to 1-bit granular systems. In particular, it is possible to provide only fine-granular structures having a 4-bit length, for example, instead of these hyperfine granular structures. In other words, the FPGA-type input and/or output structures upstream and/or downstream from an ALU unit designed in particular as an SIMD arithmetic unit are configurable so that data words 4-bits long are always supplied and/or processed. It is possible to provide cascading here, so that the incoming 32-bit-long data words, for example, flow into four separate, e.g., separating 8-bit FPGA-type structures arranged side by side, these four 8-bit-wide FPGA-type structures have a second strip with eight 4-bit-wide FPGA-type structures downstream from them and, if necessary, downstream from another such strip, sixteen 2-bit-wide FPGA-type structures arranged side-by-side in parallel are then provided for example, if this is considered necessary for the particular purpose. If this is the case, a considerable reduction in configuration complexity may be achieved in comparison with purely hyperfine granular FPGA-type structures. It should also be pointed out that this results in the configuration memory and thus also the FPGA-type structure possibly turning out to be much smaller, thus permitting savings in chip surface area.

In principle, the coupling advantages described above are feasible in the case of data block streams through the cache. In one example embodiment, the cache may be configured in strips (like slices) and simultaneous access to multiple slices is then possible, in particular to all slices at the same time. This is advantageous when, as will be discussed below, a plurality of threads are to be processed in the data processing logic cell field (XPP) and/or the sequential CPU(s), whether by way of hyperthreading, multitasking and/or multithreading. Cache memory means having disk access and/or disk access enabling control means are thus preferably provided. For example, a separate disk may be assigned to each thread. This makes it possible to later ensure in processing the threads that the corresponding cache areas are accessed in each case on resumption of the instruction group to be processed with the thread.

It should be pointed out again that the cache need not necessarily be divided into slices, and if this is the case, each slice need not necessarily be assigned to a separate thread. However, it should be pointed out that this is by far the preferred method. It should also be pointed out that there may be cases in which not all cache areas are utilized simultaneously or temporarily at a given point in time. Instead, it is to be expected that in typical data processing applications, such as those encountered in handheld mobile telephones (cell phones), laptops, cameras and so forth, there are often times during which the entire cache is not needed. Therefore, in an example embodiment of the present invention, individual cache areas may be separable from the power supply in such a way that their energy consumption drops significantly, e.g., to zero or close to zero. In a slice-wise embodiment of the cache, this may be implemented by slice-wise shutdown of same via suitable power disconnect means. The power may be disconnected by downclocking or disconnecting the clock or the power. In one example embodiment, an access recognition may be assigned to an individual cache disk or the like, this access recognition being designed to recognize whether a particular cache area and/or a particular cache disk has a thread, hyperthread or task by which it is used assigned to it at the moment. If it is then discovered by the access recognition that this is not the case, typically a disconnection from the clock pulse or even the power will be possible. It should be pointed out that when the power is turned back on after a disconnect, an immediate resumed response of the cache area is possible, i.e., no significant delay is to be expected due to the power supply being turned on and off if there is an implementation in hardware using conventional suitable semiconductor technologies.

Another particular advantage obtained with an example embodiment of the present invention is that although there is particularly efficient coupling with respect to the transfer of data, e.g., operands, in blockwise form, balancing is nevertheless not necessary in such a manner that exactly the same processing time is necessary in sequential CPU and XPP, e.g., a data processing logic cell field. Processing is instead performed in a manner that is practically often independent, in particular in such a way that the sequential CPU and the data processing logic cell field system may be considered as separate resources for a scheduler or the like. This allows an immediate implementation of known data processing program splitting technologies such as multitasking, multithreading and hyperthreading. The resulting advantage that path balancing is not necessary results in being able to run through any number of pipeline stages in the sequential CPU, for example, clock pulses being possible in various ways and so forth. Another advantage of an example embodiment of the present invention is that by configuring a load configuration and/or a store configuration into the XPP or other data-processing logic cell fields, data may be loaded into or written out of the field at a rate that is no longer determined by the clock speed of the CPU, the rate at which the opcode fetcher works, or the like. In other words, the sequence control of the sequential CPU is no longer the limiting bottleneck factor in data throughput by the data cell logic field without even a loose coupling.

In one example embodiment of the present invention, it is possible to use the CT known for an XPP unit (and/or CM; configuration manager and/or configuration table) to use the configuration of one or more XPP fields arranged hierarchically with multiple CTs and at the same time to use the configuration of one or more sequential CPUs, as a quasi-hyperthreading hardware management/scheduler; this has the inherent advantage that conventional technologies such as FILMO, etc. may be used for the hardware-supported management in hyperthreading; alternatively and/or additionally, in particular in a hierarchical arrangement, it is possible for a data processing logic cell field such as an XPP to receive configurations from the opcode fetcher of a sequential CPU via the coprocessor interface. As a result, a request may be instantiated by the sequential CPU and/or another XPP, resulting in data processing on the XPP. The XPP then continues with data exchange, e.g., via the cache coupling described here and/or via the LOAD and/or STORE configurations, which provide address generators for loading and/or overwriting data in the XPP and/or data processing logic cell field. In other words, this permits coprocessor-type coupling of the data processing logic cell field, while at the same time data stream-type data loading is performed by cache coupling and/or I/O port coupling.

It should be pointed out that coprocessor coupling, e.g., coupling the data processing logic cell field, typically results in the scheduling for this logic cell field also taking place on the sequential CPU or a higher level scheduler unit and/or a corresponding scheduler means. In such a case, in practice, threading control and management take place on the scheduler and/or the sequential CPU. Although this is possible per se, it is not necessarily the case, at least in the simplest implementation of the present invention. The data processing logic cell field may instead be used via request in the conventional way, e.g., as in the case of a standard coprocessor with 8086/8087 combinations.

It should also be pointed out that in an example embodiment of the present invention, regardless of the type of configuration, whether via the coprocessor interface, the configuration manager (CT) of the XPP, and/or of the data processing logic cell field, also functioning as a scheduler, or the like or in some other way, it is possible to address memories, in particular internal memories (in or directly on the data processing logic cell field, e.g., with the management of the data processing logic cell field), in particular in the XPP architecture, such as that known from various previous applications and publications by, of, or assigned to PACT Technologies, RAM PAEs or other similarly managed memories or internal memories like a vector register, i.e., it is possible to store in the internal memories the volumes of data loaded via the LOAD configuration like vectors as in vector registers and then to access this data as in a vector register after reconfiguring the XPP, i.e., the data processing logic cell field, i.e., after overwriting, i.e., reload and/or activating a new configuration that performs the actual processing of data (in this context it should be pointed out that for such a processing configuration, reference may also be made to a plurality of configurations which are to be processed, e.g., in wave mode and/or sequentially in succession) and then to store the results thus obtained and/or interim results back in the internal memories or in external memories managed via the XPP-like internal memories. The memory means thus written with processing results in the manner of a vector register while accessing the XPP are then overwritten in a suitable manner by loading the STORE configuration after reconfiguring the processing configuration, this in turn being accomplished via a data stream, whether via the I/O port directly into external memory areas and/or, as is particularly preferred, into cache memory areas to which the sequential CPU and/or other configurations may then have access at a later point in time on the XPP, having previously generated the data, or another suitable data processing unit.

According to a particularly preferred variant, the memory, e.g., vector register means in which the data obtained is to be stored at least for certain data processing results and/or interim results, is not an internal memory in which data is stored via a STORE configuration in the cache area or another area which the sequential CPU or another data processing unit may access, but instead the results are to be stored directly in corresponding cache areas, in particular access-reserved cache areas which may be organized in particular in the manner of a slice. This may have the disadvantage of a greater latency, in particular when the paths between the XPP or data processing logic cell field unit and the cache are so long that the signal transit times become a factor, but this results in no additional STORE configuration being needed. It should also be pointed out that such storage of data in cache areas is possible first, as described above, due to the fact that the memory to which the data is written is located in physical proximity of the cache controller and is designed as a cache but alternatively and/or additionally there is also the possibility of placing part of an XPP memory area, of an XPP-internal memory or the like, in particular in the case of RAM via PAEs, under the management of one or more sequential cache memory controllers. This has advantages when the latency in saving the processing results determined within the data processing logic cell field is to be held at a minimum while the latency in access to the memory area by other units, which then functions only as a "quasi-cache," is not a factor at all or is not a significant factor.

It should also be pointed out that in another possible example embodiment, the cache controller of a conventional sequential CPU addresses a memory area as a cache which is situated on and/or near the latter physically without functioning to provide data exchange with the data processing logic cell field. This has the advantage that when applications having a low local memory demand are running on the data processing logic cell field and/or when only a few additional configurations are needed, based on the amount of available memory, these may be available as a cache to one or more sequential CPUs. It should be pointed out that the cache controller may be designed for management of a cache area having a dynamic, i.e., variable, size. A dynamic cache size management and/or cache size management means for dynamic cache management will typically take into account the work load on the sequential CPU and/or the data processing logic cell field. In other words, it is possible to analyze, for example, how many NOPs there are on the sequential CPU in a given unit of time and/or how many configurations in the XPP field should be stored in advance in memory areas provided for this purpose to permit rapid reconfiguration, whether by wave reconfiguration or in some other way. In one example embodiment, the dynamic cache size disclosed herein may be runtime dynamic, e.g., such that the cache controller always manages an instantaneous cache size, which may vary from one clock pulse to the next or from one clock pulse group to the next. It should also be pointed out that the access management of an XPP and/or data processing logic cell field having access as an internal memory as in the case of a vector register and as a cache-like memory for external access, with regard to the memory accesses has already been described in DE 196 54 595 and PCT/DE97/03013 (PACT03). The publications cited are herewith fully incorporated into the present patent application and referred to for disclosure purposes.

Reference was made above to data processing logic cell fields which are runtime reconfigurable in particular. It has been discussed that a configuration management unit (CT or CM) may be provided with these. The management of configurations per se is known from the various protective rights of or assigned to Pact Technologies as well as other publications by Pact Technologies, to which reference is made for disclosure purposes. It shall be pointed out now explicitly that such units and their functioning, using which configurations not yet needed at the present time are preloadable in particular independently of couplings to sequential CPUs, etc., are also highly useable for prompting a change in task, thread and/or hyperthread, in multitasking operation and/or in hyperthreading and/or in multithreading. It is possible to utilize the fact that configurations for different tasks, or threads and/or hyperthreads may be loaded into the configuration memory (in the case of a single cell or a group of cells of the data processing logic cell field, e.g., a PAE of a PAE field (PA), for example) during the runtime of a thread or task. As a result, in the case of a blockade of a task or a thread, e.g., when it is necessary to wait for data because the data is not yet available—whether because the data has not yet been generated or received by another unit, e.g., because of latencies, or whether because a resource is currently still being blocked by another access, then configurations for another task or thread are preloadable and/or preloaded and it is possible to switch to these without having to wait for the time overhead for a configuration change with the shadow-loaded configuration in particular.

Although in principle it is possible to use this technique even when the most likely continuation is predicted within a task and a prediction is not correct (prediction miss), this type of operation is preferred in prediction-free operation. In the case of use with a purely sequential CPU and/or a plurality of purely sequential CPUs, a hyperthreading management hardware is thus implemented by adding a configuration manager. Reference is made in this regard to PACT 10 (DE 198 07 872.2, WO 99/44147, WO 99/44120) in particular. It may be regarded as adequate to omit certain subcircuits such as the FILMO described in the protective rights to which reference is made specifically, in particular when hyperthreading management is desired for only one CPU and/or a few sequential CPUs. In particular, this discloses the use of the configuration manager described there with and/or without FILMO for hyperthreading management for one and/or more purely sequentially operating CPUs with or without coupling to an XPP or another data processing logic cell field and this is herewith claimed separately. This is seen as entailing a separate inventive feature. Moreover, it should be pointed out that a plurality of CPUs may be implemented using the known techniques such as those known in particular from PACT31 (DE 102 12 621.6-53, PCT/EP02/10572) in which one or more sequential CPUs are configured within an array, utilizing one or more memory areas in particular in the data processing logic cell field for the setup of the sequential CPU, in particular as a command register and/or data register. It should also be pointed out that earlier patent applications such as PACT02 (DE 196 51 075.9-53, WO 98/26356), PACT04 (DE 196 54 846.2-53, WO 98/29952), PACT08 (DE 197 04 728.9, WO 98/35299) have already disclosed how sequences may be configured with ring-free and/or random access memories.

It should be pointed out that a task change and/or a thread change and/or a hyperthread change may take place using the known CT technology and preferably will take place in such a way that performance slices and/or time slices are assigned by the CT to a software-implemented operating system scheduler or the like, which is known per se, during which a determination is made as to which parts of which tasks or threads are subsequently to be processed per se, assuming that resources are free. One example may be given here as follows. First, an address sequence is to be generated for an initial task; according to this, during the execution of a LOAD configuration, data is to be loaded from a cache memory to which a data processing logic cell field is coupled in the manner described herein. As soon as this data is available, it is possible to begin with the processing of a second data processing configuration, e.g., the actual configuration. This may also be preloaded because it is certain that this configuration is to be executed as long as no interrupts or the like force a complete task change. In conventional processors, there is the familiar cache miss problem, in which data is requested but is not available in the cache for loading access. If such a case occurs in a coupling according to the present invention, then it may be preferable to switch to another thread, hyperthread and/or task, this having been determined in advance in particular by the operating system scheduler, in particular a software-implemented operating system, and/or another hardware and/or software-implemented unit that functions accordingly for the next possible execution and therefore was loaded in advance accordingly into one of the available configuration memories of the data processing logic cell field, in particular in the background during the execution of another configuration, e.g., the LOAD configuration that prompted loading of data which is now waited for. It should be pointed out here explicitly that separate configuration lines lead from the configuring unit to the particular cells either directly and/or via suitable bus systems as is known in the related art per se for advance configuration undisturbed by the actual wiring of the data processing logic cells of the data processing logic cell field designed to be of a coarse granular type in particular, because this embodiment permits undisturbed advance configuration without disturbing another configuration which is currently running. If the configuration to which processing then changes during and/or because of the change in task thread and/or hyperthread has been processed to the end and specifically in the case of preferred, indivisible, uninterruptible and thus quasi-atomic configurations, then to some extent another configuration has been processed as predetermined by the corresponding scheduler, in particular a scheduler resembling an operating system and/or the configuration for which the particular LOAD configuration was executed. Before execution of a processing configuration for which a LOAD configuration was previously executed, it is possible to test in particular whether the corresponding data has streamed into the array in the meantime, e.g., whether the latency time such as typically occurs has elapsed and/or the data is in fact available.

In other words, when latency times occur, e.g., because configurations have not yet been configured into the system, data has not yet been loaded and/or data has not yet been stored, these latency times are bridged and/or concealed by executing threads, hyperthreads and/or tasks which have already been preconfigured and which work with data that is already available and/or may be written to resources that are already available for writing. Latency times are largely concealed in this way. Assuming a sufficient number of threads, hyperthreads and/or tasks to be executed per se, practically 100% utilization of the data processing logic cell field is achieved.

With the system described here with respect to data stream capability with simultaneous coupling to a sequential CPU and/or with respect to coupling of an XPP array, e.g., data processing logic cell field and simultaneously a sequential CPU to a suitable scheduler unit such as a configuration manager or the like, real time-capable systems may be readily implemented in particular. For real-time capability, the possibility may be provided of responding to incoming data and/or interrupts which signal, e.g., the arrival of data, and to do so within a maximum period of time that will in no case be exceeded. This may be accomplished, for example, by a task change to an interrupt or, e.g., in the case of prioritized interrupts, by determining that a given interrupt is to be ignored momentarily, and this is also to be determined within a certain period of time. A task change with such real time-capable systems may take place, e.g., in three ways, namely either when a task has run for a certain period of time (watchdog principle), in the event of a resource being unavailable, whether due to being blocked by some other access or because of latencies in accessing it, e.g., read and/or write access, for example in the case of latencies in data access and/or when interrupts occur.

Real-time capability of a data processing logic cell field may now be achieved using the present invention by implementing one or more of three possible variants.

According to a first variant, there is a change to processing an interrupt, for example, within a resource addressable by the scheduler and/or the CT. If the response times to interrupts or other requests are so long that a configuration may still be processed without interruption during this period of time, then this is not critical, in particular since a configuration for interrupt processing may be preloaded during the processing of the configuration currently running on the resource that is to be changed for processing the interrupt. The choice of the interrupt processing configuration to be preloaded is to be made by the CT, for example. It is possible to limit the runtime of the configuration on the resource that is to be freed and/or changed for the interrupt processing. Reference is made in this regard to PACT29/PCT (PCT/DE03/000942).

In systems that must respond to interrupts more quickly, it may be preferable to reserve a single resource, for example a separate XPP unit and/or parts of an XPP field for such processing. If an interrupt that is to be processed rapidly then occurs, either a configuration that has already been preloaded for particularly critical interrupts may be processed or loading of an interrupt handling configuration into the reserved resource is begun immediately. A selection of the configuration required for the corresponding interrupt is possible through appropriate triggering, wave processing, etc.

It should also be pointed out that in an example embodiment of the present invention it is readily possible using the methods described here to obtain an instantaneous response to an interrupt by achieving a code re-entrance using LOAD/STORE configurations. After each data processing configuration or at given points in time, for example, every five or ten configurations, a STORE configuration is executed and a LOAD configuration is then executed by accessing to the memory areas which were previously overwritten. If it is ensured that the memory areas used by the STORE configuration will remain untouched until another configuration has stored all relevant information (states, data) by progressing in the task, then it is ensured that the same conditions will be obtained again on reloading, e.g., re-entry into a configuration or configuration chain that has already been begun previously but has not been completed. Such an interim storage of LOAD/STORE configurations with simultaneous protection of STORE memory areas that are not yet outdated, may be generated automatically very easily without any additional program complexity, e.g., by a compiler. Resource reserving may be advantageous in that case. It should also be pointed out that in resource reserving and/or in other cases, it is possible to respond to at least a set of highly prioritized interrupts by preloading certain configurations.

According to another example embodiment of the present invention, the response to interrupts includes processing an interrupt routine in which code for the data processing logic cell field is again forbidden on the sequential CPU when at least one of the addressable resources is a sequential CPU. In other words, an interrupt routine is processed exclusively on a sequential CPU without calling of XPP data processing steps. This ensures that the processing procedure on the data processing logic cell field is not to be interrupted and further processing in this data processing logic cell field may be performed after a task switch. Although the actual interrupt routine thus does not have an XPP code, it is nevertheless possible to ensure that in response to an interrupt, it will be possible to respond with the XPP at a later point in time, which is no longer relevant in real time, to a state detected by an interrupt and/or a real-time request and/or to data using the data processing logic cell field.

In an example embodiment of the present invention, it is possible to load optimized configurations into the field on a data processing logic cell field coupled to a CPU, this field optionally including in particular an analog/digital mixed field and having cells with a frequency-optimized aspect ratio. In loading configurations, it may be very advantageous if buses are dynamically configurable. An example embodiment of the present invention therefore discloses at the same time a method for dynamic configuration of buses in fields of elements communicating with one another, e.g., reconfigurable fields such as processors of coarse granular fields; this is particularly advantageous in combination with the other embodiments of the present invention, but at the same time is also inventive on its own.

It is already known that coarse granular fields of reconfigurable elements may be provided with bus systems running between the reconfigurable elements. In known applications, the bus systems which provide the connections for the communication of the individual elements among one another are configured by a central unit. The manner in which the bus connection is to be established may be determined in advance, e.g., at a compile time. It is also conceivable to determine it in runtime in which a bus is configured by a scheduler or the like for various configurations to be loaded at the present time, e.g., routing. Reference is made in this regard in particular to Patent Application 102 36 272.8 because this patent application already shows how a selection may be made from different configurations for execution of one and the same program during runtime.

Bus systems for reconfigurable processors in which a dynamic bus structure may take place are already known. It should be pointed out that it is possible in particular to combine bus systems, namely the known "global" dynamically configured buses and buses that are not dynamically configurable. This is also true of the bus systems and methods disclosed below, i.e., the bus systems and connection establishing methods described here need not be the only bus systems and/or methods to be provided in a field of elements to be connected.

It is also possible—and this is also true for the purposes of the present invention—to provide a macrogranularity in addition to coarsely granular units having a fine granular control logic in particular such as fine granular trigger networks, etc.; in this macrogranularity, a plurality of coarsely granular elements is combined with conventional bus systems, etc., and several such coarsely granular elements that have been combined and between which bus systems may already be provided in a configurable or fixed manner may form parts of a higher-level unit communicating via bus systems. Hierarchical structures for such systems are known from DE 199 26 538.0 or PCT WO 00/77652, for example.

It is often desirable to configure buses dynamically, in particular when a processor is to be used for multitasking, multithreading, hyperthreading, etc. and/or in particular when extremely large fields of 65,536 PAEs or more, for example, are to be configured.

In such a case, it is desirable to be able to ensure an automatic, e.g., self-generating, dynamic connection of starting fields and target fields within such a field. In addition to the PAEs known from traditional XPP technology, elements that may be provided as starting elements and/or target elements include IO ports, field-internal memories, memory IOs, FPGAs, sequential CPUs, sequencers, FSMs (finite state machines), read-only memories, write-only memories, NIL devices, etc.

In another example embodiment of the present invention, therefore, a method may be provided for dynamic setup of a connection between a sender and a receiver over a plurality of possible paths leading from one station to the next, in which, starting from a unit (sender and/or receiver) that is responsible for configuring the bus setup, a query is sent to the next stations which are ready for bus setup, a code number, here equivalent to a characteristic quantity, being assigned to these stations, starting from at least a plurality of stations, but preferably each free station to which a code number was assigned, a query being sent to the nearest stations according to the availability of the stations for bus setup, another code number being assigned to the available stations and this being continued until reaching the desired end of the bus.

Another example embodiment of the present invention thus makes use of the finding that buses may be setup with no problem by sending queries to the next transmission stations along the path of a possible bus to ascertain whether these stations are ready for bus setup, and then, starting from stations that are ready, addressing these nearest stations in another step, a response sequence being maintained by the assignment of code numbers to permit tracing of bus setup on the basis of this sequence. Although it may not be possible to advance in bus setup from each station that is addressed and found to be free, e.g., because an analysis in the station of a desired target point shows that bus setup has gone far in a wrong direction, in an example embodiment of the present invention, an attempt is made by each free station to which a code number has been assigned to further set up the bus by also addressing the neighbor stations of the station addressed first.

The background for this is that there may be situations, e.g., when additional configurations are to be inserted into an almost full array, where it is necessary to allow a bus to be set up by way of major detours to permit bus setup reliably if it is possible at all.

In an example embodiment of the present invention, a code number is usually assigned to each station that has been addressed. This is advantageous in order to ascertain that the station has already been addressed and thus is presumably no longer available when addressed from another direction. This prevents signal propagation from taking place after the neighbor stations have already been enabled again as not needed.

In an example embodiment of the present invention, the characteristic quantity changes from one station to the next so that the path selected in bus setup is traceable, e.g., by way of backtracing. This backtracing may be performed by incrementing or decrementing a value reached at the target, e.g., with fixed increments. When a fixed increment is provided, there may also be cyclic counting, i.e., counting in a cyclic numerical space in which counting always begins again at a smaller value after exceeding the highest possible value (e.g., 1, 2, 3, 4; 1, 2, 3, 4; 1, 2, 3, 4; . . . , or 1, 2, 3, 4, 5; 1, 2, 3, 4, 5; 1, 2, 3, 4, 5; . . . ). To then characterize the station to ensure satisfactory backtracing of the path, a cyclic counting of at least three different numerical values is preferred for characterization of the station to ensure satisfactory traceability of the path.

The method described here will identify this bus to be setup, if bus setup between the sender and receiver is possible at all. In bus setup, however, a plurality of stations that are not needed are addressed, wherever possible, and it is therefore preferable to enable them again, namely after bus setup and/or with signaling between the sender and receiver that a bus path has been set up. Therefore, starting from the last station completing the bus setup, typically as the signal receiver, if the bus is set up starting from the sender and progressing to the receiver, the station in front may be addressed in reverse stepping from one code word to the other, and it may be ensured that the other stations addressed by this station and therefore not situated on the (return) bus path will be enabled for outside use. Bus setup proceeds from each station addressed and enabled for further use in other bus paths to other unneeded stations addressed previously. This ensures that all stations previously addressed for bus setup will now be available again.

It should be pointed out that in addition to this method for enabling by backstepping a bus path that has already been set up, there are also other possibilities for enabling stations no longer required between the sender and receiver after creation of a bus path. For example, a signal may be sent along all stations needed for the bus path, notifying the bus stations that they belong to the bus path. Such information may be sent in reverse by way of backtracing, e.g., by analyzing the code numbers assigned to the stations during the creation phase. There may then be a global release, e.g., by resetting all stations not being used at the moment on existing buses, starting from the initial station or a central control instance, i.e., enabling the stations for setting up a bus path.

It should be pointed out that a bus may also be enabled under specific conditions, e.g., after a fixed period of time has elapsed. However, this type of enable may prevent buses from being set up that could otherwise be set up. With extremely large processor fields, for example, it is conceivable that the paths may become extremely long because a path must be created in a meandering pattern around and/or through various configurations when various cell group arrangements are configured into the field dynamically during operation, but this may take a very long time in the case of large fields. It is therefore preferable to ensure that a sufficient amount of time remains for bus setup.

It should be pointed out that it is possible in principle, e.g., in the case of extremely large fields, to set up multiple bus paths, e.g., bus connections simultaneously between different stations and different receivers. However, this may result in two bus connections, which are to be set up, mutually blocking one another in their progress so that neither of the two buses is able to successfully set up a connection. In other words, this may result in a deadlock. It should be pointed out that such deadlock situations may also occur in simultaneous setups of multiple buses. It is conceivable that a priority may be assigned to buses to thereby ensure that when a bus of a high priority that is to be set up encounters a bus of a lower priority that also has not yet been set up, the stations of the bus having the lower priority may be occupied, i.e., the previous reservation for a bus of a lower priority to be set up may be ignored. The actual implementation of setting up such connections will then depend on how the logic required for implementation of the bus setup protocol is to be implemented in a semiconductor architecture, i.e., which creation is necessary in the individual case; and how bus setup and, if necessary, the attempt at a new bus setup after failure of a first attempt is to be regarded, whether there should and could be prioritization, in which case it is conceivable to determine a prioritization of a bus to be set up, e.g., according to the importance of the macro configured into the field, the waiting time since the attempt at a first bus setup, etc.

In principle, it would be possible, after reaching the goal starting from the start, e.g., typically after reaching the receiver starting from the sender typically prompting bus setup, to merely send a signal which indicates to the sender that a bus may be set up at all in order for the sender to be able to start sending. In such a case, a data packet to be sent could be sent simply like a station setup query to all neighbor stations. However, it would then be necessary with each data packet to ensure that it is possible to recognize at the receiver where a data packet that has been sent is first received, and is necessary to ensure that a certain data packet is received only once even if it travels over other convoluted paths to arrive at the receiver again later. In any case, however, it is preferable for the other stations to be freed, e.g., by backtracing after reaching the target station. This bus sharing signal, which is sent backward, may be based on the numerical values assigned to the neighbor stations. It should also be pointed out that the station itself may also notice only from which direction it has been addressed. In such a case, it is possible to trace back, very rapidly and without comparison, at the neighbor stations which code number values they have and moreover when it is known in the station which neighbor stations were addressed in bus setup, it is possible to ensure that the stations not sharing the bus that has been set up will also be freed in backtracing.

Therefore, the code number to be assigned to a station in response may also be a code number indicating the direction from which the station has been addressed. For example, two bits are sufficient in the case of four nearest neighbors to be addressed. If the stations that were addressed while the bus was being set up are additionally stored, then another four bits will be necessary in a four-nearest-neighbor architecture. Another bit may be added to characterize whether the station has already been addressed at all or has remained unaffected so far by the bus setup of the bus to be set up currently. If prioritization, etc. is also included, additional states are to be retained. It should be pointed out that this may take place on a fine granular level, in particular even when the processor field itself has a coarse granular structure.

It should also be pointed out that there are various possibilities for permitting a second bus to be set up between a second sender and a second receiver, for example after successfully setting up a first bus between a first sender and a first receiver. One of the senders and/or one of the receivers may then also be identical. Two receivers being addressed from one and the same sender may also be appropriate, e.g., when a computation result is needed as input for two different branches of a program which are configured into different areas. One single receiver being addressed from multiple senders may be desired if, for example, two operands that are to be received from different configuration areas are to be gated and a response of one receiver via one and the same sender may be required when operands that were received or determined at different times are to be gated at one and the same receiver, e.g., in the form $a_n \times a_{n-1}$. It is then possible to ensure via registers in the bus that such a gating would be possible setting up two bus systems, even if this would typically be less preferred (for reasons of energy consumption in the bus system) than local temporary storage of operands and the like. Set up of the additional bus or the next bus to be set up may take place in such a way that a signal is also sent with the station enable signal after provisionally reserving a station, this additional signal indicating to which bus that has been set up the station belonged, and this bus may in turn be marked by a prioritization signal. When an enabling station is adjacent to a station that would itself like to set up a bus having a slightly lower priority, this is ascertainable there and the next bus setup may be triggered starting from this station. Alternatively, if all stations not needed at the moment for bus setup and/or thereafter are enabled, a global signal may be sent, e.g., from a central control instance, notifying the field of which bus connection is to be set up next and/or which priority the next bus connection to be set up should have. Instead of global broadcast of such bus setup information, signaling to a station requesting bus setup such as a transmitter that must reach its receiver, may also take place centrally in particular, and/or in a decentralized manner at multiple locations, e.g., in the case of hierarchically arranged processor fields where bus setup is desired within a certain area.

Which type of station enable and/or message that another bus may be set up is in fact implemented will depend, e.g., on how rapidly the information in this regard is propagable over the array and/or which bus setup frequency is expected over time. For example, when analysis shows that the configurations typically needed in a field and to be processed simultaneously rarely require a bus setup which may also take place slowly, a simple implementation in terms of processor architecture may be selected, making do with only a few logic elements to ensure the appropriate control, whereas in the case when buses must be set up very frequently and very rapidly, a more complex implementation may be advisable.

In an example embodiment of the present invention, it is possible to select one bus among multiple bus systems which are equivalent per se with regard to bus length and/or the number of the stations along the bus and to select it on the basis of various objective evaluation criteria. Although it is possible in principle in such a case to make a random selection, different criteria may be used, depending on the requirement and the actual design. For example, in the case of architectures having different bus connections in horizontal and vertical directions, e.g., when the bus connections in the vertical direction also include registers through which data is to be passed, whereas there are no registers along the vertical direction and thus there are bus connections relaying data with lower energy losses (an example of such an architecture is Pact Technologies' XPP 128), in setting up the bus setup it will be recorded how many steps have been traveled horizontally and vertically. This information may be stored in a station or transmitted jointly in a header together with the bus setup request signal. Such information is then analyzed for selection of the bus. Alternatively, a query may be made at each station to determine how many buses already exist near the station to make it possible to obtain an approximately uniform bus connection density throughout the array, for example. This procedure is advantageous, first, because data transport along the buses results in increased energy consumption due to the required reloading of bus line capacities of the drivers to be integrated into the buses, etc. This is why making the bus distribution density more uniform over the processor field results in a more uniform thermal load distribution. To this extent, the clock rate may be increased while maintaining the same cooling due to the homogenization of bus connection densities as a whole, which is advantageous in the area of mobile processors for laptops, cell phones and the like. However, homogenization of bus connection densities is also advantageous in increasing the utilization of capacity and saving resources.

In an example embodiment of the present invention, a multidimensional field of reconfigurable elements may be provided in which bus systems for dynamic self-creation are provided by one of the methods described previously and/or in a manner apparent from the following discussion. It should be pointed out that the term "multidimensional field of reconfigurable elements" may also include coarsely granular reconfigurable elements having elements such as ALUs, expanded ALUs, RAM-PAEs, etc., as mentioned previously, and multidimensionality may be obtained in the sense of the present invention not only through the spatial arrangement of reconfigurable elements one above the other and side-by-side but also through a certain type of connection. Thus in a linear arrangement of fields, two nearest neighbors are assigned to the elements in the middle, in two-dimensional fields as in page addressing, typically four nearest neighbors are assigned, and in a three-dimensional arrangement typically six nearest neighbors are assigned; this is apparent from the stacking of cubes and the like. The usability of triangular or hexagonal cells should also be mentioned as an example. However, it is also possible to provide additional bus connections running diagonally, connecting neighbors that are nearest but one, providing longer segments, etc. If such a bus structure is implemented, the result is a multidimensionality having a dimensional measure greater than one, this number of dimensions optionally also being different from an integer. In any case, such an arrangement is regarded as a multidimensional field according to the present invention.

An example embodiment of the present invention is described below with reference to FIGS. 6a-6e as an example.

Figure 6A:
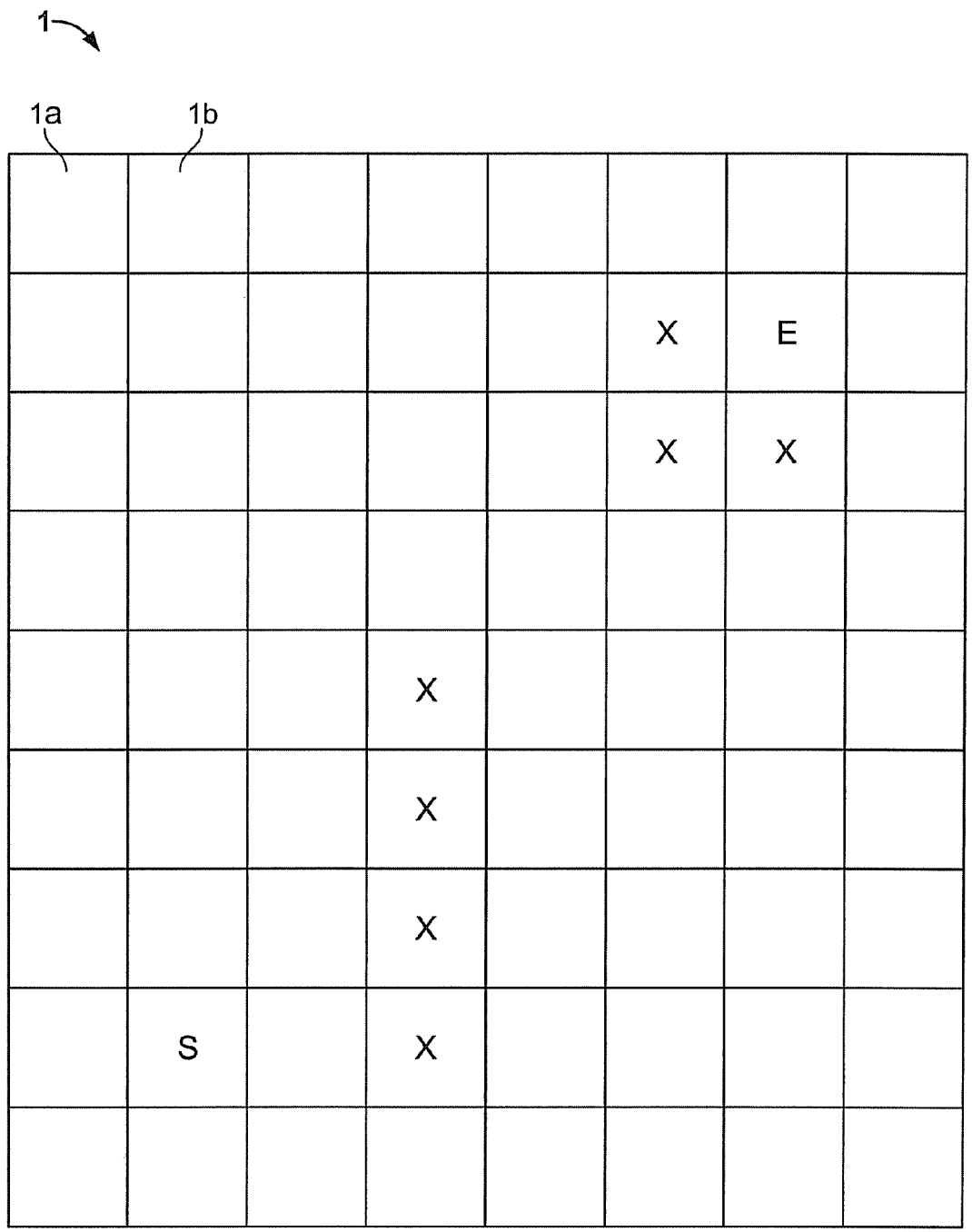
FIG. 6a illustrates a multidimensional field of reconfigurable elements communicating with one another, the elements being designed for bus setup, before the start of bus setup, according to an example embodiment of the present invention.
Figure 6B:
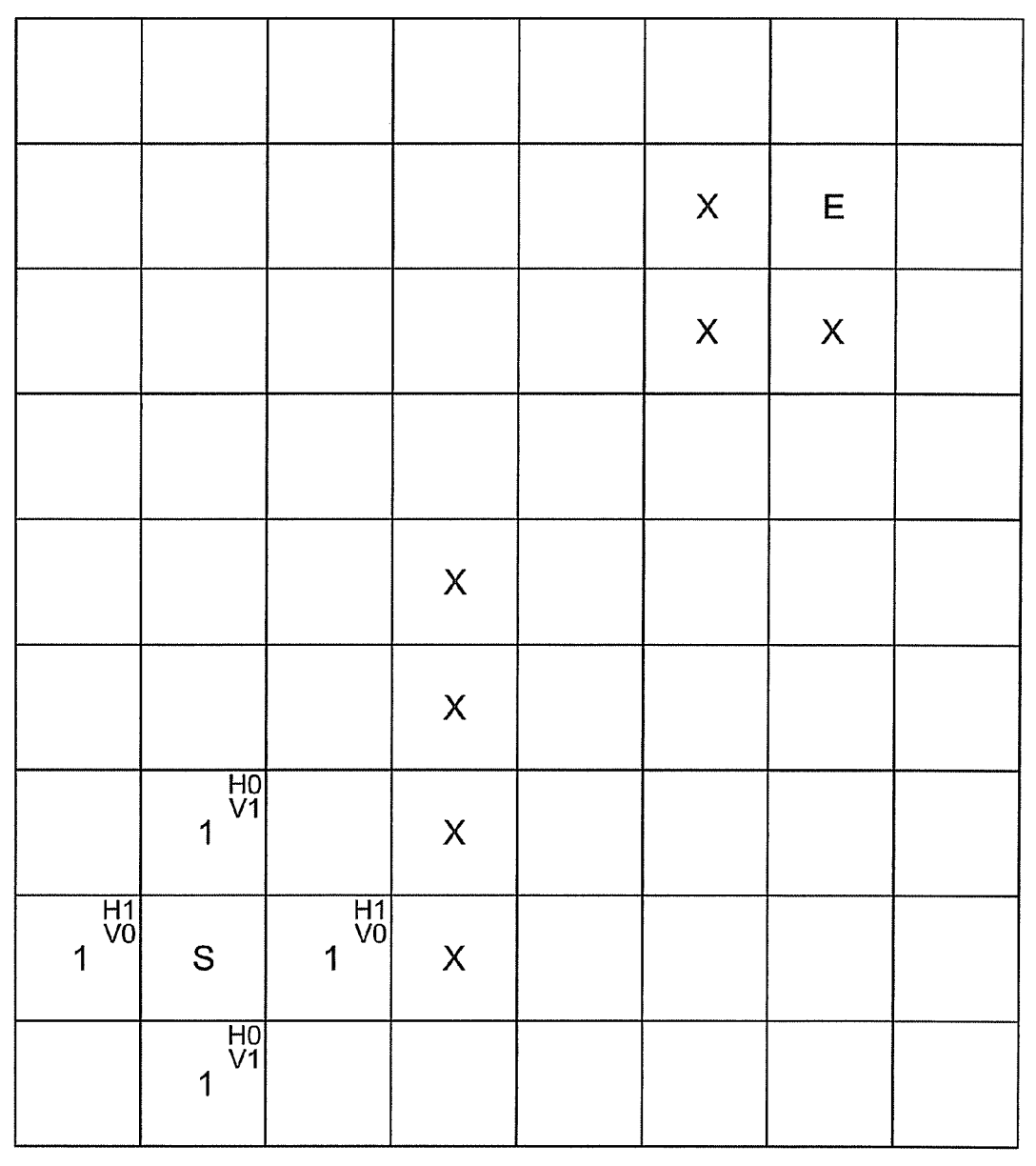
Figure 6E:
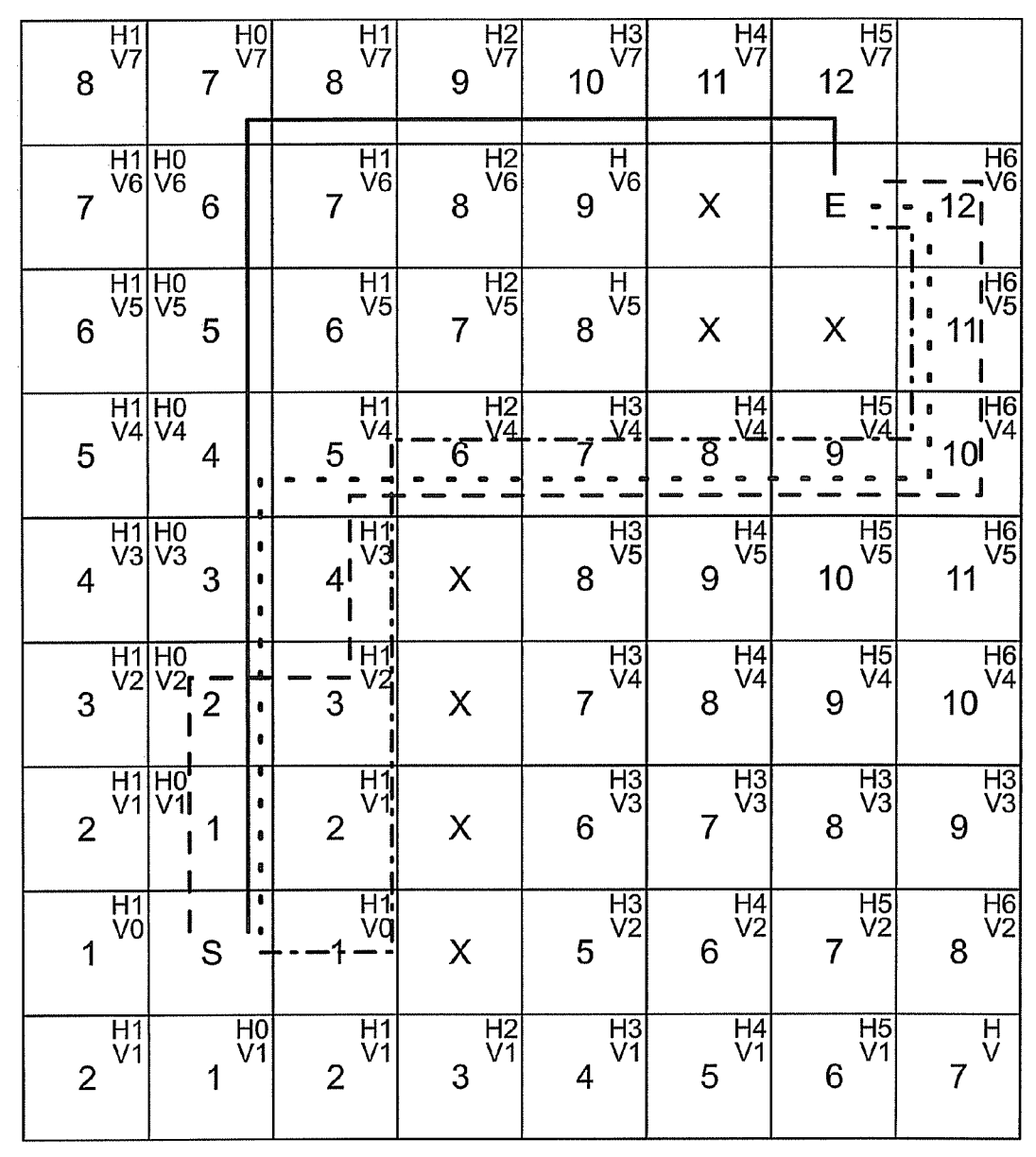

Referring to FIG. 6a, a field 1 includes a plurality of reconfigurable cells capable of communicating with one another over buses that set themselves up.

Each cell 1a, 1b, 1c, etc., to be involved in bus setup has internal logic elements making it possible to store information about whether the cell is currently already being used by a bus (cells marked with X in field 1), whether the cell has already been addressed as a possible bus cell in a current bus setup and, if so, in how many vertical and horizontal steps bus setup has proceeded as far as the cell, how many steps on the whole were involved in bus setup or whether the cell is still completely free and has not yet been addressed. To store the cells paced off already horizontally and/or vertically by a bus on the path between a possible sender cell S and a possible receiver cell e, two memory areas are provided in each cell, designated as H and V in the figures. In addition, a memory area for the total number of steps performed may also be stored, as represented by the large number 1 through 12 in FIGS. 6a-6e. The selected maximum number of 12 is only given as an example because in the selected example of a low level of complexity, this is the required number of steps to reach the receiver starting from the selected sender. The cells are also designed to share in a bus to be set up when they receive a bus setup request signal and are free and at the same time to send an inquiry to neighbor stations in a subsequent test to ascertain whether these neighbor stations are also free for bus setup. To do so, they have signal sending and receiving connection circuits for the nearest neighbors in each case. The individual cell is also designed so that together with the bus setup request signal, information regarding the total step size already covered and the number of horizontal and vertical substeps (H and V) may be communicated to the station address.

In an example embodiment of the present invention, bus setup proceeds as follows: First, the dynamically configurable array is operated under the assumption that all buses are set up. It is then assumed that certain configurations will end and it is necessary to configure a new configuration into free areas of the array in a fragmented form because a sufficient number of functionally suitable cells is not currently available. It is also assumed that there is a case in which all fields except those labeled as X are available for bus setup.

Of those cells that must communicate with one another to be able to execute a macro that is to be configured into the array, a sending cell and a receiving cell are now defined. This may be accomplished through the configuration and/or the scheduler or the like. These are marked as S in FIG. 6a. Sender cell S, which prompts bus setup, sends a first bus setup request signal to its immediate neighbors, i.e., the cells adjacent to its cell edges, i.e., to four cells in the example depicted here. These cells determine that they are free, that they are the first stations receiving the bus setup request signals and that they are each one step horizontally or vertically away from the sending cell. A 0 or 1; respectively, is then entered into the H and V memory areas, respectively, in the neighbor cells, and a 1 is stored in the step size memory of the cell queried.

In the second step, each free cell previously addressed again addresses its own neighbor cells and makes inquiries with them as to whether they are available for bus setup. This results in a number of other cells thereafter recognizing that they are needed for bus setup and constitute the second cells in the course of a bus that may be set up. In addition, corresponding notations regarding the horizontal and/or vertical step size are made in corresponding memory areas. The cells already marked with an X, however, ignore the bus setup request signal, as is the case in the fourth cell from the left and the second cell from the bottom.

After the first cells have addressed their neighbor cells, it is clear that they may be silent in additional bus setup steps. A bus setup request signal is sent out only in the step immediately after the step which has reserved the cell sending the bus setup request signal. Although this prevents cells that are freed only during bus setup from being reservable again later, it does save on energy because bus setup request signals need not always be sent out again by all the cells that have already been reserved, which requires driver power, and this method is thus preferred for mobile applications, for example, where the resulting advantage is predominant in comparison with approaches in which cells that are freed later may also be included in a bus which is being set up. However, care should be taken here in particular to ensure that bus setup is always classified as relevant in those neighbor cells which require the smallest step sizes along the bus. In the next bus setup step, the second cells then address their respective neighbor cells, during which cells are no longer able to go backward but instead may only move forward, away from the sender, because cells have already been reserved for bus setup. This continues until finally reaching the receiver (see FIG. 6d).

Now in this example, two cells have arrived at the same time at the receiver, both cells having the same step size 12 and it is possible, as indicated by the various dotted lines, to set up different bus paths moving backward over these cells.

In principle a random selection would be possible here but, in an example embodiment of the present invention, first the V values are to be kept at the maximum in each stepwise run in the reverse direction. This results in the bus shown with a solid line in FIG. 6e. As soon as bus setup has been confirmed by stepping in reverse, all the cells not participating therein may be rejected and freed again. Therefore a global bus enable signal is emitted, indicating that all cells participating in a not currently set up bus may be reset.

It should be pointed out that the manner of the bus setup is definable by dynamic self-organization using suitable hardware circuits in the cell that are obvious to those skilled in the art from the disclosure.

What is claimed is:

1. A method for operating a multidimensional field of reconfigurable elements groups of elements handling data together being configured into the field in a predetermined manner during runtime for processing to perform predetermined tasks, the method comprising:
    for at least one task to be performed:
        determining, by processing hardware, a plurality of element groups in the multidimensional field that are suitable for performing the task;
        selecting, by the processing hardware, a particular one of the plurality of suitable element groups to perform the task; and
        configuring, by the processing hardware, the selected element group into the field;
    wherein:
        configuration data pertaining to element groups is at least one of input from a memory that has non-negligible access times and generated with non-negligible generation times;
        the selection of the particular element group is made on the basis of a plurality of characteristic data records, each data record being associated with a corresponding one of the plurality of suitable element groups;
        during the selection of the particular element group, at least for each of some of the plurality of suitable element groups, only a characteristic data record that includes less than all configuration data pertaining to the element group is input; and
    the method further comprises:
        in response to the selection, one of (a) reading from the memory and (b) generating all configuration data pertaining to the selected element group.

2. The method according to claim 1, wherein the particular element group is selected on the basis of its geometry in comparison with a geometry in the field of at least one of elements already available for reconfiguration and elements determined to likely be soon available.

3. The method according to claim 1, wherein the characteristic data record that includes less than all configuration data pertaining to the element group pertains to a geometry of the corresponding element group.

4. The method according to claim 1, wherein a first element group system is configured into the field, the method further comprising:
    beginning a processing of the task using the first element group system, the processing of the task using the first element group system continuing until a preselected event occurs; and
    in response to the preselected event, continuing the processing of the task using a second element group system with at least a partial reconfiguration of the field.

5. The method according to claim 1, wherein:
the element groups of the plurality of element groups differ with regard to a processing speed; and
the selection of the particular element group is made based on at least determined maximum achievable processing speeds of the plurality of element group system groups.

6. The method according to claim 1, further comprising:
for configuring the selected element group system into the field, determining functions and interconnections of cells of the element group system;
wherein:
the determined interconnection allows for a transmission of data from cell to cell in a manner at least largely free of delay; and
for the determination of the interconnection of the cells, cells not situated directly side by side and separated in width by a distance smaller than a length of the cells are considered neighbor cells between which data is transmissible within one of one clock pulse and a low number of clock pulses.

7. A method for operating a multidimensional field of reconfigurable elements groups of elements handling data together being configured into the field in a predetermined manner during runtime for processing to perform predetermined tasks, the method comprising:
for at least one task to be performed:
determining, by processing hardware a plurality of element groups in the multidimensional field that are suitable for performing the task;
selecting by the processing hardware a particular one of the plurality of suitable element groups to perform the task; and
configuring by the processing hardware the selected element group into the field;
wherein:
during a reconfiguration of the field for performing a plurality of tasks to be executed at least to some extent simultaneously, data handling elements are configured as at least two co-existing element groups into the field in a predetermined manner during runtime; and
for the reconfiguration of the field:
a plurality of groupings of co-existing element groups which are suitable for performing the plurality of tasks is predetermined;
resources available at least one of at a given point in time and at a given event for the reconfiguration are determined; and
a particular one of the plurality of groupings of co-existing element performing by which it is determined that simultaneous processing is possible in a particularly efficient manner is selected.

8. The method according to claim 7, wherein the particular element group is selected on the basis of its geometry in comparison with a geometry in the field of at least one of elements already available for reconfiguration and elements determined to likely be soon available.

9. The method according to claim 7, wherein:
configuration data pertaining to element groups is at least one of input from a memory that has non-negligible access times and generated with non-negligible generation times;
the selection of the particular element group is made on the basis of a plurality of characteristic data records, each data record being associated with a corresponding one of the plurality of suitable element groups;
during the selection of the particular element group, at least for each of some of the plurality of suitable element groups, only a characteristic data record that includes less than all configuration data pertaining to the element group is input; and
the method further comprises, in response to the selection, one of (a) reading from the memory and (b) generating all configuration data pertaining to the selected element group.

10. The method according to claim 9, wherein the characteristic data record that includes less than all configuration data pertaining to the element group pertains to a geometry of the corresponding element group.

11. The method according to claim 7, wherein a first element group system is configured into the field, further comprising:
beginning a processing of the task using the first element group system, the processing of the task using the first element group system continuing until a preselected event occurs; and
in response to the preselected event, continuing the processing of the task using a second element group system with at least a partial reconfiguration of the field.

12. The method according to claim 7, wherein:
the element groups of the plurality of element groups differ with regard to a processing speed; and
the selection of the particular element group is made based on at least determined maximum achievable processing speeds of the plurality of element groups.

13. The method according to claim 7, further comprising:
for configuring the selected element group into the field, determining functions and interconnections of cells of the element group;
wherein:
the determined interconnection allows for a transmission of data from cell to cell in a manner at least largely free of delay; and
for the determination of the interconnection of the cells, cells not situated directly side by side and separated in width by a distance smaller than a length of the cells are considered neighbor cells between which data is transmissible within one of one clock pulse and a low number of clock pulses.

* * * * *

UNITED STATES PATENT AND TRADEMARK OFFICE
CERTIFICATE OF CORRECTION

PATENT NO.      : 7,657,861 B2
APPLICATION NO. : 10/523763
DATED           : February 2, 2010
INVENTOR(S)     : Vorbach et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 941 days.

Signed and Sealed this

Thirtieth Day of November, 2010

David J. Kappos
*Director of the United States Patent and Trademark Office*